(12) United States Patent
Fleisig

(10) Patent No.: US 9,912,154 B2
(45) Date of Patent: Mar. 6, 2018

(54) ELECTRICAL POWER SUPPLYING DEVICE HAVING A CENTRAL POWER-RECEPTACLE ASSEMBLY WITH A PENISULA-LIKE HOUSING STRUCTURE SUPPLYING ELECTRICAL POWER TO POWER PLUGS, ADAPTORS AND MODULES WHILE CONCEALED FROM VIEW DURING POWER SUPPLYING OPERATIONS

(71) Applicant: Jeffrey Fleisig, Bloomfield, NJ (US)

(72) Inventor: Jeffrey Fleisig, Bloomfield, NJ (US)

(73) Assignee: PUCLINE, LLC, Venice, CA (US)

( * ) Notice: Subject to any disclaimer, the term of this patent is extended or adjusted under 35 U.S.C. 154(b) by 0 days.

(21) Appl. No.: 15/204,427

(22) Filed: Jul. 7, 2016

(65) Prior Publication Data
US 2017/0025852 A1 Jan. 26, 2017

Related U.S. Application Data

(63) Continuation of application No. 13/653,655, filed on Oct. 17, 2012, which is a continuation-in-part of
(Continued)

(51) Int. Cl.
*H02J 3/00* (2006.01)
*H02J 3/02* (2006.01)
(Continued)

(52) U.S. Cl.
CPC .............. *H02J 3/02* (2013.01); *H01R 13/665* (2013.01); *H01R 13/72* (2013.01); *H01R 25/003* (2013.01);
(Continued)

(58) Field of Classification Search
CPC .... H01R 13/72; H01R 25/003; H01R 13/665; H01R 31/005; H02J 3/00; A47B 2200/0081; Y10T 307/25
(Continued)

(56) References Cited

U.S. PATENT DOCUMENTS 2,364,262 A   12/1944   Wehringer
2,587,707 A   3/1952   Dever
(Continued)

FOREIGN PATENT DOCUMENTS

EP   1653572 A1   5/2006
EP   2270950 A2   1/2011
(Continued)

OTHER PUBLICATIONS

"Donut Power Strip"; www.yankodesign.com/2008/10/28/donut-power-strip, 4 pages, Oct. 28, 2008.
(Continued)

*Primary Examiner* — Zeev V Kitov
*Assistant Examiner* — Brian K Baxter
(74) *Attorney, Agent, or Firm* — Thomas J. Perkowski, Esq., PC

(57) ABSTRACT

An electrical power-supplying device for supplying electrical power to a group of electrical appliances located in an environment. The electrical power supplying device includes a power supply cord for plugging into a standard power receptacle by way of a power supply plug, and supplying AC electrical power to the device. The device includes a housing base portion having a central aperture providing access to a 3D interior volume bounded by a side wall extending circumferentially about the 3D interior volume and having a capacity for holding a plurality of power adapter modules and/or power adapter blocks associated with said group of electrical appliances located in the environment. The device further includes a central power-receptacle assembly having a peninsula-like housing structure supported generally within the central portion of the housing base portion and extending above the bottom support surface within the 3D interior volume, and towards a portion of the wall of the housing base portion, and sup-
(Continued)

porting a plurality of internally disposed alternating current (AC) electrical receptacles and one or more electronic circuits, including an AC-to-DC power conversion circuit, which are operably connected to the power supply cord.

7 Claims, 40 Drawing Sheets

Related U.S. Application Data application No. 13/275,437, filed on Oct. 18, 2011, now Pat. No. 9,184,546, which is a continuation-in-part of application No. 12/586,746, filed on Sep. 25, 2009, now Pat. No. 8,217,528, and a continuation-in-part of application No. 12/586,734, filed on Sep. 25, 2009, now Pat. No. 8,193,658, and a continuation-in-part of application No. 12/586,735, filed on Sep. 25, 2009, now Pat. No. 8,174,147, and a continuation-in-part of application No. 12/586,745, filed on Sep. 25, 2009, now Pat. No. 8,159,085, and a continuation-in-part of application No. 12/586,742, filed on Sep. 25, 2009, now abandoned.

(51) Int. Cl.
   *H01R 13/72* (2006.01)
   *H01R 25/00* (2006.01)
   *H01R 13/66* (2006.01)
   *H01R 27/02* (2006.01)
   *H01R 31/00* (2006.01)

(52) U.S. Cl.
   CPC ............... *H01R 27/02* (2013.01); *H02J 3/00* (2013.01); *A47B 2200/0081* (2013.01); *H01R 31/005* (2013.01); *Y10T 307/25* (2015.04)

(58) Field of Classification Search
   USPC .......................................................... 307/11
   See application file for complete search history.

(56) References Cited

U.S. PATENT DOCUMENTS

| | | |
|---|---|---|
| 3,013,105 A | 12/1961 | Craig |
| 3,495,799 A | 2/1970 | Murgas |
| 3,821,496 A | 6/1974 | Malone |
| 3,924,819 A | 12/1975 | Lapinskas |
| 4,107,399 A | 8/1978 | Claxton |
| 4,124,261 A | 11/1978 | Klaus |
| 4,163,592 A | 8/1979 | Nelson |
| 4,177,961 A | 12/1979 | Gruenewald |
| 4,373,761 A | 2/1983 | Hansberry, Jr. |
| 4,384,758 A | 5/1983 | Lee et al. |
| 4,427,252 A | 1/1984 | Lee et al. |
| 4,468,083 A | 8/1984 | Lee et al. |
| 4,470,539 A | 9/1984 | Skillen |
| 4,566,925 A | 1/1986 | Schnabel |
| 4,585,194 A | 4/1986 | Schwob |
| D288,920 S | 3/1987 | Oesterheld |
| D290,598 S | 6/1987 | Jaffe |
| 4,677,552 A | 6/1987 | Sibley |
| D290,836 S | 7/1987 | Oesterheld |
| 4,705,484 A | 11/1987 | Lerner |
| 4,731,029 A | 3/1988 | Lerner et al. |
| 4,899,268 A | 2/1990 | Hollinger |
| 4,908,744 A | 3/1990 | Hollinger |
| 4,924,892 A | 5/1990 | Kiba |
| 4,944,694 A | 7/1990 | Dorn |
| 5,016,241 A | 5/1991 | Lee et al. |
| 5,029,704 A | 7/1991 | Stillinger |
| 5,083,935 A | 1/1992 | Herman |
| D323,643 S | 2/1992 | Lee |
| 5,100,348 A | 3/1992 | Herman et al. |
| D326,257 S | 5/1992 | Lee |
| D328,249 S | 7/1992 | Lee |
| D328,280 S | 7/1992 | Lee |
| D328,452 S | 8/1992 | Lee |
| D329,223 S | 9/1992 | Lee |
| 5,150,963 A | 9/1992 | Hill |
| D332,216 S | 1/1993 | Lee |
| D332,398 S | 1/1993 | Lee |
| 5,266,057 A | 11/1993 | Angel, Jr. et al. |
| D342,937 S | 1/1994 | Angel |
| 5,285,383 A | 2/1994 | Lindsey et al. |
| D347,825 S | 6/1994 | Zarnowitz |
| 5,318,158 A | 6/1994 | Seasholtz |
| D349,594 S | 8/1994 | Bonazza |
| D351,342 S | 10/1994 | Lee |
| 5,382,172 A | 1/1995 | Klier et al. |
| D356,297 S | 3/1995 | Carl |
| D360,191 S | 7/1995 | Carl |
| D360,400 S | 7/1995 | Pitcher |
| 5,457,600 A | 10/1995 | Campbell et al. |
| 5,460,542 A | 10/1995 | Castellani |
| D366,862 S | 2/1996 | Lee |
| D366,863 S | 2/1996 | Lee |
| D366,864 S | 2/1996 | Lee |
| D367,036 S | 2/1996 | Lee |
| 5,529,513 A | 6/1996 | Lee |
| D371,762 S | 7/1996 | Lee |
| D372,193 S | 7/1996 | Lee |
| 5,531,333 A | 7/1996 | Vara |
| 5,538,385 A | 7/1996 | Bacchi et al. |
| D374,655 S | 10/1996 | Carl |
| D374,862 S | 10/1996 | Lee |
| 5,564,942 A | 10/1996 | Lee |
| D376,580 S | 12/1996 | Lee |
| 5,589,718 A | 12/1996 | Lee |
| 5,596,479 A | 1/1997 | Campbell et al. |
| D380,963 S | 7/1997 | Lee |
| D381,315 S | 7/1997 | Harold |
| 5,655,725 A | 8/1997 | Kroger |
| D384,579 S | 10/1997 | Lee |
| D387,733 S | 12/1997 | Lee |
| D388,765 S | 1/1998 | Pitcher |
| D389,402 S | 1/1998 | Lee |
| D392,942 S | 3/1998 | Lee |
| D392,959 S | 3/1998 | Edwards |
| 5,736,673 A | 4/1998 | Lee |
| 5,741,113 A | 4/1998 | Bacchi et al. |
| D395,407 S | 6/1998 | Dwight |
| 5,765,444 A | 6/1998 | Bacchi et al. |
| D396,632 S | 8/1998 | Lee |
| D396,689 S | 8/1998 | Karten |
| D396,986 S | 8/1998 | Robinson |
| D397,086 S | 8/1998 | Lin |
| 5,792,986 A | 8/1998 | Lee |
| D399,123 S | 10/1998 | Dwight |
| D400,096 S | 10/1998 | Lee |
| D401,136 S | 11/1998 | Derman |
| 5,852,413 A | 12/1998 | Bacchi et al. |
| D404,716 S | 1/1999 | Lee |
| D405,050 S | 2/1999 | Lee |
| D405,056 S | 2/1999 | Lee |
| D405,057 S | 2/1999 | Martin |
| D405,367 S | 2/1999 | Lee |
| D405,368 S | 2/1999 | Lee |
| D405,688 S | 2/1999 | Lee |
| D406,753 S | 3/1999 | Lee |
| D407,378 S | 3/1999 | Lee |
| 5,875,893 A | 3/1999 | Lee et al. |
| 5,901,712 A | 5/1999 | St |
| 5,909,062 A | 6/1999 | Krietzman |
| D412,314 S | 7/1999 | Lee |
| 5,923,147 A | 7/1999 | Martensson |
| 5,924,892 A | 7/1999 | Ferracina |
| 5,944,476 A | 8/1999 | Bacchi et al. |
| D415,101 S | 10/1999 | Martin |
| D415,111 S | 10/1999 | Lee |
| 5,984,717 A | 11/1999 | Lee |
| 5,988,569 A | 11/1999 | Zhang et al. |

(56) References Cited

U.S. PATENT DOCUMENTS

| | | |
|---|---|---|
| 6,011,221 A | 1/2000 | Lecinski et al. |
| 6,017,228 A | 1/2000 | Verbeek et al. |
| D420,331 S | 2/2000 | Martin |
| 6,039,591 A | 3/2000 | Marsh et al. |
| 6,042,426 A | 3/2000 | Byrne |
| D425,028 S | 5/2000 | Lee |
| D425,487 S | 5/2000 | Lee |
| D427,971 S | 7/2000 | Lee |
| D429,217 S | 8/2000 | Lee |
| D429,218 S | 8/2000 | Lee |
| D430,108 S | 8/2000 | Lee |
| 6,098,484 A | 8/2000 | Bacchi et al. |
| 6,100,670 A | 8/2000 | Levesque |
| 6,105,454 A | 8/2000 | Bacchi et al. |
| 6,111,202 A | 8/2000 | Martin |
| D430,541 S | 9/2000 | Lee |
| 6,126,381 A | 10/2000 | Bacchi et al. |
| 6,129,568 A | 10/2000 | Mercurio et al. |
| 6,141,221 A | 10/2000 | Tong et al. |
| D434,009 S | 11/2000 | Lee |
| 6,142,405 A | 11/2000 | Black |
| D435,558 S | 12/2000 | Tong |
| 6,155,768 A | 12/2000 | Bacchi et al. |
| 6,160,265 A | 12/2000 | Bacchi et al. |
| 6,164,582 A | 12/2000 | Vara |
| D436,109 S | 1/2001 | Tong et al. |
| 6,176,716 B1 | 1/2001 | Mercurio et al. |
| D439,242 S | 3/2001 | Brown et al. |
| D440,203 S | 4/2001 | Ewing et al. |
| D440,942 S | 4/2001 | Ewing et al. |
| D441,343 S | 5/2001 | Lee |
| D442,550 S | 5/2001 | Tong et al. |
| D442,916 S | 5/2001 | Tong et al. |
| 6,227,914 B1 | 5/2001 | Lee et al. |
| 6,234,418 B1 | 5/2001 | Donaldson |
| 6,236,576 B1 | 5/2001 | Munk-Nielsen |
| D443,249 S | 6/2001 | Lee |
| D443,250 S | 6/2001 | Lee |
| D443,589 S | 6/2001 | Tong et al. |
| D443,591 S | 6/2001 | Tong et al. |
| D443,858 S | 6/2001 | Treiger et al. |
| D444,450 S | 7/2001 | Lee |
| D444,770 S | 7/2001 | Tong et al. |
| D445,091 S | 7/2001 | Tong et al. |
| D445,400 S | 7/2001 | Tong et al. |
| D445,401 S | 7/2001 | Tong |
| D445,766 S | 7/2001 | Solomon |
| D446,189 S | 8/2001 | Lee |
| D446,503 S | 8/2001 | Lee |
| D446,504 S | 8/2001 | Lee |
| D447,118 S | 8/2001 | Lee |
| D447,119 S | 8/2001 | Lee |
| D447,120 S | 8/2001 | Lee |
| D447,745 S | 9/2001 | Lee |
| D450,296 S | 11/2001 | Lee |
| D450,297 S | 11/2001 | Lee |
| 6,315,604 B1 | 11/2001 | Lee |
| D452,215 S | 12/2001 | Stekelenburg |
| 6,336,105 B1 | 1/2002 | Conklin et al. |
| 6,341,979 B1 | 1/2002 | Yamamoto |
| D453,322 S | 2/2002 | Lee |
| D453,496 S | 2/2002 | Lee |
| D456,009 S | 4/2002 | Tong et al. |
| D456,362 S | 4/2002 | Lee |
| D456,363 S | 4/2002 | Lee |
| 6,369,999 B1 | 4/2002 | Wohlgemuth et al. |
| D456,692 S | 5/2002 | Epstein |
| D457,059 S | 5/2002 | Macrae |
| D458,608 S | 6/2002 | Tong et al. |
| D459,219 S | 6/2002 | Lee |
| 6,406,313 B1 | 6/2002 | Victor |
| 6,410,855 B1 | 6/2002 | Berkowitz et al. |
| 6,410,994 B1 | 6/2002 | Jones et al. |
| 6,425,165 B2 | 7/2002 | Koppang |
| 6,425,543 B1 | 7/2002 | King |
| D462,890 S | 9/2002 | Brown |
| D463,373 S | 9/2002 | Lee |
| 6,456,091 B1 | 9/2002 | Lee et al. |
| 6,462,953 B2 | 10/2002 | Tong et al. |
| 6,473,510 B1 | 10/2002 | Marsh |
| D465,456 S | 11/2002 | Lee |
| 6,483,200 B1 | 11/2002 | Jacobs |
| 6,486,407 B1 | 11/2002 | Hawker et al. |
| D466,405 S | 12/2002 | Lee |
| D467,226 S | 12/2002 | Lee |
| D467,227 S | 12/2002 | Lee |
| D467,246 S | 12/2002 | Macrae |
| D467,552 S | 12/2002 | Mori et al. |
| D467,877 S | 12/2002 | Mori et al. |
| D467,879 S | 12/2002 | Lee |
| 6,493,683 B1 | 12/2002 | David et al. |
| 6,497,382 B2 | 12/2002 | King |
| D468,262 S | 1/2003 | Lee |
| D468,263 S | 1/2003 | Lee |
| D468,689 S | 1/2003 | Lee |
| 6,504,468 B2 | 1/2003 | Lee et al. |
| 6,505,566 B1 | 1/2003 | Foster et al. |
| D470,047 S | 2/2003 | Lee et al. |
| D471,442 S | 3/2003 | Lee |
| D471,870 S | 3/2003 | Lee |
| D473,194 S | 4/2003 | Lee |
| 6,547,599 B2 | 4/2003 | Kinsey et al. |
| 6,554,218 B2 | 4/2003 | Buyce |
| 6,559,893 B1 | 5/2003 | Martin |
| 6,560,102 B1 | 5/2003 | Tong et al. |
| 6,567,277 B1 | 5/2003 | Doherty |
| 6,573,617 B2 | 6/2003 | Jones et al. |
| 6,588,609 B1 | 7/2003 | Richet et al. |
| 6,589,073 B2 | 7/2003 | Lee |
| 6,600,479 B1 | 7/2003 | Smith |
| 6,614,636 B1 | 9/2003 | Marsh |
| 6,637,166 B2 | 10/2003 | Kinsey |
| 6,640,041 B2 | 10/2003 | Ichinari |
| 6,644,993 B2 | 11/2003 | Victor |
| 6,683,770 B1 | 1/2004 | Marsh |
| 6,690,141 B1 | 2/2004 | Yu |
| 6,716,044 B2 | 4/2004 | Bertke |
| D490,779 S | 6/2004 | Lee |
| D492,054 S | 6/2004 | Donegani et al. |
| 6,743,025 B2 | 6/2004 | Howard |
| 6,746,272 B2 | 6/2004 | Bean |
| 6,756,543 B1 | 6/2004 | Kaloustian |
| 6,764,322 B1 | 7/2004 | Yu |
| 6,779,370 B2 | 8/2004 | Bellow, Jr. et al. |
| 6,780,047 B1 | 8/2004 | Laity |
| D496,118 S | 9/2004 | Donegani et al. |
| 6,805,581 B2 | 10/2004 | Love |
| D498,555 S | 11/2004 | Donegani et al. |
| D502,924 S | 3/2005 | Sirichai et al. |
| D503,152 S | 3/2005 | Suckle et al. |
| D503,153 S | 3/2005 | Suckle et al. |
| 6,868,401 B1 | 3/2005 | Carpenter et al. |
| 6,872,086 B2 | 3/2005 | Milan |
| D504,064 S | 4/2005 | Lee et al. |
| D504,112 S | 4/2005 | Suckle et al. |
| D505,390 S | 5/2005 | Lee et al. |
| D505,657 S | 5/2005 | Suckle et al. |
| D506,184 S | 6/2005 | Sirichai et al. |
| D506,726 S | 6/2005 | Suckle et al. |
| 6,902,429 B1 | 6/2005 | Brooks |
| 6,907,402 B1 | 6/2005 | Khaitan |
| 6,907,686 B2 | 6/2005 | Symons |
| D507,540 S | 7/2005 | Suckle |
| 6,916,565 B2 | 7/2005 | Shioya |
| 6,921,284 B2 | 7/2005 | Sirichai et al. |
| D508,232 S | 8/2005 | Suckle et al. |
| D509,185 S | 9/2005 | Suckle et al. |
| D509,727 S | 9/2005 | Suckle et al. |
| D510,091 S | 9/2005 | Mori et al. |
| 6,941,395 B1 | 9/2005 | Galang et al. |
| D510,572 S | 10/2005 | Lee et al. |
| D510,907 S | 10/2005 | Suckle et al. |
| D511,501 S | 11/2005 | Lee et al. |
| 6,966,791 B1 | 11/2005 | Farr |

(56) References Cited

U.S. PATENT DOCUMENTS

| | | |
|---|---|---|
| D512,381 S | 12/2005 | Sirichai et al. |
| D512,718 S | 12/2005 | Mori et al. |
| 6,971,254 B2 | 12/2005 | Bellow, Jr. et al. |
| D513,408 S | 1/2006 | Suckle |
| D513,409 S | 1/2006 | Suckle |
| D514,523 S | 2/2006 | Lee et al. |
| D514,524 S | 2/2006 | Suckle |
| D515,508 S | 2/2006 | Lee |
| D516,032 S | 2/2006 | Suckle et al. |
| 7,001,211 B2 | 2/2006 | Lichtscheidl et al. |
| D517,497 S | 3/2006 | Lee |
| D517,984 S | 3/2006 | Suckle et al. |
| D519,079 S | 4/2006 | Suckle |
| D519,464 S | 4/2006 | Suckle et al. |
| D519,465 S | 4/2006 | Sirichai et al. |
| 7,025,627 B2 * | 4/2006 | Rosenthal ............ H01R 25/003 439/142 |
| D519,837 S | 5/2006 | Sturk et al. |
| D519,933 S | 5/2006 | Suckle et al. |
| D519,934 S | 5/2006 | Wada et al. |
| D520,457 S | 5/2006 | Wada et al. |
| D520,458 S | 5/2006 | Wada et al. |
| D520,460 S | 5/2006 | Wadsworth et al. |
| D520,951 S | 5/2006 | Mori et al. |
| D521,452 S | 5/2006 | Mori et al. |
| D521,860 S | 5/2006 | Lee et al. |
| D523,750 S | 6/2006 | Lee et al. |
| 7,062,870 B1 | 6/2006 | You |
| D524,642 S | 7/2006 | Suckle et al. |
| D524,759 S | 7/2006 | Wada et al. |
| 7,077,693 B1 | 7/2006 | Symons |
| 7,080,812 B2 | 7/2006 | Wadsworth et al. |
| 7,083,421 B1 | 8/2006 | Mori |
| 7,097,469 B2 | 8/2006 | Jacobs |
| 7,098,406 B1 | 8/2006 | Hammonds |
| 7,099,836 B2 | 8/2006 | Cichanowicz |
| 7,106,182 B2 | 9/2006 | DeWilde |
| 7,108,533 B2 | 9/2006 | Howard |
| 7,112,097 B1 | 9/2006 | Lam |
| D530,717 S | 10/2006 | Mori et al. |
| 7,140,586 B2 | 11/2006 | Seil et al. |
| D533,063 S | 12/2006 | Lee et al. |
| 7,149,717 B1 | 12/2006 | Kan |
| D535,947 S | 1/2007 | Suckle et al. |
| 7,167,372 B2 | 1/2007 | Mori et al. |
| 7,171,386 B1 | 1/2007 | Raykhman |
| D536,303 S | 2/2007 | Suckle et al. |
| D537,780 S | 3/2007 | Suckle |
| D537,784 S | 3/2007 | Suckle et al. |
| D539,735 S | 4/2007 | Suckle |
| D542,123 S | 5/2007 | Symons |
| D543,148 S | 5/2007 | Suckle et al. |
| D543,154 S | 5/2007 | Suckle et al. |
| D543,155 S | 5/2007 | Suckle |
| D543,156 S | 5/2007 | Suckle |
| D543,157 S | 5/2007 | Suckle |
| 7,223,122 B2 | 5/2007 | Mori |
| D543,942 S | 6/2007 | Howard |
| D545,179 S | 6/2007 | Mori et al. |
| 7,233,086 B2 | 6/2007 | Borden et al. |
| 7,236,209 B2 | 6/2007 | Martin |
| D546,811 S | 7/2007 | Neu et al. |
| D547,486 S | 7/2007 | Donegani et al. |
| 7,239,892 B2 | 7/2007 | Martin |
| 7,240,111 B2 | 7/2007 | VanHarlingen et al. |
| 7,242,577 B2 | 7/2007 | Sween et al. |
| 7,243,077 B2 | 7/2007 | Broden et al. |
| 7,247,798 B2 | 7/2007 | Pagoto et al. |
| 7,247,799 B2 | 7/2007 | Mori et al. |
| D549,174 S | 8/2007 | Lee et al. |
| D549,210 S | 8/2007 | Neu et al. |
| D549,219 S | 8/2007 | Tan |
| D549,557 S | 8/2007 | Mori et al. |
| D549,662 S | 8/2007 | Lee et al. |
| D553,568 S | 10/2007 | Lee et al. |
| 7,286,046 B2 | 10/2007 | Kinsey et al. |
| D556,019 S | 11/2007 | Symons |
| D556,134 S | 11/2007 | Lee et al. |
| 7,292,881 B2 | 11/2007 | Seil et al. |
| 7,293,651 B2 | 11/2007 | Lee et al. |
| D556,689 S | 12/2007 | Lee et al. |
| D557,495 S | 12/2007 | Chan et al. |
| D560,609 S | 1/2008 | Rosenthal et al. |
| 7,318,567 B2 | 1/2008 | Mori et al. |
| 7,318,750 B1 | 1/2008 | Chacon et al. |
| 7,319,984 B2 | 1/2008 | Frankel et al. |
| 7,324,334 B2 | 1/2008 | Sween et al. |
| D561,093 S | 2/2008 | Sween et al. |
| D561,094 S | 2/2008 | Sween et al. |
| D561,687 S | 2/2008 | Sween et al. |
| D561,762 S | 2/2008 | Mori |
| 7,329,152 B2 | 2/2008 | Mori et al. |
| 7,335,053 B2 | 2/2008 | Avevor et al. |
| D563,872 S | 3/2008 | Lee et al. |
| D563,897 S | 3/2008 | Lee et al. |
| D563,898 S | 3/2008 | Lee et al. |
| D563,899 S | 3/2008 | Goetz et al. |
| D564,447 S | 3/2008 | Lee et al. |
| 7,361,050 B2 | 4/2008 | Mori et al. |
| D570,598 S | 6/2008 | Chan |
| D570,788 S | 6/2008 | Lee et al. |
| D570,789 S | 6/2008 | Lee et al. |
| D571,733 S | 6/2008 | Seil |
| 7,381,095 B2 | 6/2008 | Freeman et al. |
| 7,385,403 B2 | 6/2008 | Ferrer et al. |
| D572,230 S | 7/2008 | Neu et al. |
| D573,103 S | 7/2008 | Lee et al. |
| 7,397,654 B2 | 7/2008 | Mori |
| 7,399,199 B2 | 7/2008 | Symons |
| 7,399,200 B1 | 7/2008 | Eliseo |
| 7,399,201 B1 | 7/2008 | Khorsand |
| 7,413,155 B2 | 8/2008 | Seil et al. |
| 7,417,850 B1 | 8/2008 | Pulido |
| D576,030 S | 9/2008 | Lee et al. |
| D576,166 S | 9/2008 | Mori et al. |
| D576,553 S | 9/2008 | Lee et al. |
| D577,577 S | 9/2008 | Lee et al. |
| 7,429,197 B2 | 9/2008 | Weis et al. |
| 7,432,619 B2 | 10/2008 | Voll et al. |
| 7,433,839 B2 | 10/2008 | Bodurtha et al. |
| 7,435,901 B2 | 10/2008 | Mori et al. |
| 7,436,087 B2 | 10/2008 | Borden et al. |
| 7,438,567 B2 | 10/2008 | Nalwad et al. |
| 7,440,913 B2 | 10/2008 | Nozaki |
| 7,442,090 B2 | 10/2008 | Mori et al. |
| D580,441 S | 11/2008 | Mori |
| 7,447,922 B1 | 11/2008 | Asbury |
| D581,669 S | 12/2008 | Sween et al. |
| 7,461,941 B2 | 12/2008 | Martin |
| D584,225 S | 1/2009 | Lee et al. |
| D585,836 S | 2/2009 | Lee et al. |
| D587,246 S | 2/2009 | Neu et al. |
| 7,484,990 B1 | 2/2009 | Lee et al. |
| D588,000 S | 3/2009 | Goetz et al. |
| D588,065 S | 3/2009 | Wadsworth et al. |
| D588,442 S | 3/2009 | Chong et al. |
| D588,546 S | 3/2009 | Lee et al. |
| D588,547 S | 3/2009 | Lee et al. |
| D588,549 S | 3/2009 | Lee et al. |
| D588,904 S | 3/2009 | Chong et al. |
| D589,456 S | 3/2009 | Puluc et al. |
| 7,498,687 B2 | 3/2009 | Kinsey et al. |
| 7,501,580 B2 | 3/2009 | Pagoto et al. |
| 7,510,420 B2 | 3/2009 | Mori |
| 7,518,265 B2 | 4/2009 | Roepke |
| D593,034 S | 5/2009 | Mori et al. |
| D593,954 S | 6/2009 | Lee et al. |
| RE41,060 E | 12/2009 | Yu |
| 7,626,356 B2 | 12/2009 | Elgie |
| 7,656,120 B2 | 2/2010 | Neu |
| 7,659,696 B2 | 2/2010 | Zeiler |
| 7,663,866 B2 | 2/2010 | Lee et al. |
| 7,689,500 B2 | 3/2010 | Cottrell |
| 7,707,086 B2 | 4/2010 | Burns et al. |

(56) References Cited

U.S. PATENT DOCUMENTS

| | | | |
|---|---|---|---|
| 7,742,979 B2 | 6/2010 | Reding et al. | |
| 7,813,984 B2 | 10/2010 | Korzinin | |
| 7,827,083 B2 | 11/2010 | Beurskens | |
| 7,831,502 B2 | 11/2010 | Cummings et al. | |
| 7,876,066 B2 | 1/2011 | Mori | |
| 7,904,373 B2 | 3/2011 | Kimle et al. | |
| 7,912,781 B2 | 3/2011 | Rosenthal | |
| 7,945,505 B2 | 5/2011 | Van Slyke | |
| 7,991,685 B2 | 8/2011 | Tatge et al. | |
| 8,002,586 B2 * | 8/2011 | Fleisig | H01R 13/72 439/652 |
| 8,002,587 B2 * | 8/2011 | Fleisig | H01R 13/6658 439/654 |
| 8,015,089 B1 | 9/2011 | Baya A et al. | |
| 8,016,611 B2 * | 9/2011 | Fleisig | H01R 13/72 439/501 |
| 8,026,633 B2 * | 9/2011 | Fleisig | H01R 13/72 248/231.91 |
| 8,036,966 B2 | 10/2011 | Brittan et al. | |
| D648,685 S | 11/2011 | Symons | |
| 8,055,573 B2 | 11/2011 | Schlecht | |
| 8,159,085 B2 * | 4/2012 | Fleisig | H01R 13/502 174/493 |
| 8,174,147 B2 * | 5/2012 | Fleisig | H01R 13/72 174/493 |
| 8,180,698 B2 | 5/2012 | Lerner | |
| 8,193,658 B2 * | 6/2012 | Fleisig | H01R 13/665 174/493 |
| 8,195,544 B2 | 6/2012 | Horsfall | |
| 8,217,528 B2 * | 7/2012 | Fleisig | H01R 13/72 174/493 |
| 8,230,995 B2 | 7/2012 | Andrews | |
| 8,239,313 B2 | 8/2012 | Jenkins et al. | |
| 8,249,975 B1 | 8/2012 | Keith | |
| 8,255,296 B2 | 8/2012 | Hardison, III | |
| 8,339,101 B2 | 12/2012 | Wu | |
| 8,398,408 B1 | 3/2013 | Hansen | |
| 8,471,531 B2 | 6/2013 | Roepke | |
| 8,547,063 B2 | 10/2013 | Krancher | |
| 8,589,261 B2 | 11/2013 | Hardison, III | |
| 8,626,626 B2 | 1/2014 | Hardison, III | |
| 8,729,731 B2 | 5/2014 | Roepke | |
| 8,755,914 B2 | 6/2014 | Bhogal | |
| 8,805,551 B2 | 8/2014 | Bhogal | |
| 8,975,869 B2 | 3/2015 | Lee | |
| 9,054,541 B2 | 6/2015 | Morita | |
| 9,152,196 B2 | 10/2015 | Collopy | |
| 9,166,422 B2 | 10/2015 | Brotto | |
| 9,184,546 B2 * | 11/2015 | Fleisig | H01R 13/72 |
| 9,347,790 B2 | 5/2016 | Haukom | |
| 9,362,764 B2 | 6/2016 | Farkas | |
| 2002/0002593 A1 | 1/2002 | Ewing | |
| 2002/0038394 A1 | 3/2002 | Liang | |
| 2002/0050807 A1 | 5/2002 | Janik | |
| 2002/0099505 A1 | 7/2002 | Thomas | |
| 2002/0189848 A1 | 12/2002 | Hawker et al. | |
| 2003/0038209 A1 | 2/2003 | Remeczky | |
| 2003/0066936 A1 | 4/2003 | Beck et al. | |
| 2003/0121742 A1 | 7/2003 | Hardy | |
| 2003/0188880 A1 | 10/2003 | McClellan et al. | |
| 2004/0108126 A1 | 6/2004 | Kaloustian | |
| 2004/0160150 A1 | 8/2004 | Hay et al. | |
| 2004/0224638 A1 | 11/2004 | Fadell | |
| 2005/0029984 A1 | 2/2005 | Cheng et al. | |
| 2005/0052085 A1 | 3/2005 | Chang | |
| 2005/0079769 A1 | 4/2005 | Strayer | |
| 2005/0093510 A1 | 5/2005 | Seil | |
| 2005/0233622 A1 * | 10/2005 | Lichtscheidl | H01R 25/003 439/131 |
| 2006/0060368 A1 * | 3/2006 | Dinh | H02G 3/185 174/481 |
| 2006/0061332 A1 | 3/2006 | Neu | |
| 2006/0065422 A1 | 3/2006 | Broyles | |
| 2006/0196995 A1 | 9/2006 | Mori et al. | |
| 2006/0201707 A1 * | 9/2006 | Dinh | H02G 3/185 174/483 |
| 2006/0258195 A1 * | 11/2006 | Schwartz | A47B 21/06 439/131 |
| 2006/0276077 A1 | 12/2006 | Mori | |
| 2006/0278077 A1 | 12/2006 | Mukaide | |
| 2007/0010971 A1 | 1/2007 | Nikolova | |
| 2007/0039755 A1 | 2/2007 | Mori et al. | |
| 2007/0109710 A1 | 5/2007 | Milan | |
| 2007/0111585 A1 | 5/2007 | Mori et al. | |
| 2007/0180665 A1 | 8/2007 | Sween et al. | |
| 2007/0235222 A1 | 10/2007 | Hubbard | |
| 2007/0236181 A1 | 10/2007 | Palladino | |
| 2007/0257560 A1 | 11/2007 | Menas | |
| 2007/0261874 A1 | 11/2007 | Pagoto et al. | |
| 2007/0273325 A1 | 11/2007 | Krieger | |
| 2007/0275594 A1 | 11/2007 | Greenberg | |
| 2007/0284949 A1 | 12/2007 | Voll | |
| 2007/0295529 A1 | 12/2007 | Mori et al. | |
| 2008/0104427 A1 | 5/2008 | Yee et al. | |
| 2008/0111013 A1 | 5/2008 | Suckle et al. | |
| 2008/0112152 A1 | 5/2008 | Figueroa et al. | |
| 2008/0113563 A1 | 5/2008 | Roepke et al. | |
| 2008/0164757 A1 | 7/2008 | Elgie | |
| 2008/0185990 A1 | 8/2008 | Hsu | |
| 2008/0194139 A1 | 8/2008 | Chan | |
| 2008/0261455 A1 | 10/2008 | Axland | |
| 2008/0266783 A1 | 10/2008 | Mills | |
| 2008/0302687 A1 | 12/2008 | Sirichai et al. | |
| 2008/0315734 A1 | 12/2008 | Birsel et al. | |
| 2009/0009936 A1 | 1/2009 | Neu | |
| 2009/0014196 A1 * | 1/2009 | Peck | H02G 3/185 174/54 |
| 2009/0099505 A1 | 4/2009 | Hendrixson | |
| 2009/0156061 A1 | 6/2009 | Bernstein | |
| 2009/0195970 A1 | 8/2009 | Lee | |
| 2009/0276643 A1 | 11/2009 | Saito | |
| 2010/0090646 A1 | 4/2010 | Mori | |
| 2010/0090654 A1 | 4/2010 | Breiting | |
| 2010/0095139 A1 | 4/2010 | Murphy | |
| 2010/0104278 A1 | 4/2010 | Livingston et al. | |
| 2010/0148983 A1 | 6/2010 | Huxley | |
| 2010/0156342 A1 | 6/2010 | Hrabal | |
| 2010/0171465 A1 | 7/2010 | Seal | |
| 2010/0213892 A1 | 8/2010 | DeSanctis | |
| 2010/0225268 A1 | 9/2010 | Hui | |
| 2010/0231161 A1 * | 9/2010 | Brown | B25H 3/02 320/101 |
| 2010/0244765 A1 | 9/2010 | Collopy | |
| 2010/0246232 A1 | 9/2010 | Chen | |
| 2011/0025263 A1 | 2/2011 | Gilbert | |
| 2011/0057605 A1 | 3/2011 | Chung | |
| 2011/0076874 A1 | 3/2011 | Fleisig | |
| 2011/0076875 A1 | 3/2011 | Fleisig | |
| 2011/0076876 A1 | 3/2011 | Fleisig | |
| 2011/0076877 A1 | 3/2011 | Fleisig et al. | |
| 2011/0076878 A1 | 3/2011 | Fleisig | |
| 2011/0076879 A1 | 3/2011 | Fleisig | |
| 2011/0076880 A1 | 3/2011 | Fleisig | |
| 2011/0076882 A1 | 3/2011 | Fleisig | |
| 2011/0084872 A1 | 4/2011 | Kishida | |
| 2011/0085048 A1 | 4/2011 | Amano | |
| 2011/0163600 A1 | 7/2011 | Garb | |
| 2011/0193523 A1 | 8/2011 | Law | |
| 2011/0227551 A1 | 9/2011 | Black | |
| 2011/0266997 A1 | 11/2011 | Krancher | |
| 2011/0273906 A1 | 11/2011 | Nichol | |
| 2012/0019207 A1 | 1/2012 | Kuo | |
| 2012/0187902 A1 | 7/2012 | Wang | |
| 2012/0250295 A1 | 10/2012 | Bouffay | |
| 2013/0015714 A1 | 1/2013 | Kwok | |
| 2013/0234649 A1 | 9/2013 | Sevier | |
| 2013/0241489 A1 | 9/2013 | Ting | |
| 2013/0278214 A1 | 10/2013 | Saton | |
| 2013/0339766 A1 | 12/2013 | Chen | |
| 2014/0059264 A1 | 2/2014 | Sudak | |
| 2014/0104805 A1 * | 4/2014 | Row | H01R 13/516 361/807 |
| 2014/0111143 A1 | 4/2014 | Sells | |

(56) References Cited

U.S. PATENT DOCUMENTS

| | | | |
|---|---|---|---|
| 2014/0312691 A1 | 10/2014 | Doljack |
| 2014/0335919 A1 | 11/2014 | Stewart |
| 2014/0367138 A1 | 12/2014 | Godfrey |
| 2015/0008741 A1 | 1/2015 | Fleisig |
| 2015/0159416 A1 | 6/2015 | Tehranchi |
| 2015/0214708 A1 | 7/2015 | Segnit |
| 2015/0263551 A1 | 9/2015 | Caren |
| 2016/0004286 A1 | 1/2016 | Collopy |
| 2016/0013827 A1 | 1/2016 | Hubinak |
| 2016/0123569 A1 | 5/2016 | Cummings |
| 2016/0187046 A1 | 6/2016 | Chen |

FOREIGN PATENT DOCUMENTS

| | | |
|---|---|---|
| EP | 1641100 B1 | 11/2011 |
| WO | 1999053594 A1 | 10/1999 |
| WO | 2008131486 A1 | 11/2008 |
| WO | 2011038339 A1 | 3/2011 |
| WO | 2012083484 A1 | 6/2012 |
| WO | 2013059262 A1 | 4/2013 |
| WO | 2015120300 A1 | 8/2015 |

OTHER PUBLICATIONS

"Donut", Ramei Keum, www,rameikeum.com, 2 pages, 2008.
"Power + Trashcan", Greg Fulco Products, one page, 2010.
"PowerPod", Steelcase, Inc., two pages, 2010.
"Projectors Galore", http://high-tech-360.blogspot.com/2009/05/projectors-galore.html, 3 page, Jul. 1, 2010.
"Sail", Marek Wenglorz, www.coroflot.com, 1 page, 2009.
"Spy Box", Marek Wenglorz, www.coroflot.com, 1 page, 2009.
"Surge3000 Calamari Edition: Surge Protector", Trident Design, LLC, Powersquid.com, two pages, 2009.
"Wardrobe valley with surge protector", Comfort House, Inc., one page, 2010.
Descriptive Materials on the Punkt ES 01 Extension Socket, by the PunktGroup, published at http://www.punktgroup.com/en/154/gallery.aspx, and launched on Sep. 7, 2012 (7 Pages).
International Search Report for International Application No. PCT/US2012/060531 completed Dec. 14, 2012.
Office Action (Final Rejection) issued in U.S. Appl. No. 13/275,437 dated Jun. 4, 2014.
Office Action dated Oct. 4, 2013 issued in U.S. Appl. No. 13/275,437 by Jeffrey Fleisig (46 Pages).
Online product advertisement entitled 'Cable Management the Easy Way', http://cableorganizer.com/, pp. 1 through 4. 2009.
Online product advertisement entitled 'Hardwood Electrics', http://ihwe.com/cordboxes/, pp. 1 and 2. 2009.
Online product advertisement entitled 'Kangaroom Black Box Cord Organizer,', http://kangaroomstorage.com/product/charging-%2B-orga . . . , pp. 1 and 2. 2009.
Online product advertisement entitled 'The Sanctuary Power Charger Station and Desk Valet', http://cableorganizer.com/blue-lounge-designs/sanctuary.html, pp. 1 through 10. 2009.
Response to Office Action dated Mar. 3, 2014 filed in U.S. Appl. No. 13/275,437.
Search Report for PCT Application No. PCT/US2010/050391 completed Jan. 21, 2011.
Written Opinion of The International Searching Authority in International Application No. PCT/US2012/060531 dated Jan. 3, 2013.
Online product advertisement entitled 'The Sanctuary Power Charger Station and Desk Valet', http://cableorganizer.com/blue-lounge-designs/sanctuary.html, pp. 1 through 4. 2009.
International Search Report (ISR) dated Mar. 31, 2017 issued in International Patent Application No. PCT/US2016/064487 (7 Pages).
Written Opinion (WO) dated Mar. 31, 2017, issued in International Patent Application No. PCT/US2016/064487 (11 Pages).
Office Action dated Jul. 3, 2017 for U.S. Appl. No. 13/653,655; (pp. 1-5).

\* cited by examiner

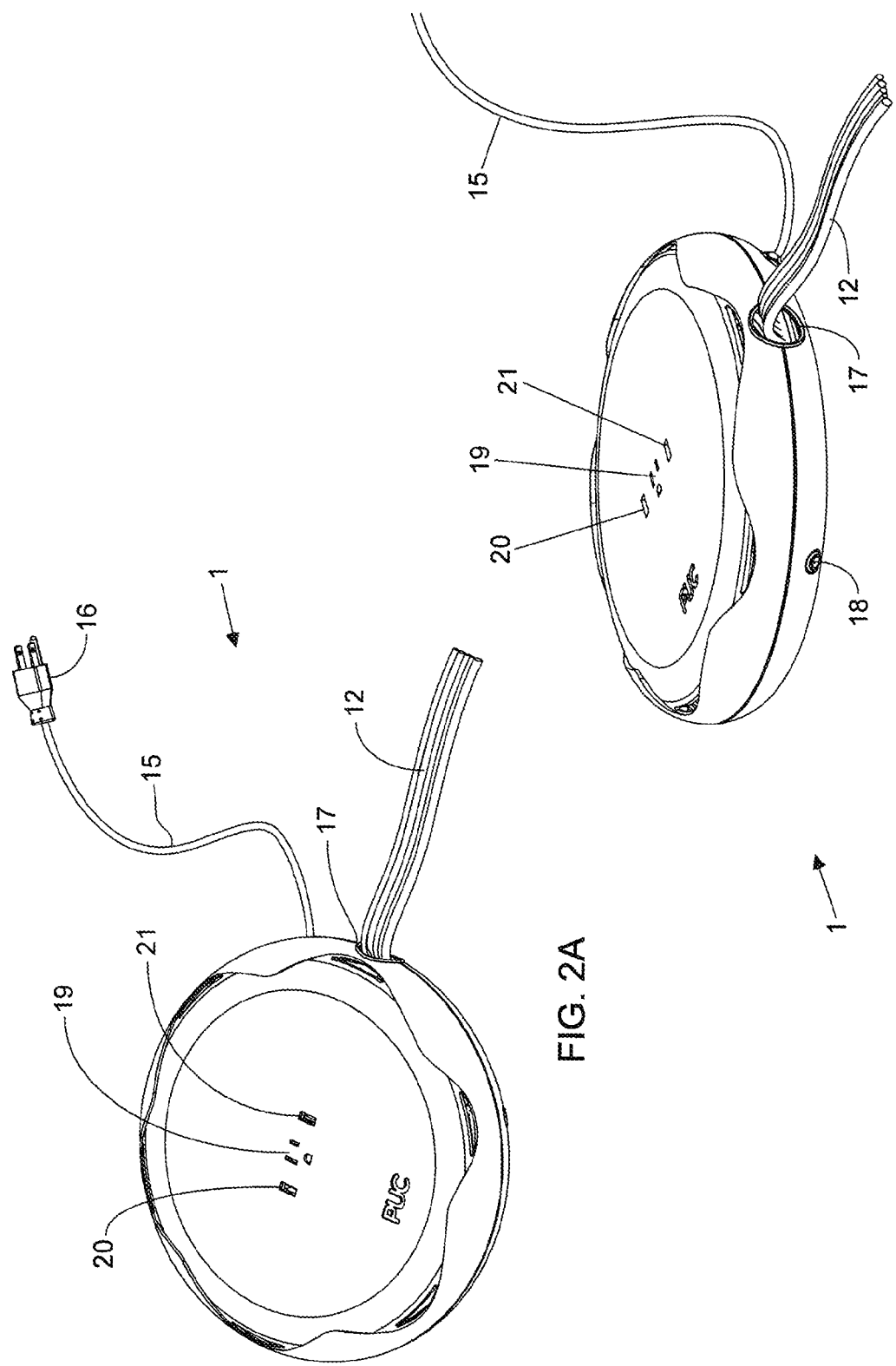

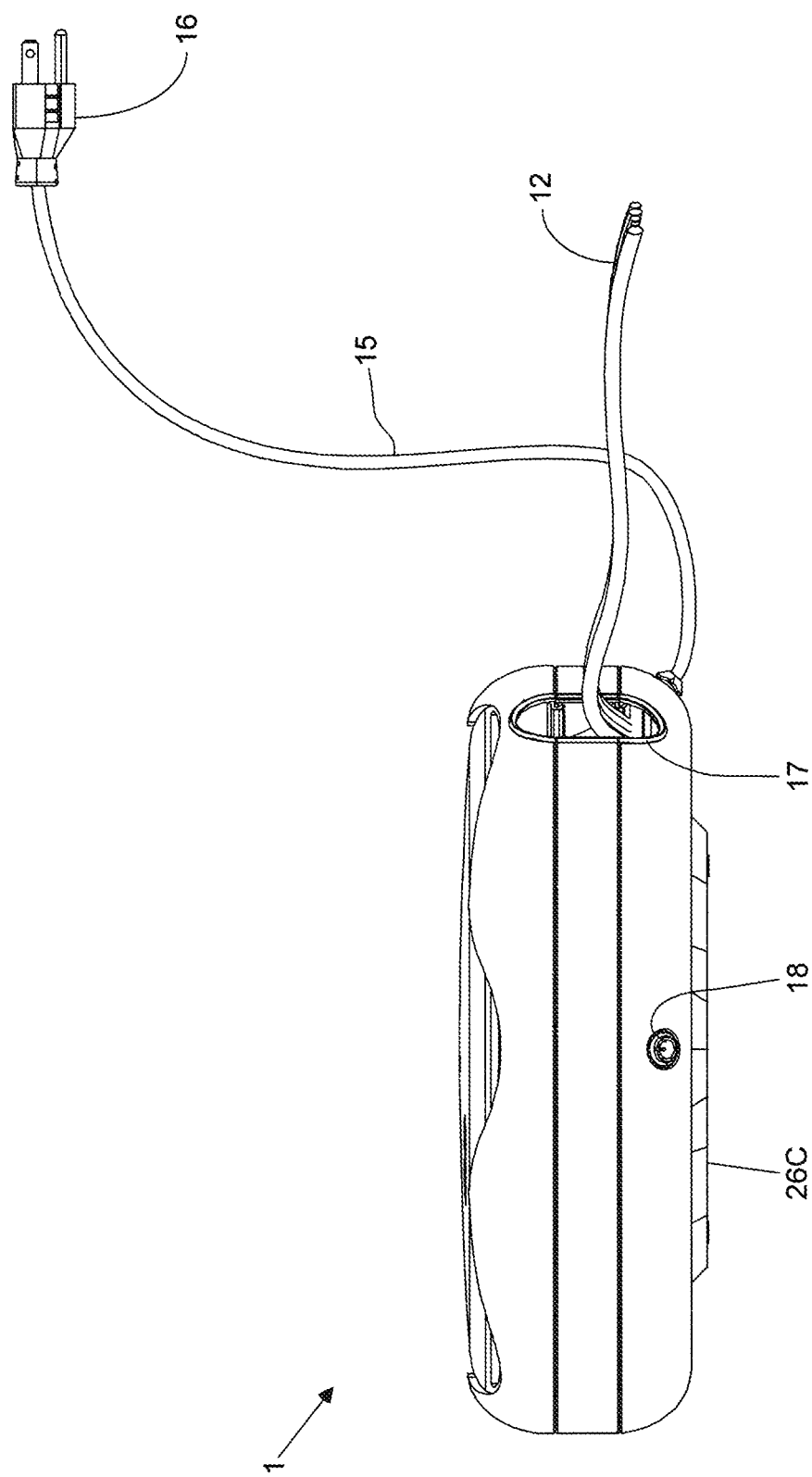

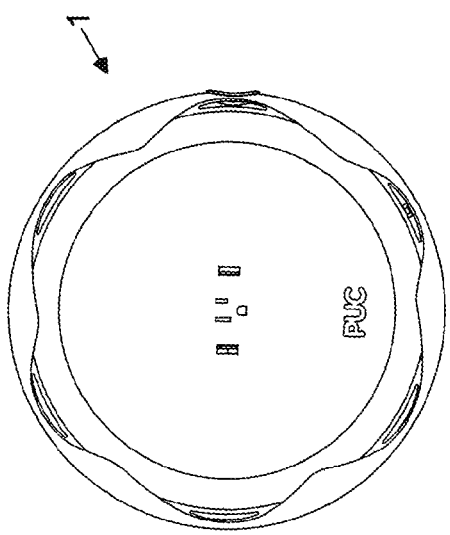
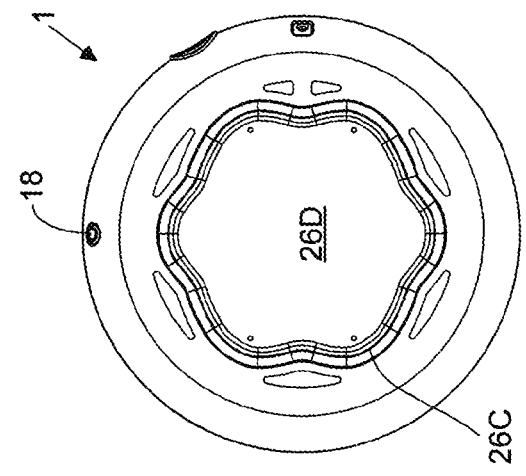
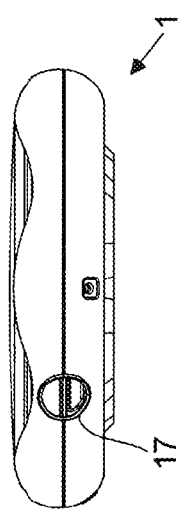
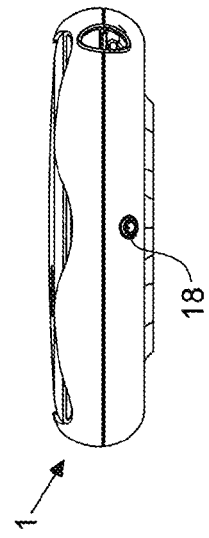
FIG. 3A
FIG. 3B
FIG. 3C
FIG. 3D
FIG. 3E

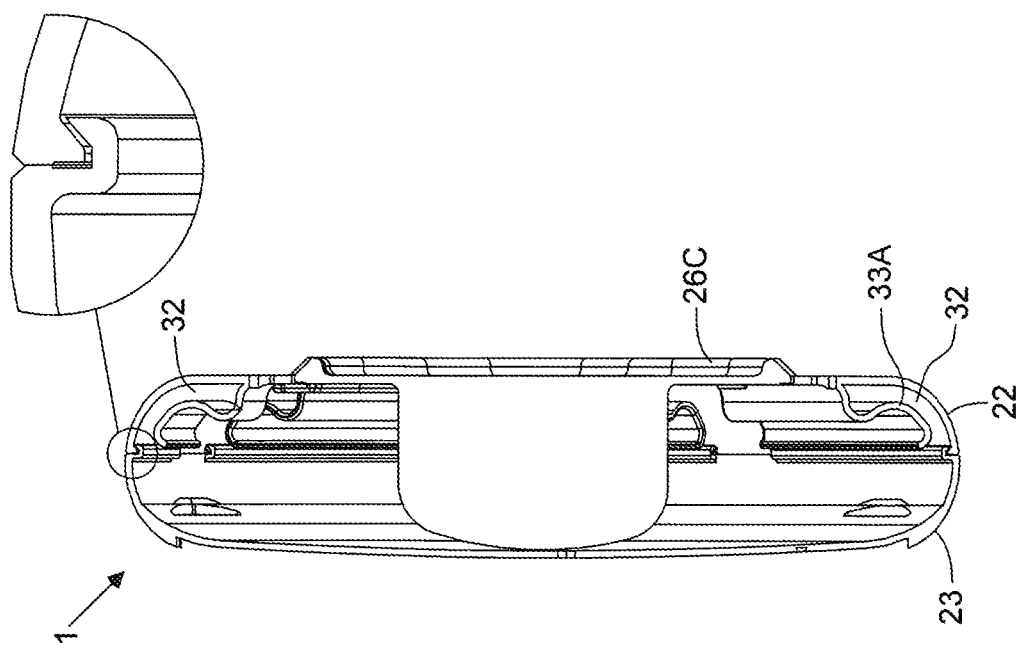
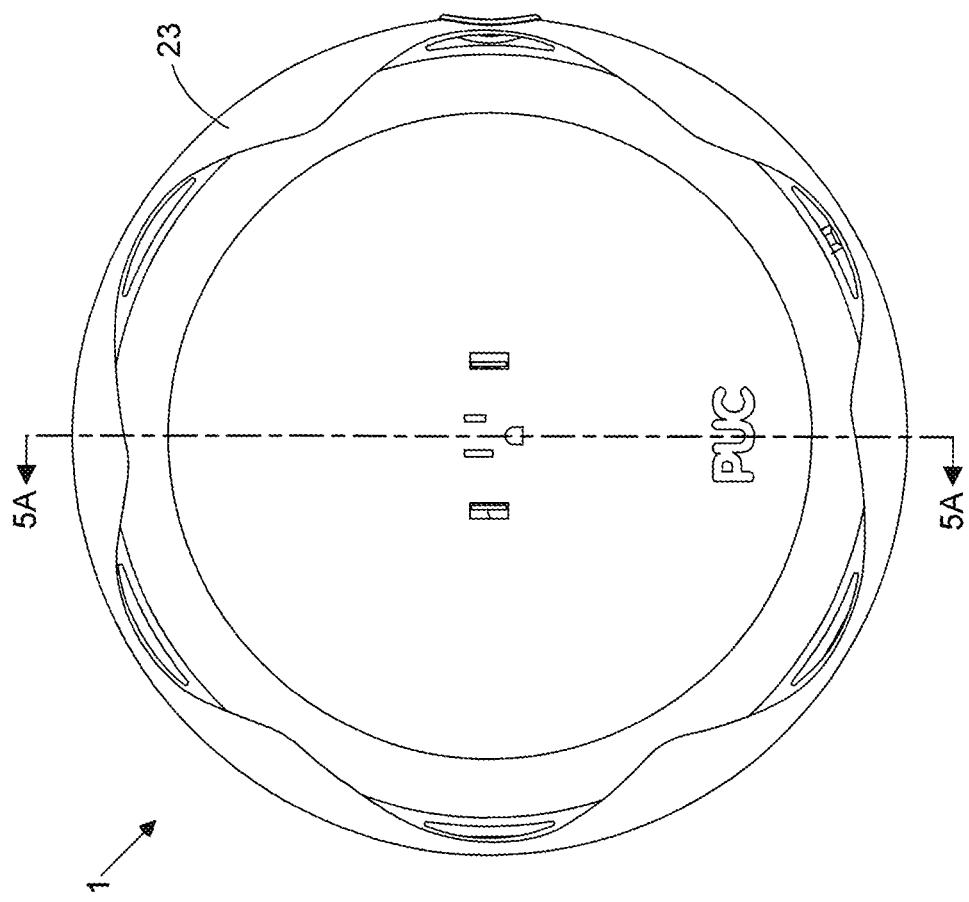

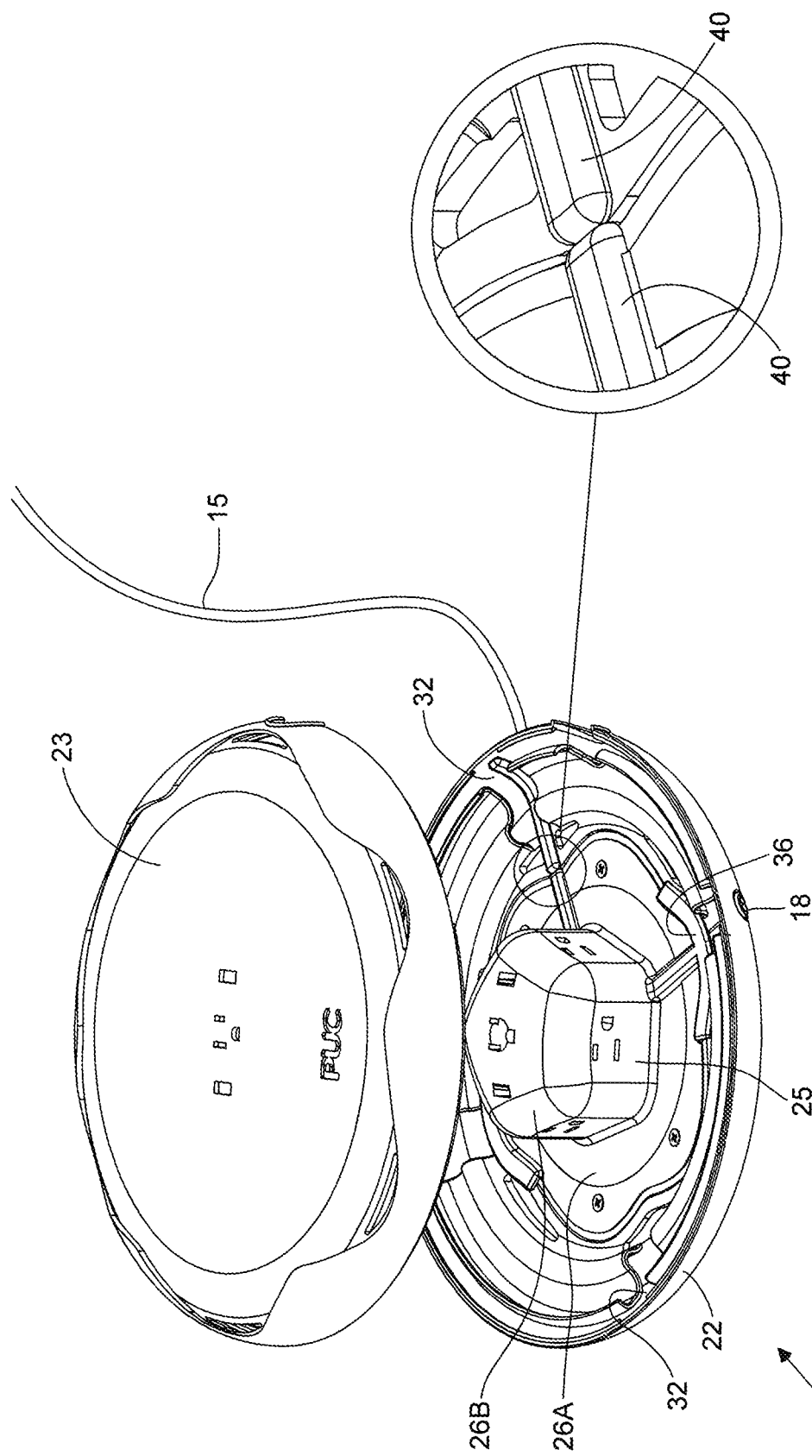

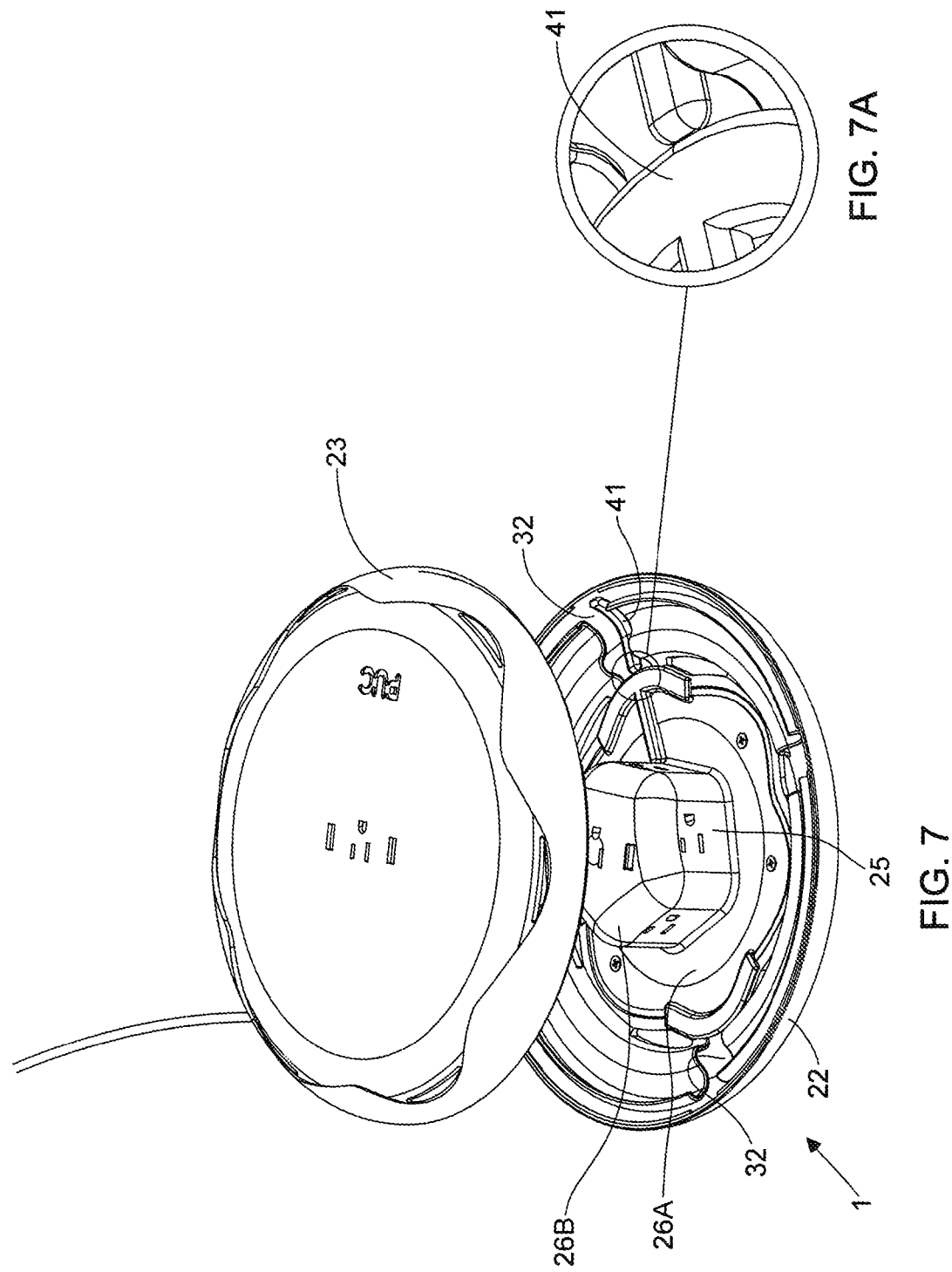

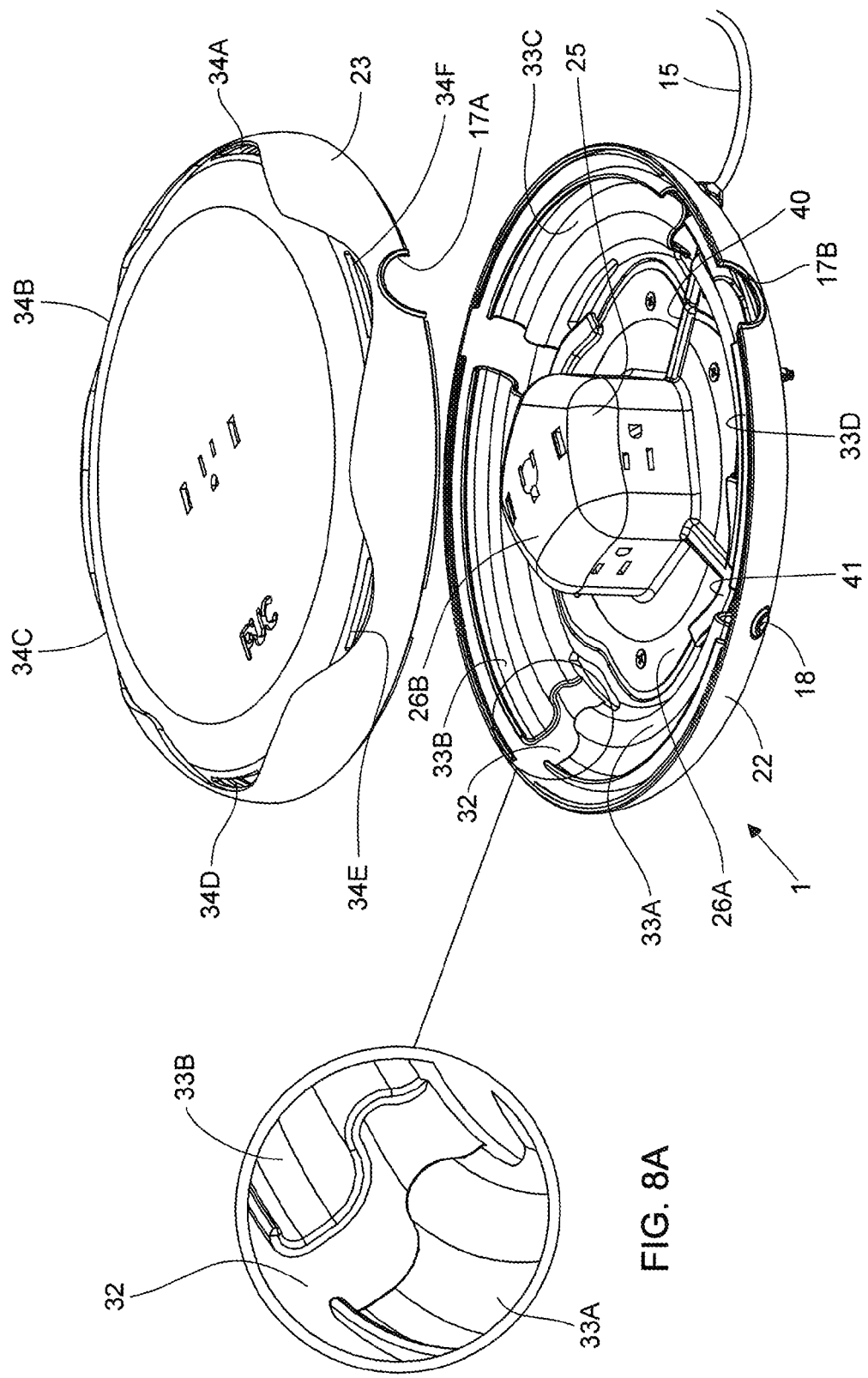

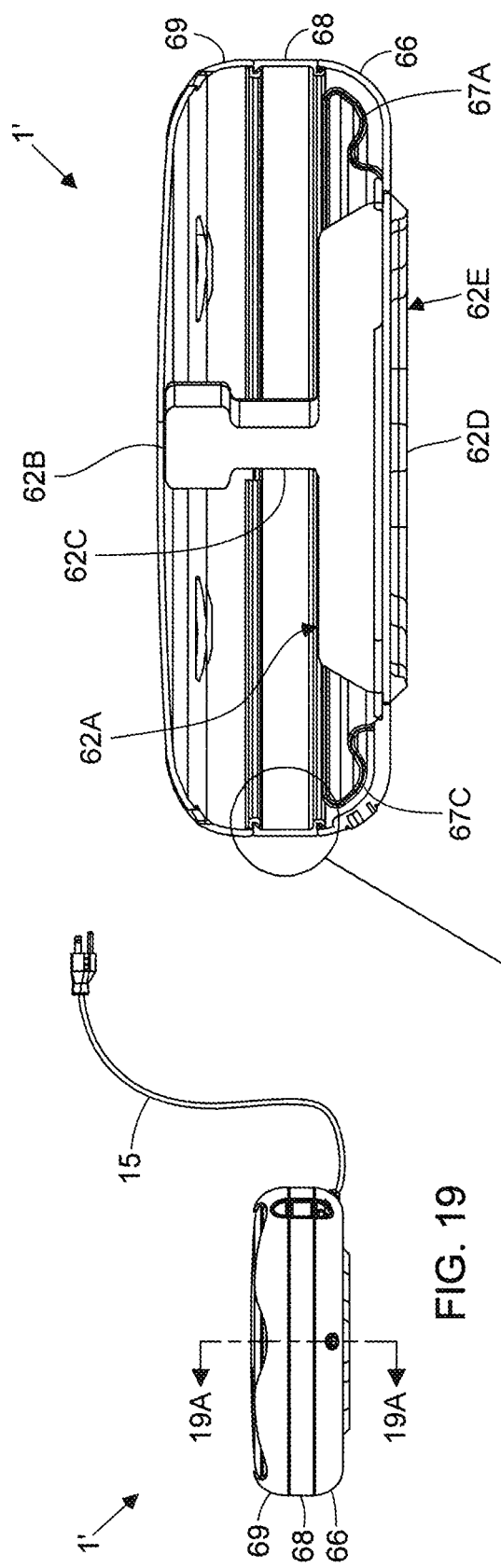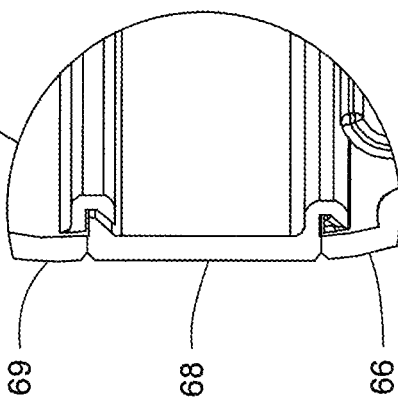
FIG. 19A
FIG. 19B
FIG. 19

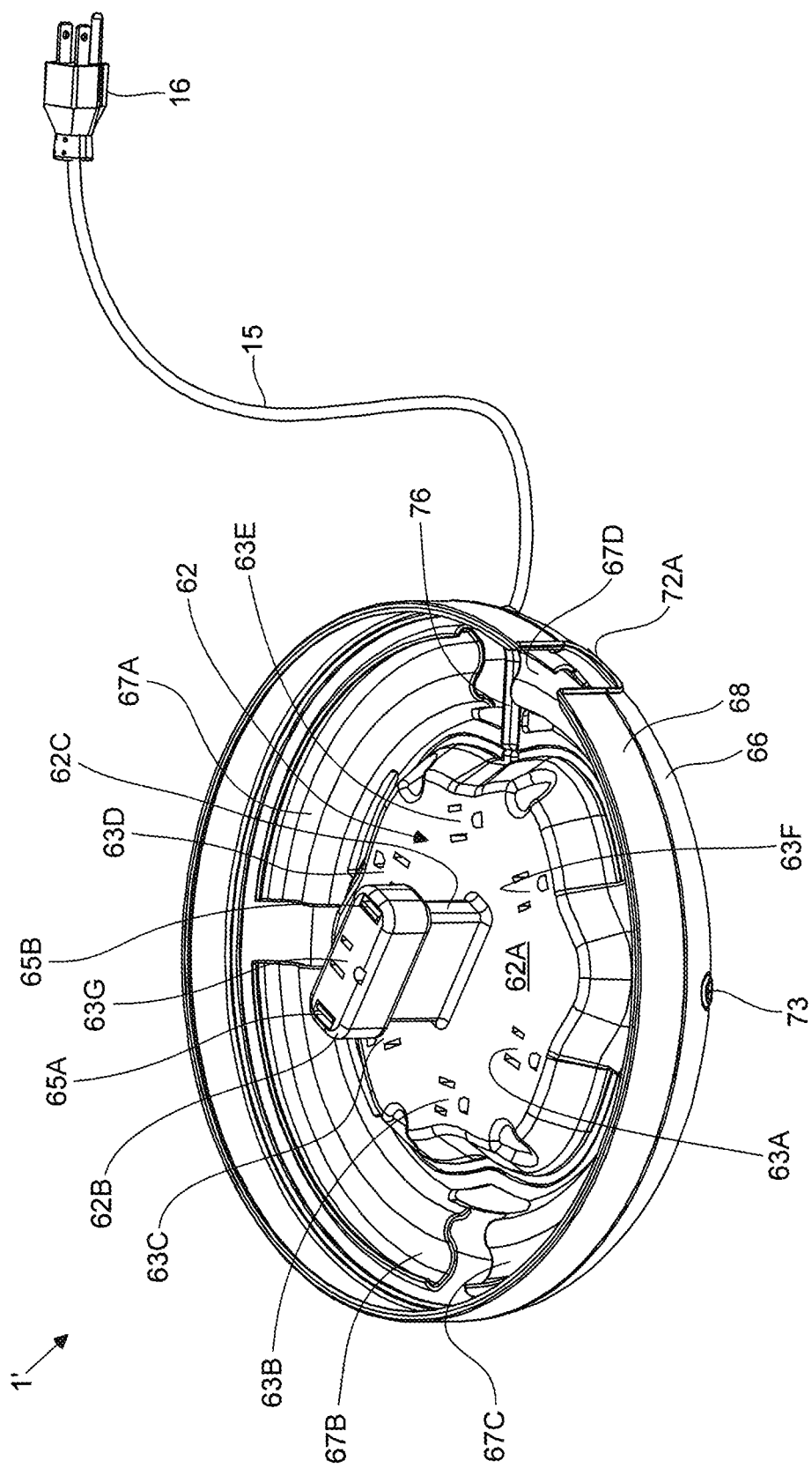

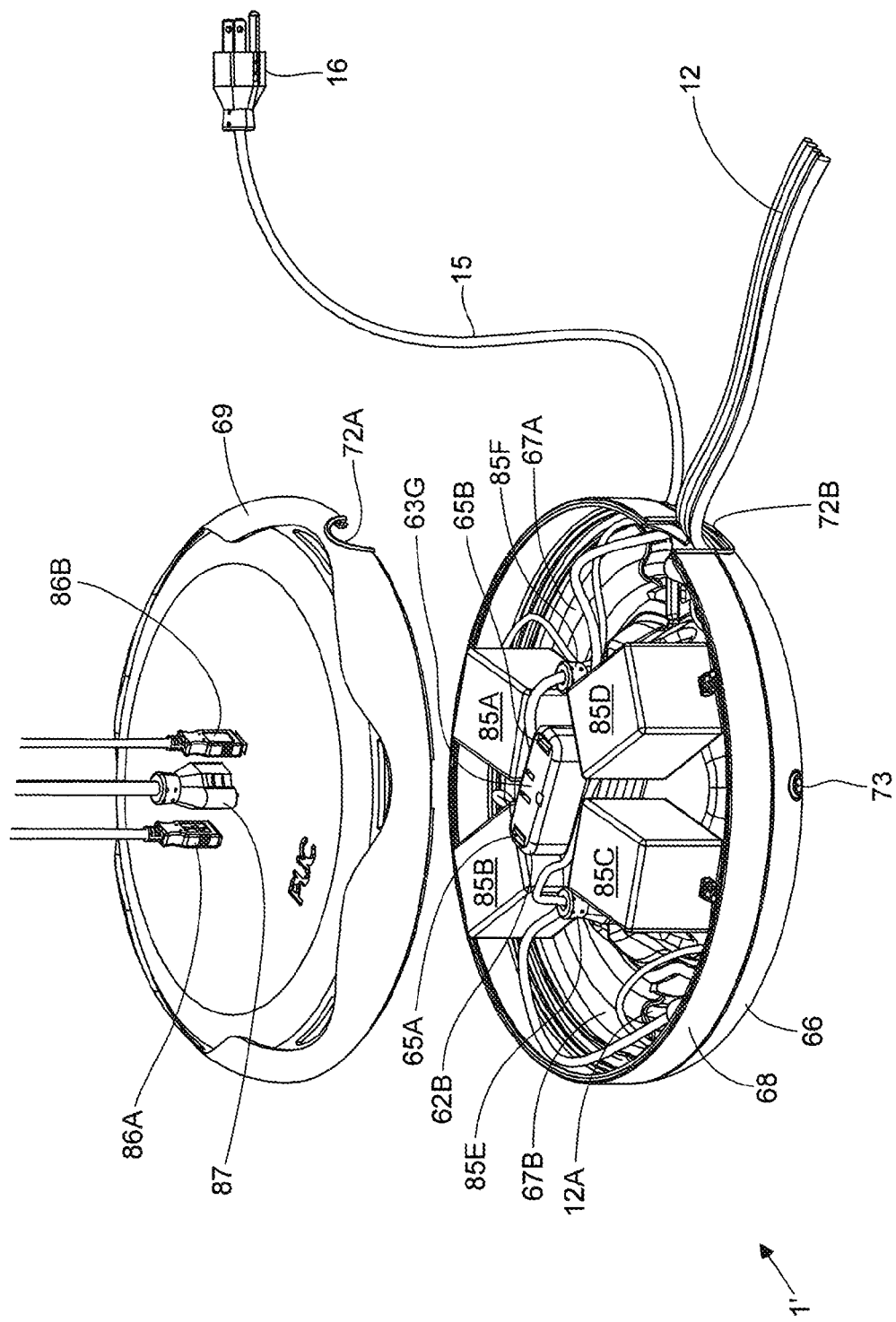

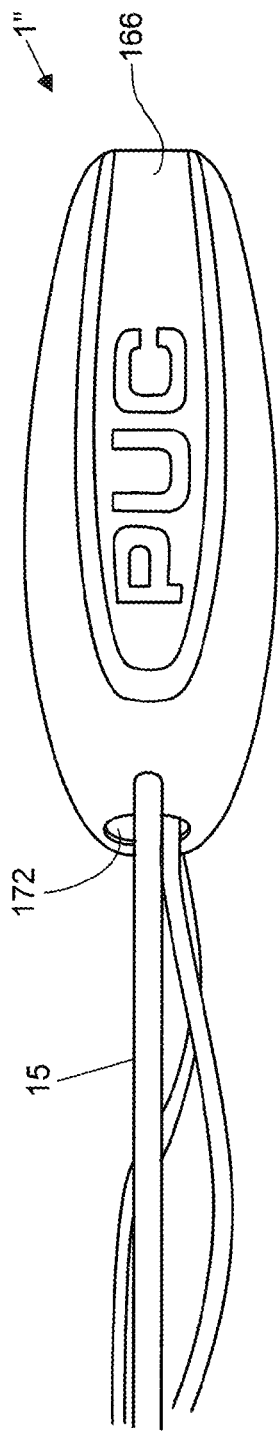
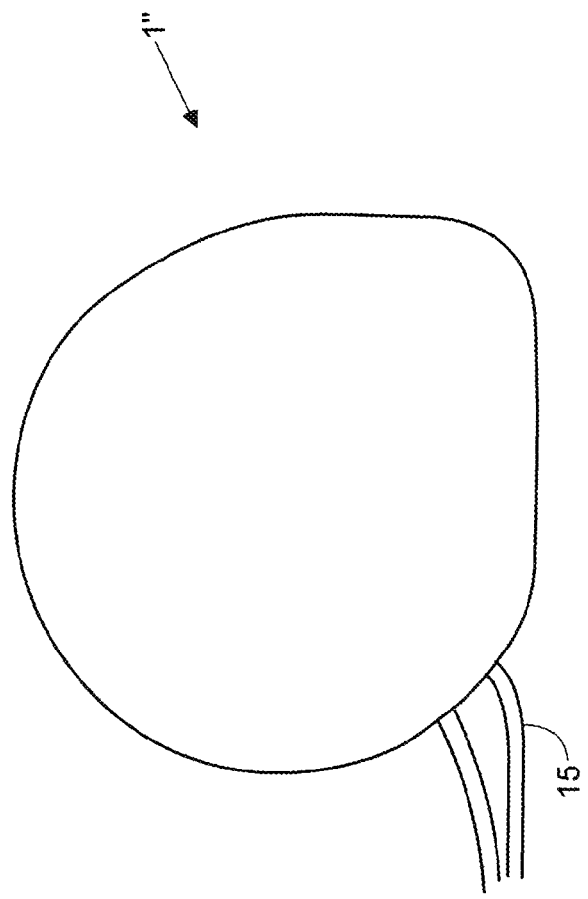
FIG. 33B
FIG. 33C

ELECTRICAL POWER SUPPLYING DEVICE HAVING A CENTRAL POWER-RECEPTACLE ASSEMBLY WITH A PENISULA-LIKE HOUSING STRUCTURE SUPPLYING ELECTRICAL POWER TO POWER PLUGS, ADAPTORS AND MODULES WHILE CONCEALED FROM VIEW DURING POWER SUPPLYING OPERATIONS

RELATED CASES

The present application is a Continuation of application Ser. No. 13/653,655 filed Oct. 17, 2012, which is a Continuation-in-Part (CIP) of application Ser. No. 13/275,437 filed Oct. 18, 2011, now U.S. Pat. No. 9,184,546; which is a CIP of application Ser. No. 12/586,746 filed Sep. 25, 2009, now U.S. Pat. No. 8,217,528; application Ser. No. 12/586,734 filed Sep. 25, 2009 now U.S. Pat. No. 8,193,658; application Ser. No. 12/586,735 filed Sep. 25, 2009, now U.S. Pat. No. 8,174,147; application Ser. No. 12/586,745 filed Sep. 25, 2009, now U.S. Pat. No. 8,159,085; and application Ser. No. 12/586,742 filed Sep. 25, 2009, now abandoned, each of which is commonly owned by PUCLine, LLC, and incorporated herein by reference as if fully set forth herein.

BACKGROUND OF INVENTION

Field of Invention

The present invention relates to new and improved methods of and apparatus for supplying electrical power to electrical appliances and managing the power cords and concealing the power adapters associated therewith in diverse environments, such as desktops, workstations, retail point of sale (POS) stations, home and office environments and the like, and anywhere multiple power receptacles are required.

Brief Description of the State of Knowledge in the Art

The use of electrical appliances having power cords and adapters is well known in the contemporary period. In any given work environment, such as a home office desk, countertop workstation or retail POS station, electrical power cords and associated power adapter plugs and mid-line type modules (e.g. transformer blocks) are often strewn about, creating a "rats' nest" type of environment, which is not only aesthetically unpleasant, but potentially hazardous, posing all sorts of risks to human beings inhabiting the environment.

Hitherto, numerous efforts have been made to manage the power cords and conceal the power adapters of electrical appliances employed in diverse environments. Examples of devices for this purpose are disclosed in U.S. Pat. Nos. 7,518,265; 7,501,580; 7,442,090; 7,436,087; 7,435,901; 7,399,199; 7,397,654; 7,361,050; 7,335,053; 7,329,152; 7,324,334; 7,318,567; 7,247,799; 7,247,798; 7,242,577; 7,239,892; 7,233,086; 7,223,122; 7,167,372; 7,083,421; 7,077,693; 6,966,791; 6,573,617; 6,486,407; 6,410,855; 6,315,604; 6,011,221; 5,589,718; 5,382,172; 4,731,029; 4,373,761; 2007/0235222; 2007/0111585; 2004/0160150; 2003/0121742; 2003/0066936; 20080113563; 20080111013; 20080302687; 20080194139; 20070180665; 20070111585; 20070295529; 20070039755; 20060196995 and D588,000; D560,609; D547,486; D542,123; D533,063; D520,951; D504,112; D502,924; D467,879; D467,877; D467,552; D467,246; D447,119; D446,504; D446,503; D446,189; D445,401; D445,400; D444,450; D443,591; wherein each said patent publication above is incorporated herein by reference.

While the above US patents and Publications disclose various kinds of devices for the purpose of supplying electrical power to appliances and managing the power cords and power adapters thereof, the designs of the devices disclosed and proposed in such patents and Publications do not make power cord management and power adapter concealment easy, and, in contrast, oftentimes impossible, when working with a relatively large number of electrical appliances in a given work environment. Consequently, the "rats' nest" problem is not sufficiently resolved in most applications, and results in power cable lengths which are not minimized along their designated routes in the workspace or environment, and many power adapters and unused electrical receptacles are not concealed in an aesthetically pleasing manner.

Therefore, there is a great need in the art for a new and improved method of and apparatus for supplying electrical power to electrical appliances, managing the excess length of appliance power cords, and concealing their power plugs and adapters in diverse environments, while overcoming the shortcomings and drawbacks of prior art methods and apparatus.

OBJECTS AND SUMMARY OF THE PRESENT INVENTION

It is therefore a primary object of the present invention to provide a new and improved method of and apparatus for supplying electrical power to electrical appliances and managing the power cords and concealing the power adapters associated therewith and unused electrical receptacles deployed in diverse environments, such as workstations, playstations, entertainment stations, retail POS stations, hotel rooms, guest rooms, cubicles, kitchens, traditional offices and wherever a multitude of power outlets are required, while overcoming the shortcomings and drawbacks of prior art methods and apparatus.

Another object of the present invention is to provide such an apparatus in the form of an electrical power supplying device (i) adapted for either floor, wall, shelf or inverted mounting, (ii) having a power-receptacle supplying structure supporting a plurality of electrical power receptacles for supplying electrical power to a plurality of electrical appliances, (iii) containing power plugs, power adapter plugs and/or mid-line type power adapter modules, and (iv) managing the excess length of power cords associated therewith.

Another object of the present invention is to provide such an electrical power supplying device, wherein a power cord management surface is disposed on the power-receptacle supplying structure, for taking up the excess length of power cords associated with such electrical appliances, while allowing the remaining portion of such power cords to pass through a power cord portal, and extend along a route to their corresponding electrical appliances.

Another object of the present invention is to provide such an electrical power supplying device, wherein electrical power plugs, power adapter plugs and power adapter modules/blocks are completely concealed behind a removable housing cover portion, to restrict unauthorized access thereto by children.

Another object of the present invention is to provide such an electrical power supplying device, which safely conceals and protects electrical power plugs, power adapter plugs and mid-line type power adapter modules/blocks, from liquid spills in diverse environments, such as at workstations, playstations, retail POS stations, hotels, guest rooms, cubicles, kitchens, traditional offices and wherever a multitude of power outlets are required.

Another object of the present invention is to provide such an electrical power supplying device, which allows excess power cords to be easily managed about a power-receptacle structure supporting a plurality of electrical power receptacles within a concealed 3D interior volume, while permitting power cords to exit/enter the housing through a power cord portal formed through the housing structure.

Another object of the present invention is to provide such an electrical power supplying device, which employs a centrally-located power-receptacle within a concealed space for receiving the electrical power plugs of electrical appliances, and within which excess power cord length is neatly managed.

Another object of the present invention is to provide such an electrical power supplying device, wherein a passive-type system of thermal management is employed to maintain the interior temperature within safe limits during operation.

Another object of the present invention is to provide a new and improved method of supplying electrical power to a plurality of electrical appliances, and managing appliance power cords using a single device that may be mounted on the floor, wall or other counter-top surface.

Another object of the present invention is to provide a new and improved method of managing the length of excess power cords of electrical appliances that are routed from a power supply device within an environment.

Another object of the present invention is to provide an electrical power supplying device having a central power-receptacle assembly for receiving the power plugs and/or power adapters associated with a plurality of electrical appliances, and a housing design for containing and concealing the same during power supply operations.

Another object of the present invention is to provide an electrical power-supplying device having a central power-hub assembly for receiving the power plugs and/or power adapters associated with a plurality of electrical appliances, and managing excess power cord length therewithin in a concealed manner.

Another object of the present invention is to provide a wall-mountable electrical power supplying device having a central power-hub structure for receiving the power plugs and/or power adapters associated with a plurality of electrical appliances, and a housing for containing and concealing the same during power supply operations.

Another object of the present invention is to provide an electrical power-supplying device which employs a central power-hub structure, and is adapted for mounting vertically, horizontally, diagonally, or in an inverted position, as the application requires or end-user desires.

Another object of the present invention is to provide an electrical power supplying device having a central power-hub structure for receiving the power plugs and/or power adapters associated with a plurality of electrical appliances, and thermal management system integrated within the device, for maintaining the temperature within the 3D interior volume of the device within safe operating limits during power supplying operations.

Another object of the present invention is to provide such electrical power-supplying device, wherein the thermal management system is realized as an electrically-passive type air ventilation system for passively cooling the 3D interior volume of the device during power supplying operations.

Another object of the present invention is to provide a method of cooling the 3D interior volume of a concealed electrical power supplying device containing power adapters for a plurality of electrical appliances deployed in diverse environments.

Another object of the present invention is to provide a novel method of supplying electrical power to a plurality of electrical appliances in an environment, while managing excess power cord therewithin.

These and other objects of invention will become apparent hereinafter and in the Claims to Invention appended hereto.

BRIEF DESCRIPTION OF THE DRAWINGS

In order to more fully understand the objects of the present invention, the following detailed description of the illustrative embodiments should be read in conjunction with the accompanying figure Drawings in which:

FIG. 2A is a first perspective view of the electrical power supplying device shown in FIGS. 1A through 1C;

FIG. 2B is a second perspective view of the electrical power supplying device shown in FIG. 1A through 1C;

FIG. 2C is an elevated side view of the electrical power supplying device shown in FIGS. 2A and 2B;

FIG. 3A is a first elevated side view of the electrical power supplying device shown in FIGS. 2A through 2C, without any power cords or power adapters contained and concealed therewithin;

FIG. 3B is a second elevated side view of the electrical power supplying device shown in FIGS. 2A through 2C, without any power cords or power adapters contained and concealed therewithin;

FIG. 3C is a third elevated side view of the electrical power supplying device shown in FIGS. 2A through 2C, without any power cords or power adapters contained and concealed therewithin;

FIG. 3D is a plan view of the top surface of the electrical power supplying device shown in FIGS. 2A through 2C, without any power cords or power adapters contained and concealed therewithin;

FIG. 3E is a plan view of the bottom surface of the electrical power supplying device shown in FIGS. 2A through 2C, without any power cords or power adapters contained and concealed therewithin;

FIG. 5 is a plan view of the electrical power supplying device shown in FIGS. 2A through 2C;

FIG. 5A is a cross-sectional view of the electrical power supplying device taken along line 5A-5A in FIG. 5;

FIG. 6 is a first perspective view of the electrical power-supplying device shown in FIGS. 2A through 2C, with its housing cover portion lifted off its housing base portion;

FIG. 6A is an expanded view of the power cable channel leading from the external power cord of the device towards its central power-hub assembly shown in FIG. 6;

FIG. 7 is a second perspective view of the electrical power-supplying device shown in FIGS. 2A through 2C, with its housing cover portion lifted off its housing base portion;

FIG. 7A is an expanded view of the power button cable channel leading from the externally-mounted power button on the device, towards its central power power-hub assembly, shown in FIG. 7;

FIG. 8 is a third perspective view of the electrical power-supplying device shown in FIGS. 2A through 2C, with its housing cover portion lifted off its housing base portion;

FIG. 8A is an expanded view of the cable management channel leading extending along the interior of the housing base portion, around the central power power-hub assembly, shown in FIG. 8, for releasably retaining excess power cable within the housing;

FIG. 19 is an elevated side view of the electrical power supplying device shown in FIGS. 17A and 17B;

FIG. 19A is a cross-sectional view of the electrical power supplying device shown in FIGS. 17A and 17B, taken along line 19A-19A in FIG. 19;

FIG. 19B is an enlarged section indicated in FIG. 19A, illustrating how the housing cover portion snap-fits into the center housing portion, and the housing base portion snap-fits into the center housing portion;

FIG. 20 is a perspective view of the electrical power supplying device shown in FIGS. 17A and 17B, but with its housing cover portion removed, and without any power plugs or adapters plugged into the central power-hub assembly;

FIG. 25 is a perspective view of the electrical power supplying device shown in FIG. 24, showing the housing cover portion being attached to the housing base portion, with power plugs and adapters plugged into the central power-hub assembly;

FIG. 33B is an elevated side view of the electrical power supplying device of FIGS. 26A and 26B, shown mounted horizontally on a horizontal surface, containing and concealing a plurality of power adapter and plugs, and with the excess power cord of the appliances managed within the housing, and extending out the power cord portal;

FIG. 33C is a plan view of the electrical power supplying device of FIGS. 26A and 26B, shown mounted horizontally on a horizontal surface, containing and concealing a plurality of power adapter and plugs, and with the excess power cord of the appliances managed within the housing, and extending out the power cord portal;

DETAILED DESCRIPTION OF THE ILLUSTRATIVE EMBODIMENTS OF THE PRESENT INVENTION

Figure 1A:
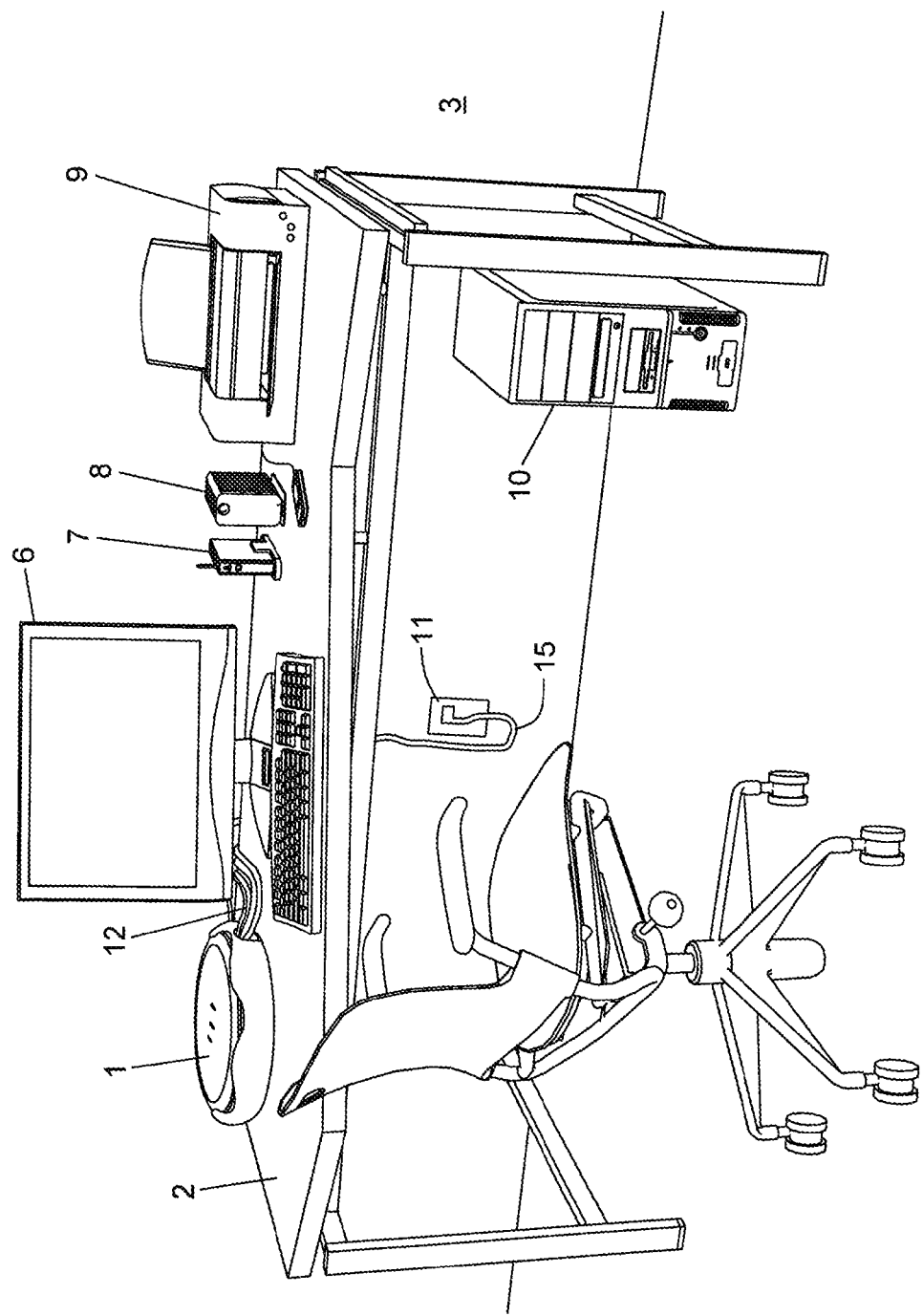
FIG. 1A is a perspective view of a first illustrative embodiment of the electrical power supplying device of the present invention is deployed on the surface of a desktop to supply electrical power to a number of electrical appliances present within the environment.

In general, the present invention provides a new and improved method of and apparatus for supplying electrical power to electrical-energy consuming appliances, and managing the power cords and concealing the power plugs and power adapters thereof, and unused receptacles, when employed in diverse environments, such as workstations, playstations, entertainment stations, retail POS stations, hotel rooms, guest rooms, cubicles, kitchens, traditional offices and wherever a multitude of power outlets are required, and the like.

In a first illustrative embodiment, depicted in FIGS. 1A through 15, the apparatus is realized in the form of an electrical power supplying device 1 that can be mounted on or under the desktop 2, or on a wall-surface 3, and supplied with electrical power through a flexible power supply cord 15, plugged into a standard 120 Volt power receptacle 11 by power plug 3.

In a second illustrative embodiment, depicted in FIGS. 16 through 26, the apparatus is realized in the form of a desktop-supported electrical power supplying device 1' that is supplied with electrical power through a flexible coiled power supply cord 15, also plugged into a 120 Volt power receptacle 11 by its power plug 16. These illustrative embodiments of the present invention will now be disclosed and described in greater detail hereinafter.

The Electrical Power Supplying Device According to a First Illustrative Embodiment of the Present Invention In FIG. 1A, a desktop-supported power supplying device 1 is supplied with electrical power through a flexible power cord 15 whose electrical plug 16 is plugged in a standard electrical power receptacle 11. As shown, a number of different electrical power consuming appliances (e.g. LCD 6, WIFI power-hub 5, backup hard-drive 8, printer 9, and computer CPU 10) are powered by device 1 through a plurality of power cords 12, routed through the environment into the device 1 via its power cord portal 17. The device 1 powered up by depressing power switch/ON-OFF indicator 18 mounted on the housing base portion 22.

Figure 1B:
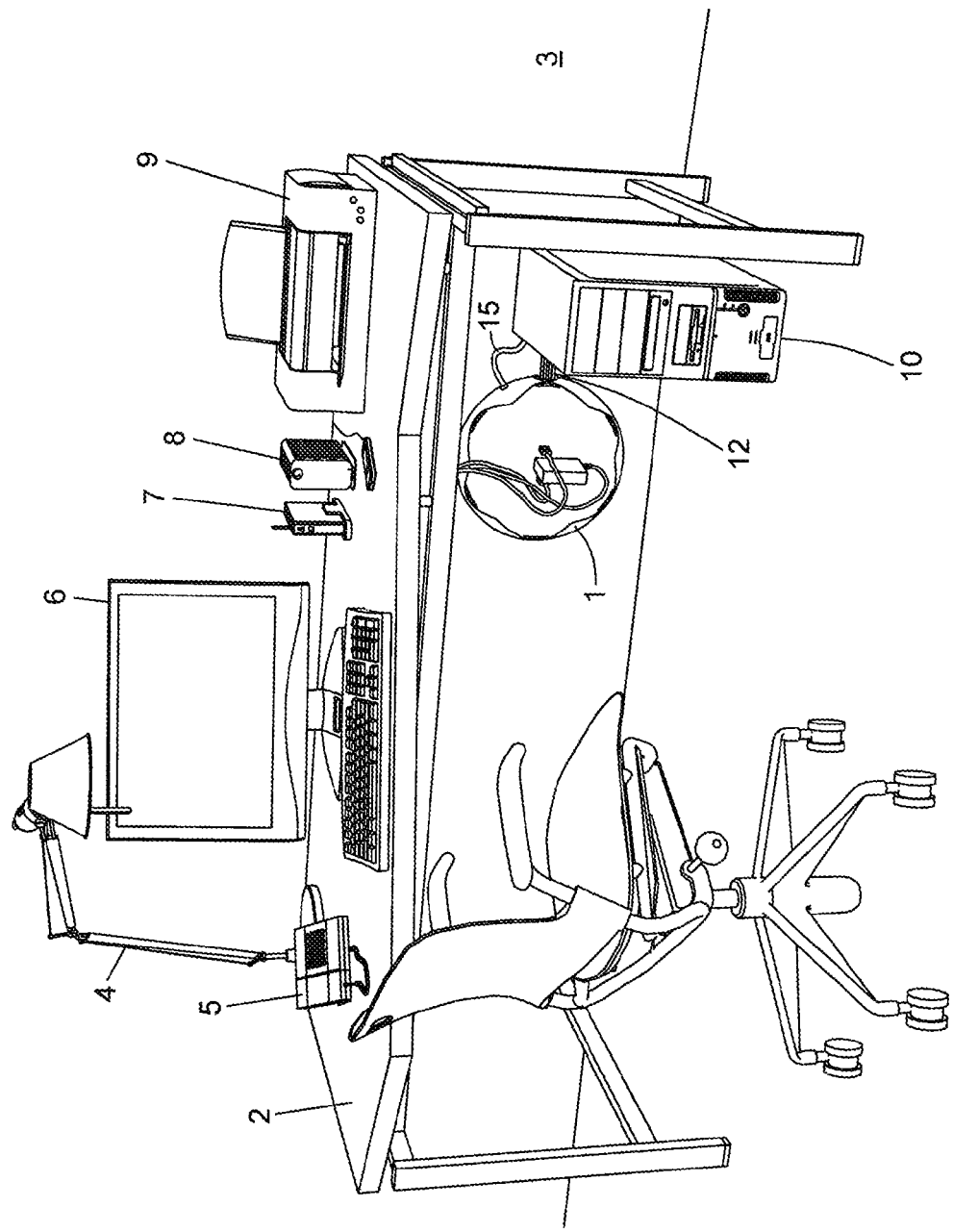
FIG. 1B is a perspective view of the first illustrative embodiment of the electrical power supplying device of the present invention is deployed on a wall surface, adjacent a desktop, to supply electrical power to a number of electrical appliances present within the environment.

In FIG. 1B, a wall-supported power supplying device 1 is supplied with electrical power through a flexible power cord 15 whose electrical plug 16 is plugged in a standard electrical power receptacle 11. As shown, a number of different electrical power consuming appliances (e.g. lamp 4, phone 5, LCD 6, WIFI power-hub 7, backup hard-drive 8, printer 9, and computer CPU 10) are powered by device 1 through a plurality of power cords 12, routed through the environment into the device 1 via its power cord portal 17.

Figure 1C:
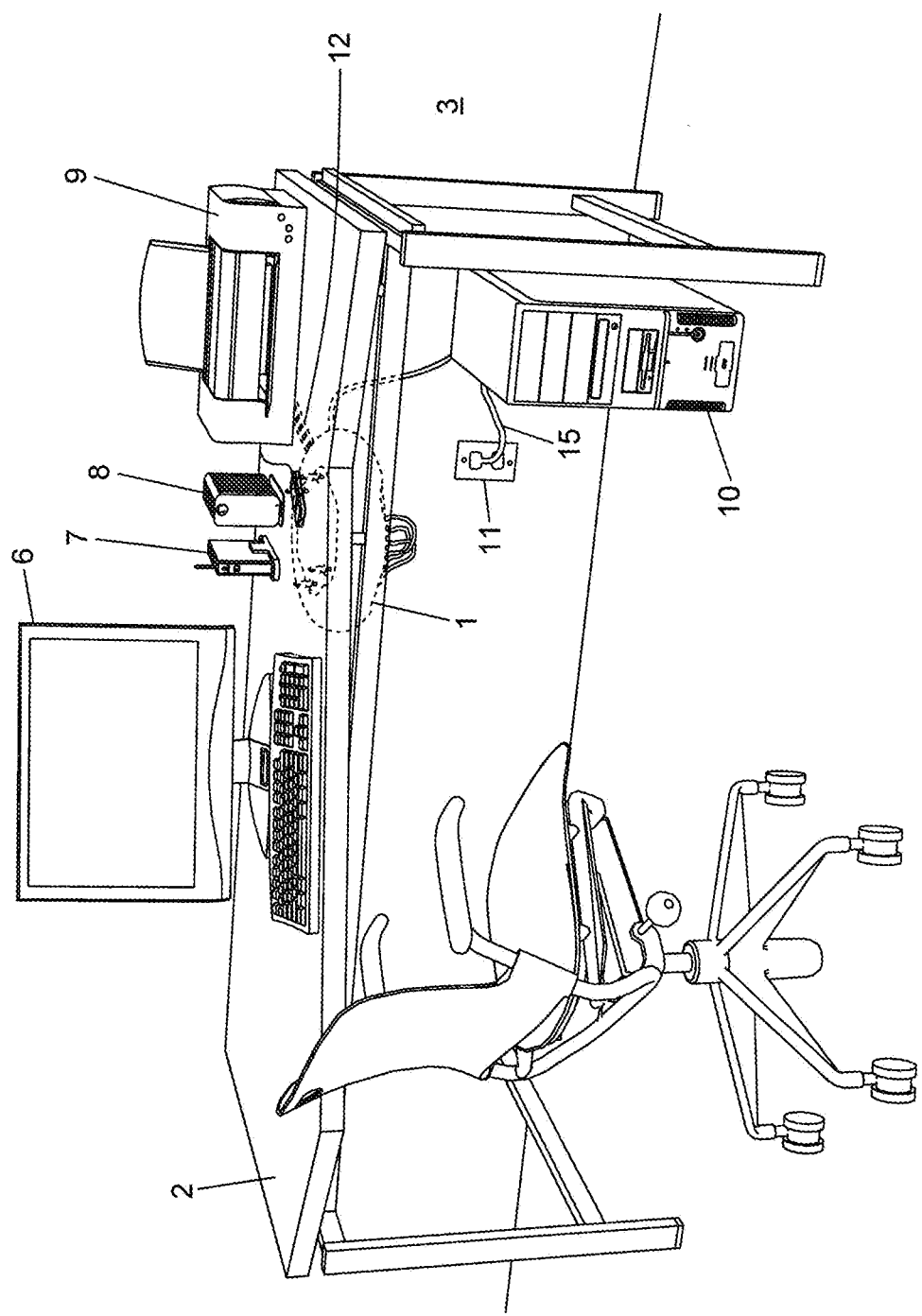
FIG. 1C is a perspective view of the first illustrative embodiment of the electrical power supplying device of the present invention is deployed on the underside surface of a desk, to supply electrical power to a number of electrical appliances present within the environment.

In FIG. 1C, an under-the-desktop-supported power supplying device 1 is supplied with electrical power through a flexible power cord 15 whose electrical plug 16 is plugged in a standard electrical power receptacle 11. As shown, a number of different electrical power consuming appliances (e.g. lamp 4, phone 5 LCD 6, WIFI power-hub 7, backup hard-drive 8, printer 9, and computer CPU 10) are powered by device 1 through a plurality of power cords 12, routed through the environment into the device 1 via its power cord portal 17.

Alternatively, as shown in FIGS. 2A and 2B, the electrical power supplying device 1 can be supported on a horizontal surface (e.g. floor surface) or vertical surface, and provides external access to an external power receptacle 19 and a pair of USB power ports 20 and 21, while a bundle of power cables 12 from electrical appliances enter/exit the power cable portal 17 provided on the side of the device of the present invention.

As shown in FIGS. 2A through 4B, the electrical power supplying device 1 comprises an assembly of components, namely: a central power-hub assembly 25 having a central power-hub structure 26 supporting a first plurality of electrical receptacles 27A through 27E on its outer surface, and electrical power receptacle 19 and of USB power ports 20 and 21 supported on the top surface of the power-hub structure 26; a flexible electrical power cord 15 connected to power port 28, for supplying primary electrical power to the device through the central power-hub structure and all electrical appliances connected to it, in accordance with the principles of the present invention; a housing base portion 22, a housing cover portion 23; and a set of four pliant power cord management channels (i.e. cord wrap guides) 33A through 33D.

As shown in FIGS. 4A, 4B, 5A and 6, the housing base portion 22 comprises: a central aperture 22A, within which the central power-hub structure (e.g. assembly) 25 is supported and installed in the aperture 22A, via a snap-fit connection using foot flange 26C. As shown, the housing base portion 22 further comprises: a 3D interior volume with geometrical dimensions suitable for containing a group of power adapters, power plugs and mid-wire power transformer blocks 30A through 30E as shown; air circulation vents 31A through 31D on the base panel to allow air currents to flow therethrough during device operation and facilitate cooling of its interior space; and an end aperture 12B on the end of the housing base portion, for allowing a bundle of power cords 12 to pass therethrough.

As shown in FIGS. 4A, 4B, 5A and 6, the housing cover portion 23 is adapted to slide over and attach to the upper portion of the housing base portion 22 and snap into position, for covering and concealing the central power-hub structure 25 and any power adapter blocks, plugs and adapters 30A through 30E being stored within the 3D interior volume of the base portion of the housing.

As shown in FIGS. 5A, 6, 7, 8 and 8A, the pliant (i.e. flexible) power cord management channels (i.e. cord wrap guides) 33A through 33D, are installed about the perimeter of the central power-hub structure 25, and anchored on its inside diameter (closet towards the central power hub structure 25), while being free, on the outer diameter, to be picked or lifted up so that excess power cord 12A can be dropped down into the cord wrap guides all around the perimeter of the central power-hub structure 25, within the housing base portion 22, so that the pliant cord wrap guides neatly manage excess power cord length within the device 1.

As shown, the housing cover portion 23 also comprises: (i) air vents 34A through 34E for passage of warm (i.e. heated) air and providing ventilation to the 3D interior volume of the device; (ii) an end aperture 17A on the edge of the cover portion, and spatially aligned with end aperture 17B on the housing base portion, for forming a power cable portal 17 that allows the passage of electrical cords therethrough 17; and (iii) apertures 35 for providing access to the exterior power receptacle 19 and USB power ports 20 and 21 supported within the central power-hub structure 25.

Figure 10:
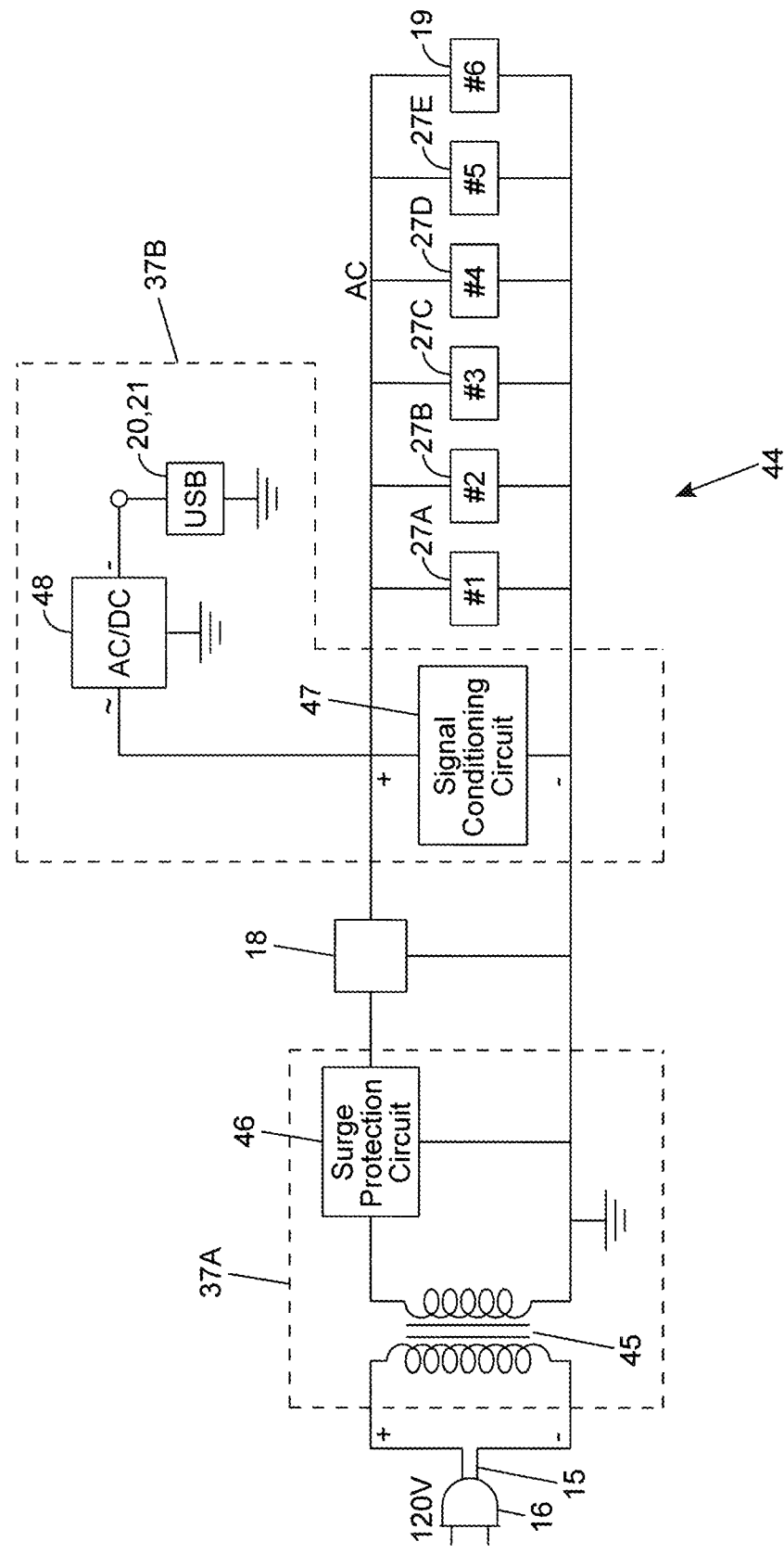
FIG. 10 is a schematic representation of the electrical and electronic components supported on the power-hub assembly shown in FIGS. 2A through 3E.

Within the power-hub structure 25, the electrical receptacles 19, 27A through 27F and electronic circuit boards 37A and 38B are snap-fit mounted into mounting brackets within the interior of the power post housing 26 along with electrical wiring among electrical and circuit board components, making the necessary interconnections as specified in FIG. 10.

Figure 11:
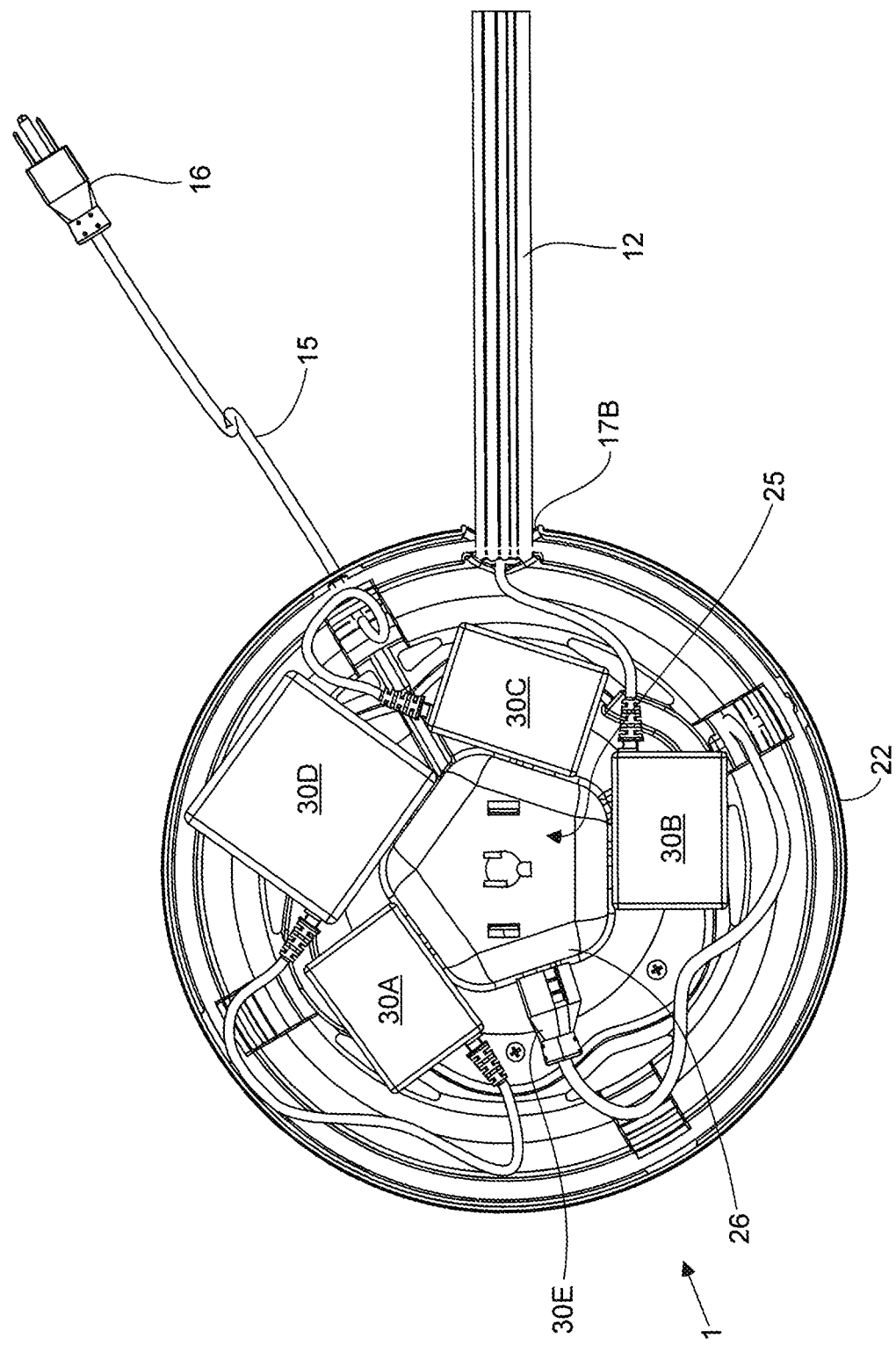
FIG. 11 is a plan view of the electrical power supplying device shown in FIGS. 2A through 2C, with its housing cover portion completely removed from the housing base portion, and showing a plurality of power adapters and power plugs plugged into electrical receptacles within the central power power-hub assembly.
Figure 12:
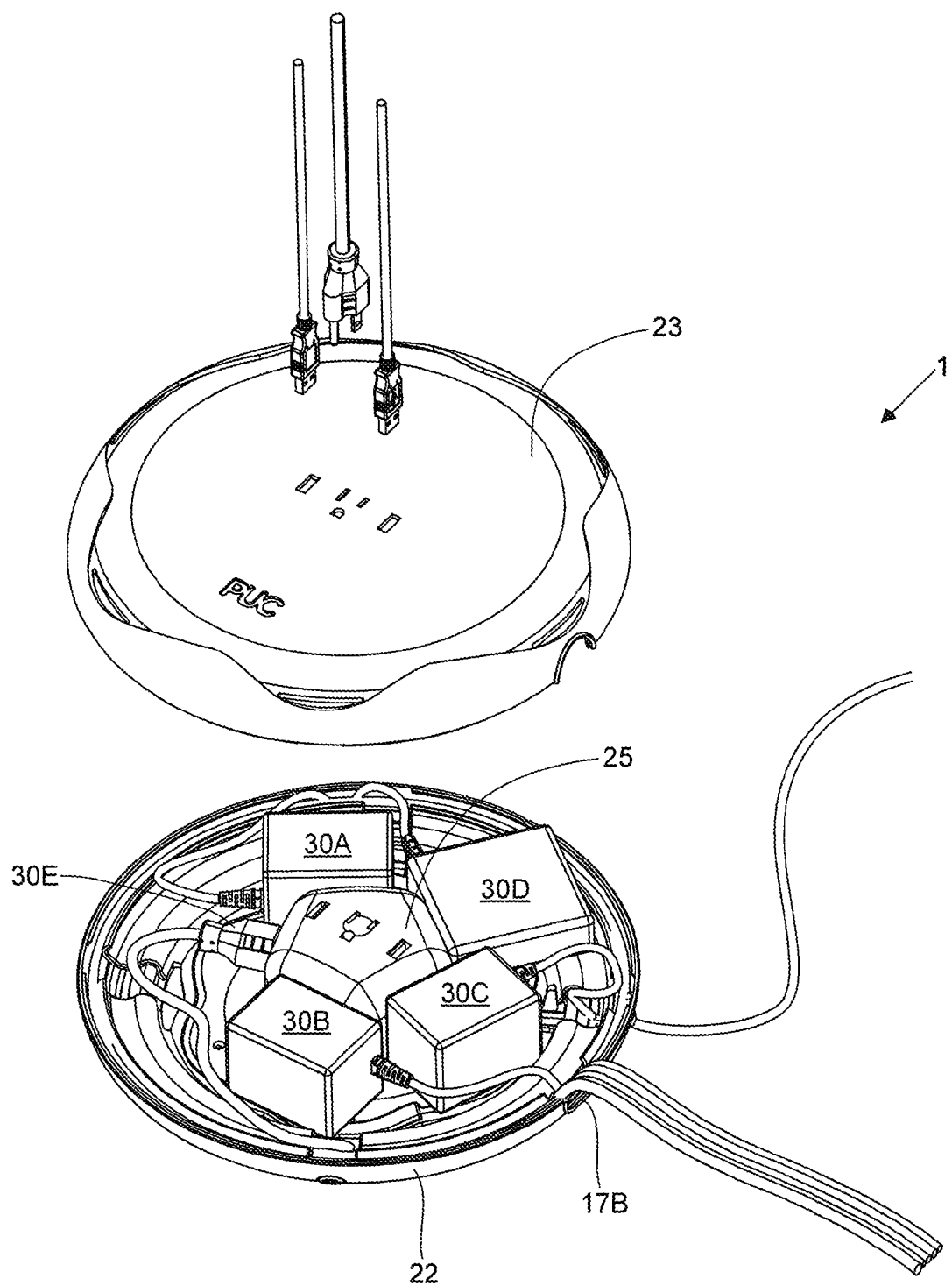
FIG. 12 is a perspective view of the electrical power-supplying device shown in FIG. 11, with the housing cover portion being mounted upon the housing base portion, to contain and conceal a plurality of power adapters and power plugs plugged into electrical receptacles within the central power power-hub assembly.

As shown in FIGS. 11 and 12, the housing cover portion 23 can be easily lifted off the housing base portion 22 of the power supplying device to reveal a number of features, namely: (i) electrical power provided to a number of electrical appliances supported at the workstation of FIGS. 1A, 1B and 1C; (ii) several power adapter blocks 30A through 30D supported about the central power-hub structure 25; and (iii) the excess length of a plurality of electrical cords 12A, associated with the electrical appliances, being neatly managed about the cord wrap guides 33A through 33D in accordance with the principles of the prevent invention, and ultimately extending out the power cord portal 17.

Figure 4A:
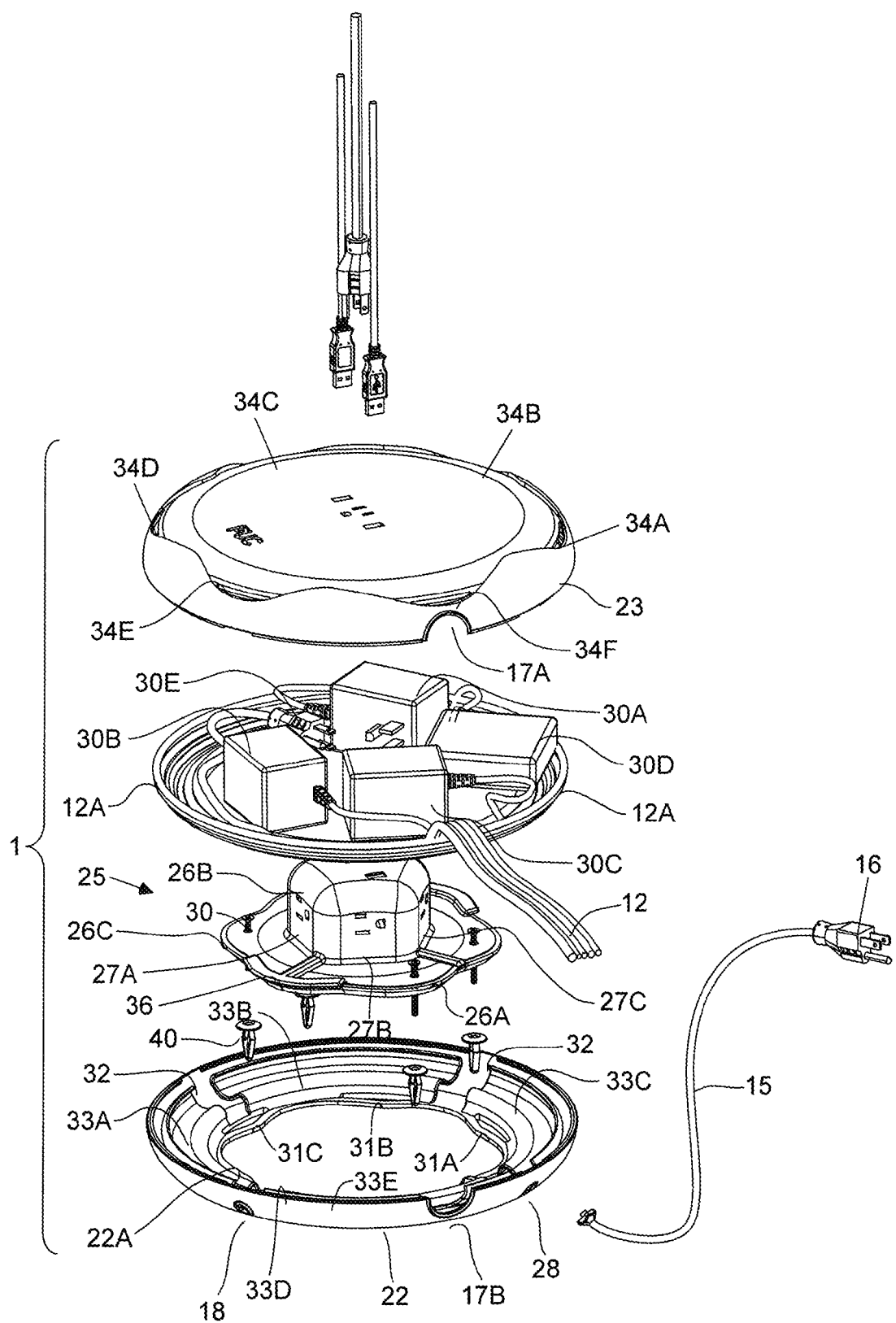
FIG. 4A is a first exploded view of the electrical power supplying device shown in FIGS. 2A through 2C.
Figure 4B:
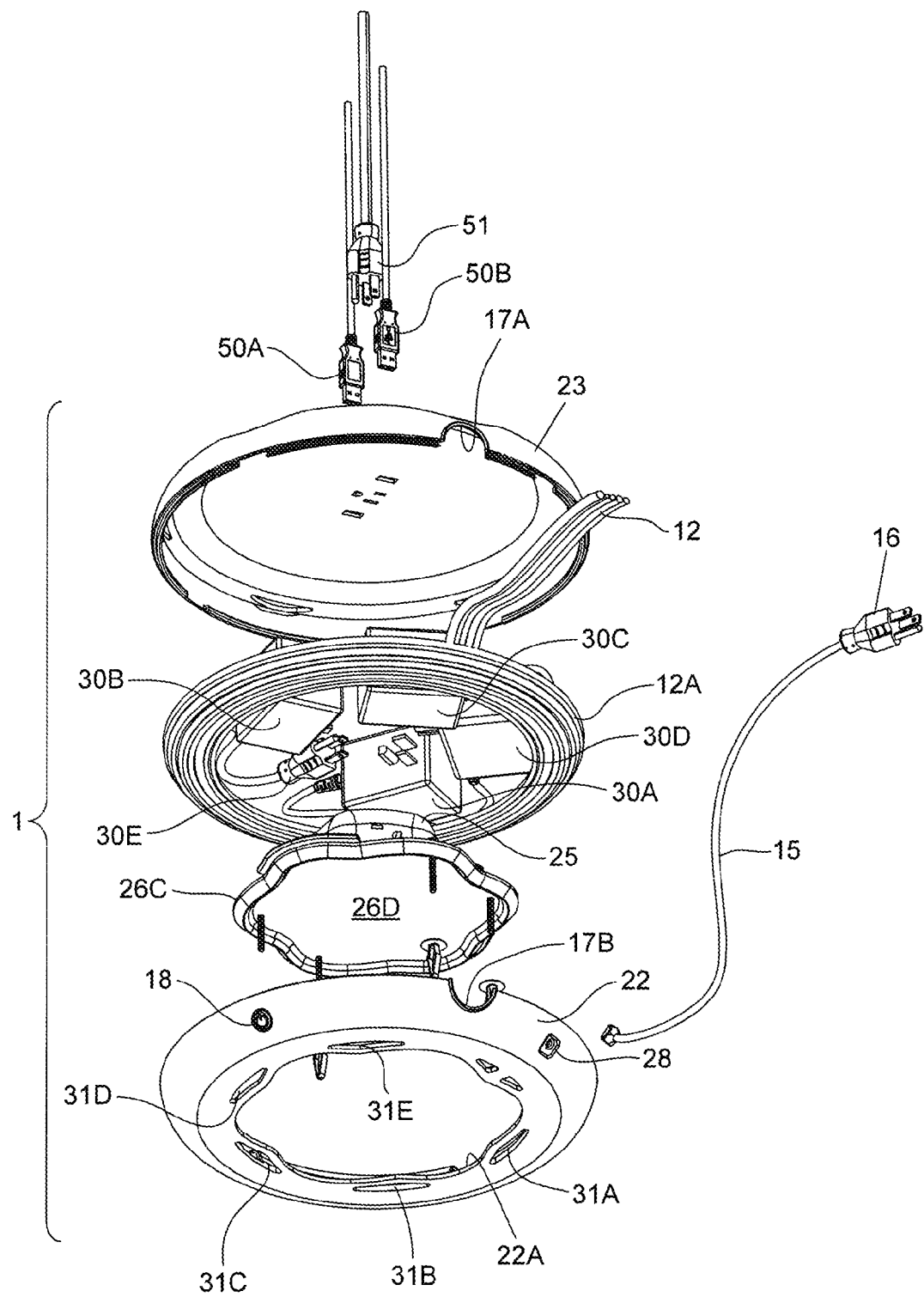
FIG. 4B is a second exploded view of the electrical power supplying device shown in FIGS. 2A through 2C.

As best shown in the exploded diagrams of FIGS. 4A and 4B, the power-hub assembly 25 comprises: a substantially planar base portion 26A; central hub portion 26A extending from the substantially planar base portion 26A and containing a plurality of electrical receptacles 19, 27A through 27E, an electronic PC circuit boards 37A and 37B, electrical components and electrical conductors (e.g. wires or bus bars) specified in FIG. 10; a foot flange 26C, extending about the substantially planar base portion 27B, for snap fitting into the central aperture 22A of the housing base portion 22, as shown in FIGS. 4A, 4B, 5A, and 6.

As shown in FIG. 6, the housing cover portion 23 is removed from the electrical power-supplying device, and there are no electrical appliances connected to and powered by the device. Also, FIGS. 6 and 6A reveals a number of features: (i) that the electrical receptacles 19, 27A through 27E are arranged about the centralized power-hub 25 to optimize space within the interior volume of the device, and accommodate the storage of power adapters, modules and plugs formed at the terminal portions of appliance power cords; and (ii) the cable channel 40 leading from the external power cord 15 of the device, towards its central power power-hub assembly 25 shown in FIG. 6, for interconnection with the power circuitry illustrated in FIG. 10. FIG. 6A illustrates the geometry of this channel in the illustrative embodiment.

FIGS. 7 and 7A reveal the power button cable channel 41 leading from the externally-mounted power button 18 on the device, towards its central power power-hub assembly 25, shown in FIG. 7, for interconnection with the power circuitry illustrated in FIG. 10. FIG. 7A illustrates the geometry of this channel in the illustrative embodiment.

FIGS. 8 and 8A show the cord wrap guides 33A through 33D extending along the interior of the housing base portion, covering the cable management channels 32 extending all around the central power power-hub assembly 25, shown in FIG. 8, for releasably retaining excess power cable 12A within the base portion of the housing. FIG. 8A illustrates the geometry of the power cord wrap guides and cable management channel of the illustrative embodiment.

Figure 9A:
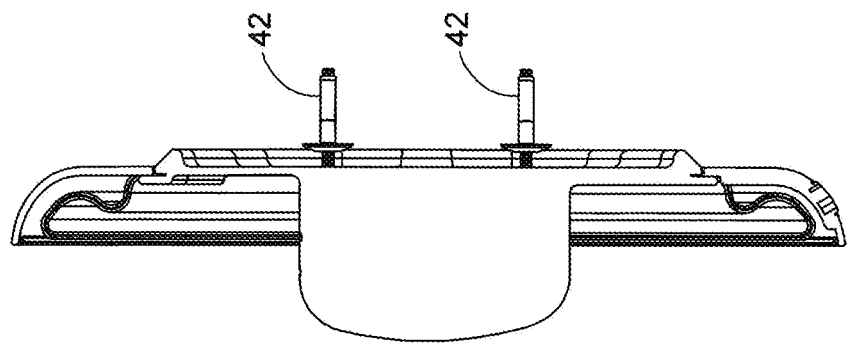
FIG. 9A is a cross-sectional view of the housing base portion taken along line 9A-9A in FIG. 9, showing bottom air vents, cord wrap guides, and the central power power-hub assembly.
Figure 9:
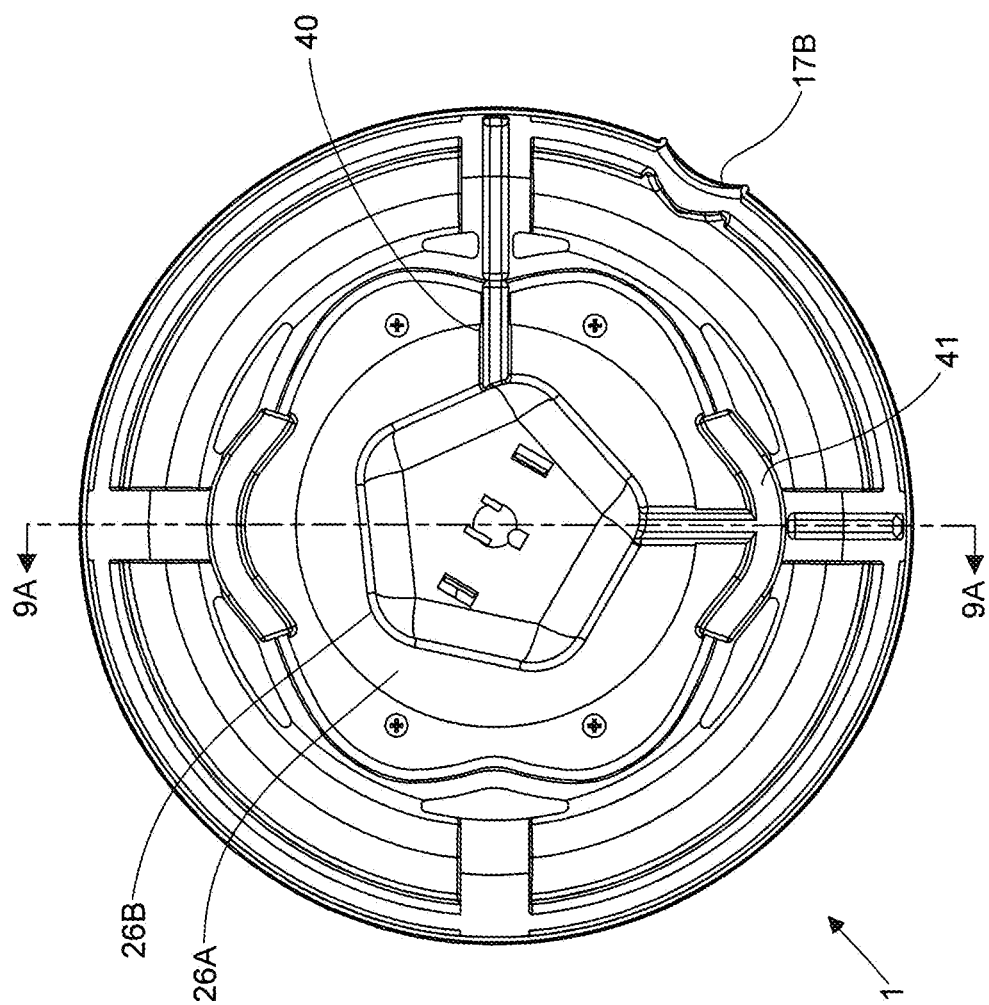
FIG. 9 is an elevated front view of the electrical power-supplying device shown in FIGS. 2A through 2C, with its housing cover portion completely removed from the housing base portion.

FIGS. 9 and 9A reveal: (i) the bottom air vents 31A through 31E formed in the housing base portion 22 around the perimeter region thereof; (ii) cord wrap guides 33A through 33D formed within the inside of the housing base portion, about its perimeter region, for retaining excess power cable 12A within the channels; and (iii) dry-wall anchors 42 for mounting the device 1 to a wall surface, as shown in FIG. 1B, or to the underside surface of a desktop, as shown in FIG. 1C.

As shown in FIG. 10, the electrical and electronic circuitry 44 contained in the central power-hub structure 25 and within the device housing, comprises: the electrical power cord 15 having a power plug 16 and a distal end that plugs into port plug port 28 formed on the exterior of the base portion of the housing; an isolation-type power transformer 45; surge protection circuitry 46 connected to the output terminals of the isolation transformer 45; ON/OFF switch and indicator 18 provided with a glowing LED ring that indicates the state of the device using different glow colors (e.g. Green=READY, Red=NOT READY); a signal conditioning circuit 47; multiple electrical receptacles 19, 27A through 27E supplied AC power from the signal conditioning circuit 47; and AC/DC converter 48 supplying the USB power ports 20 and 21.

Figure 15:
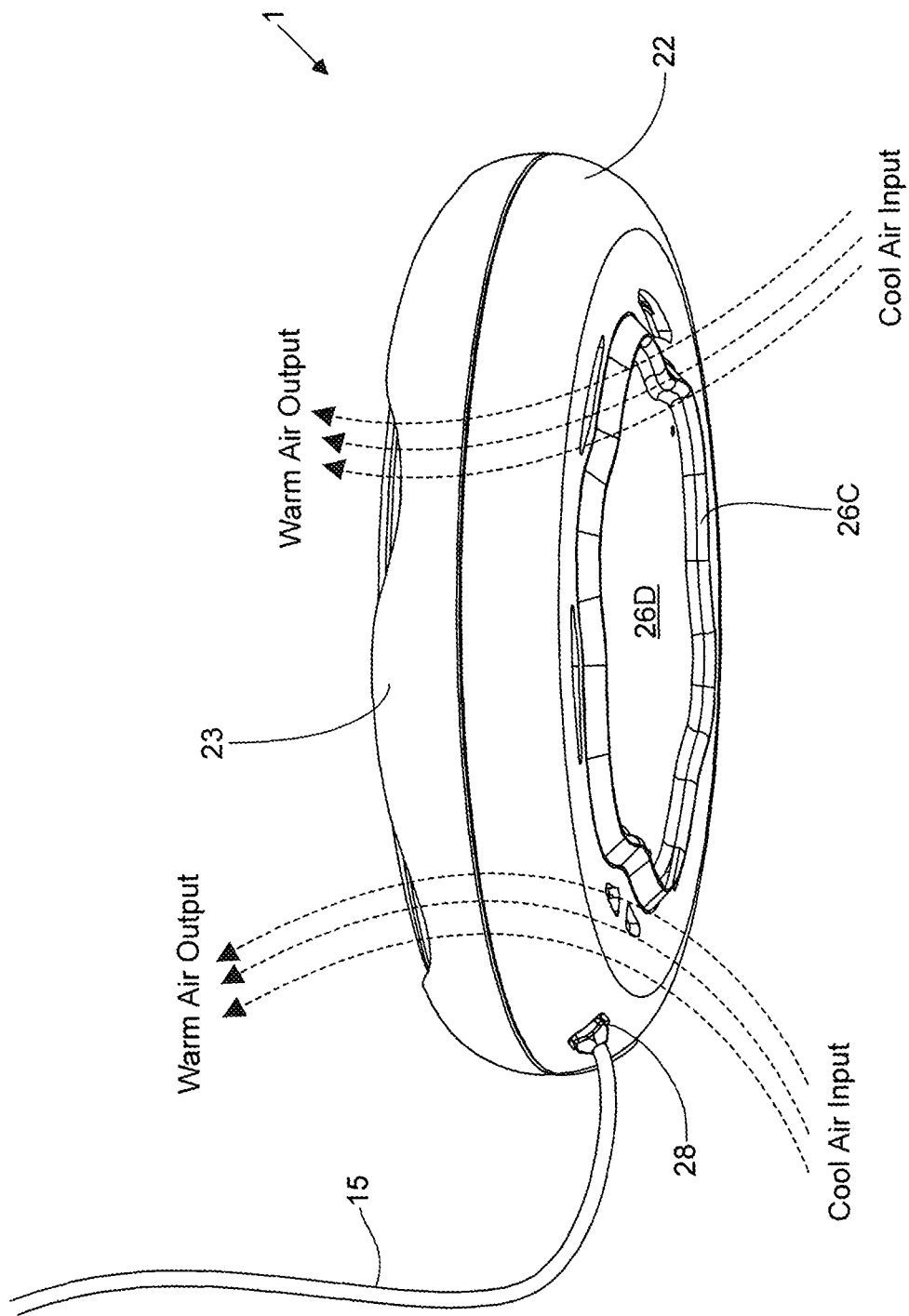
FIG. 15 is a perspective view of the electrical power-supplying device shown in FIGS. 13, 14 and 15, illustrating the flow of air through the device during operation to achieve cooling and thermal management.

As shown in FIG. 15, taken together, air circulation vents 31A through 31E formed in the base portion of housing 22, and air vents 34A through 34E formed in the housing cover portion 23, form a passive-type of thermal management system embodied within the device so that all power adapters contained therein are maintained within safe interior operating temperature limits. As shown, illustrative cool and warm airflows are shown moving through the thermal management system.

Referring to FIGS. 11 through 15, a method of using the power-supplying device of FIGS. 2A through 2C will now be described.

As shown in FIG. 11, the first step of the method involves removing the housing cover portion 23 from the housing base portion 22, to allow several power adapters 30A through 30D and power plug 30E to be plugged into the central power-hub structure 25 stored within the housing base portion 22, as shown.

Then, the excess length of the electrical power cord 12A for these electrical plugs is managed within the cord wrap guides 33A through 33D. This is achieved by routing each power cord from its electrical appliance, along an intended route within the workstation environment, back through the power cord portal 17 on the device, and then wrapping/routing any excess length of power cord 12A (beyond the power cord portal to its power adapter) behind the cord wrap guides 33A through 33D and into the cable management channel space 32 extending about the perimeter of the housing base portion, so as to take up any and all excess cord (i.e. cord slack), and ensure that excess power cord is neatly managed within the interior volume of the device, as shown in FIG. 12, and FIGS. 1A, 1B and 1C.

Figure 13:
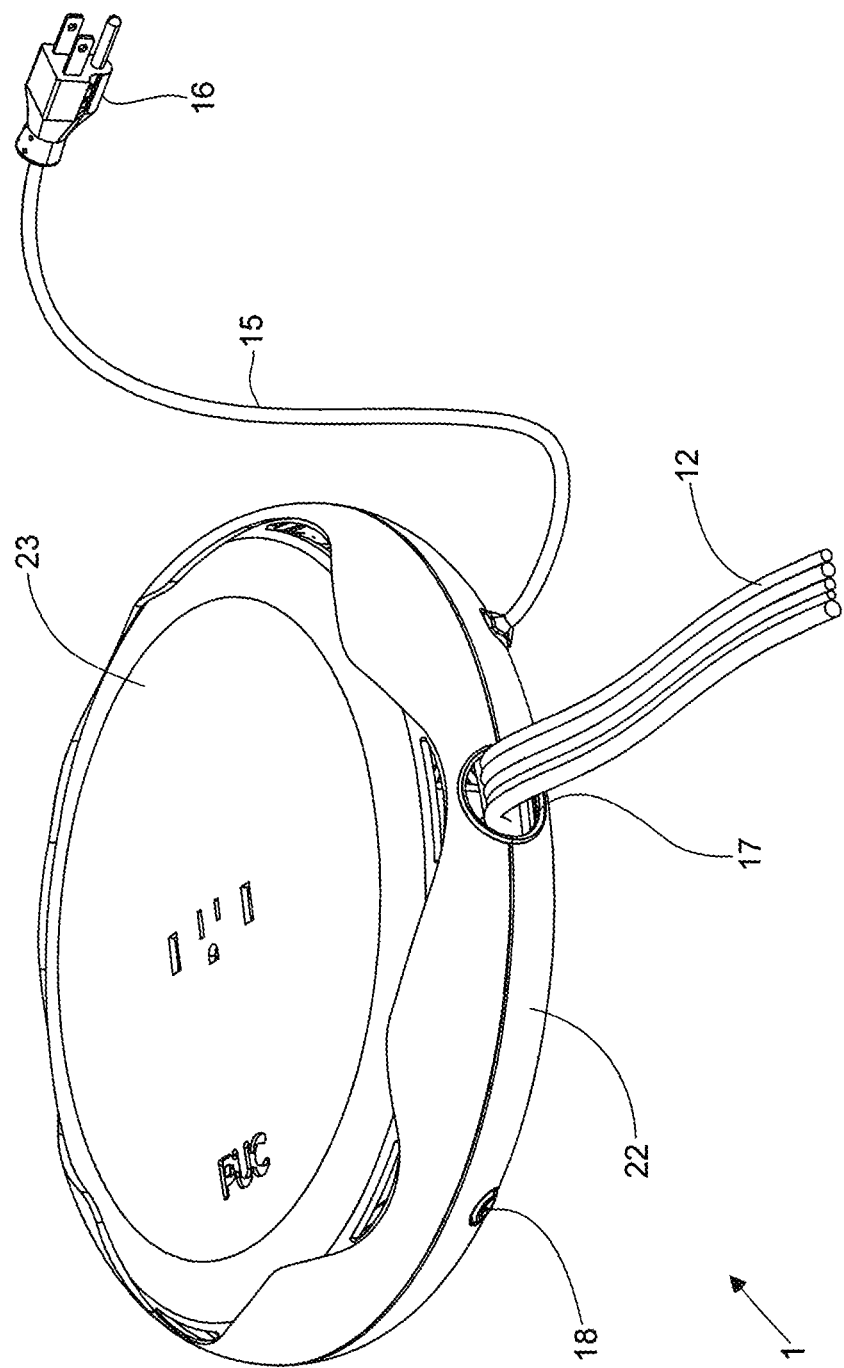
FIG. 13 is a perspective view of the electrical power supplying device shown in FIG. 13, with the housing cover portion mounted upon the housing base portion, and containing and concealing a plurality of power adapter and plugs, and with the excess power cord of the appliances managed within the housing, and extending out the power cord portal.
Figure 14B:
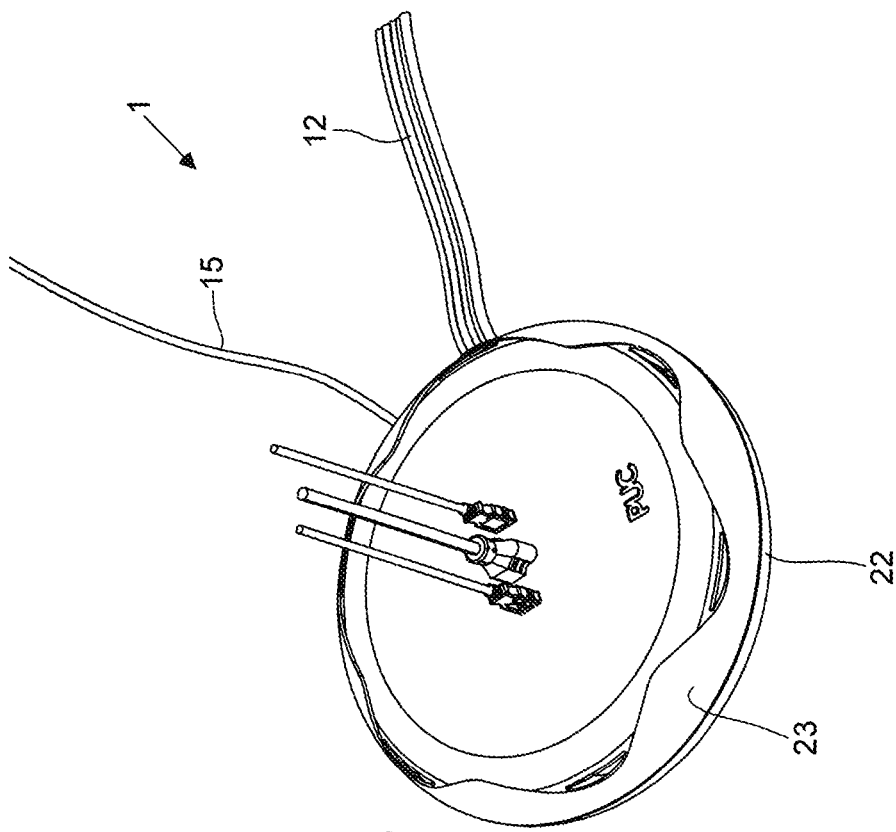
FIG. 14B is a perspective view of the electrical power supplying device shown in FIG. 13, with a pair of USB cords and a power plug plugged into receptacles available through the housing cover portion.
Figure 14A:
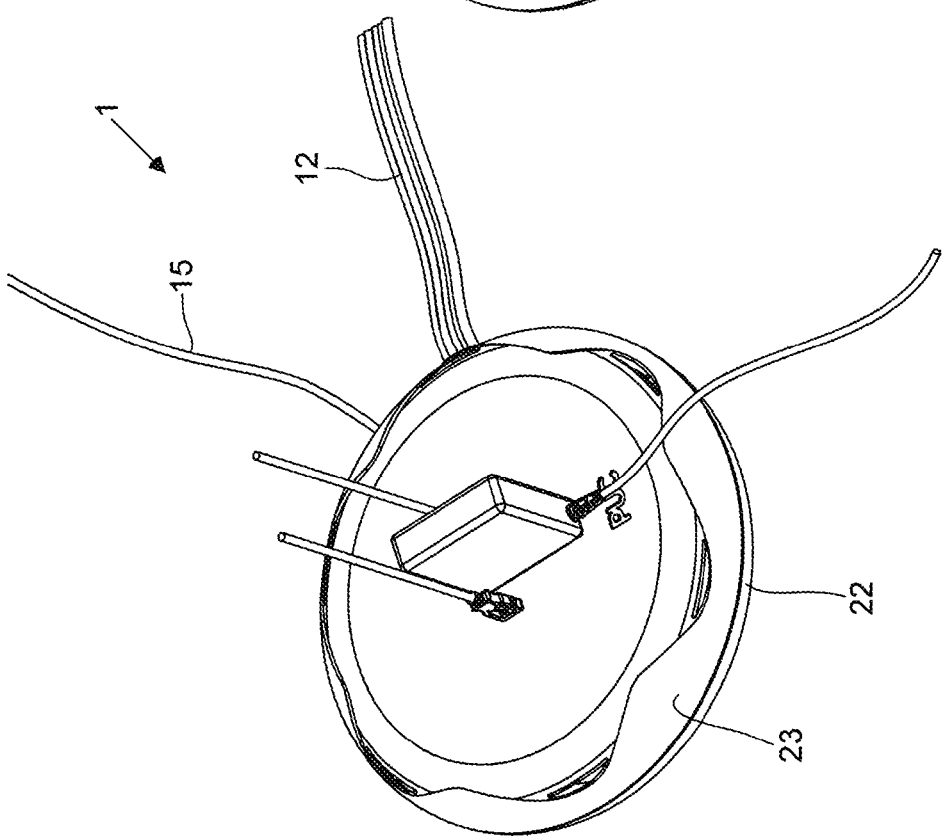
FIG. 14A is a perspective view of the electrical power supplying device shown in FIG. 13, with a pair of USB cords and a power adapter plugged into receptacles available through the housing cover portion.

As shown in FIG. 13, the next step of the method is to replace the housing cover portion 23 onto the housing base portion 22 of the power-supplying device. Then as shown in FIGS. 14A and 14B, several additional USB power plugs 50A, 50B and AC power plug 51 are plugged into receptacles 20, 20 and 19 of the centralized power-hub assembly 25, respectively. At any time, the housing cover portion 23 can be easily removed from the power-hub housing portion 22, and power plugs, power adapter plugs and/or power adapter blocks can be easily removed, added or reconfigured within the power supplying device, to meet requirements of electrical appliances deployed in the work, living and/or play environment, as the case may be.

In general, the electrical power supplying device 1 can also be supported on a variety of surfaces other than floor surfaces, such as, for example, countertop surfaces, shelf surfaces, pedestals, table surfaces, kitchen countertop surfaces, and the like, where electrical appliances are deployed for use and require electrical power for operation. Also, while the device is shown in an interior workspace in FIGS. 1A, 1B and 1C, it is understood that the device of the present invention can also be used safely outdoors, provided it is protected from the natural elements, to protect from electrical shock and shorting.

Figure 16:
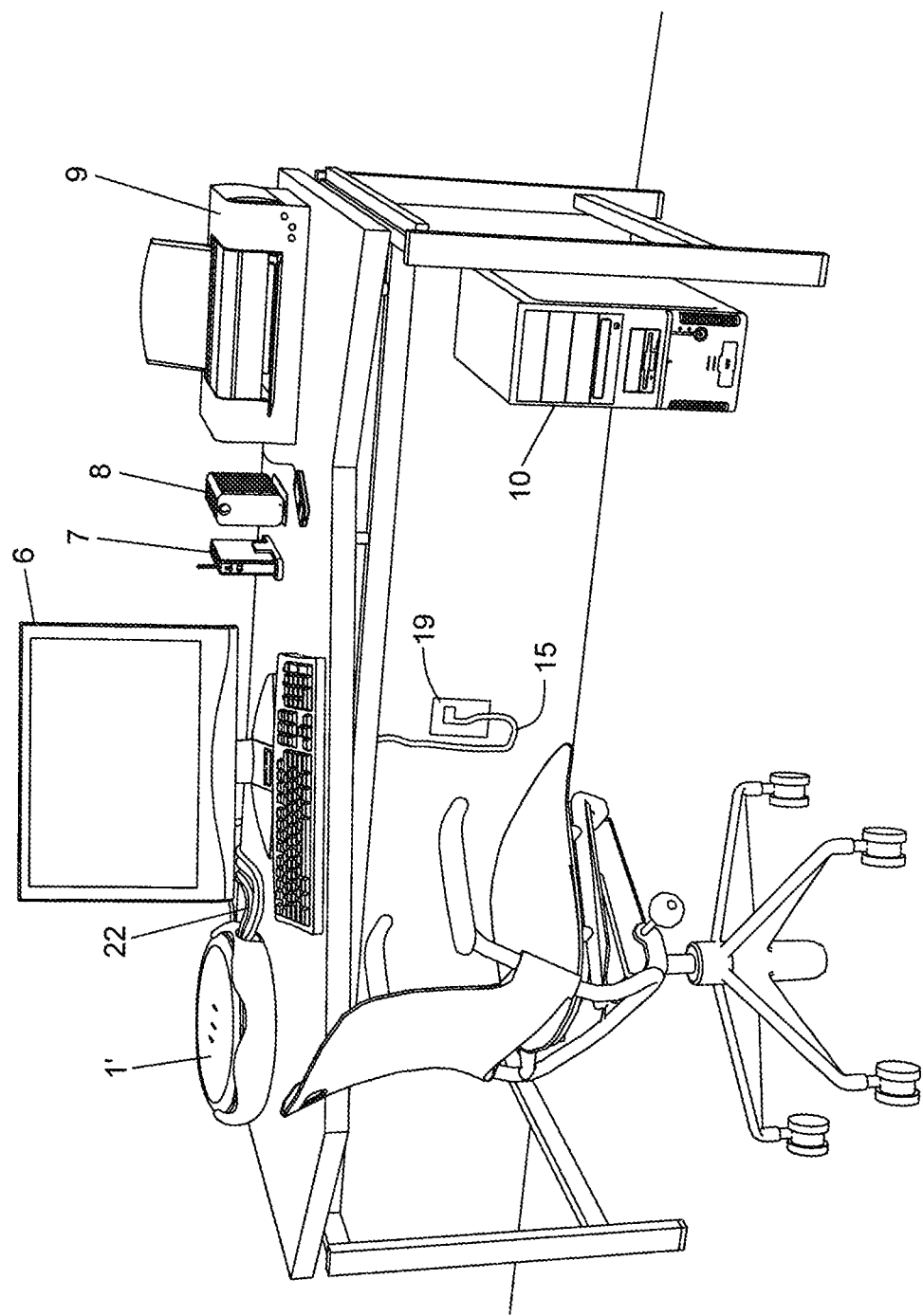
FIG. 16 is a perspective view of the second illustrative embodiment of the electrical power-supplying device of the present invention, shown deployed on the surface of a desktop to supply electrical power to a number of electrical appliances present within the environment.
Figure 17:
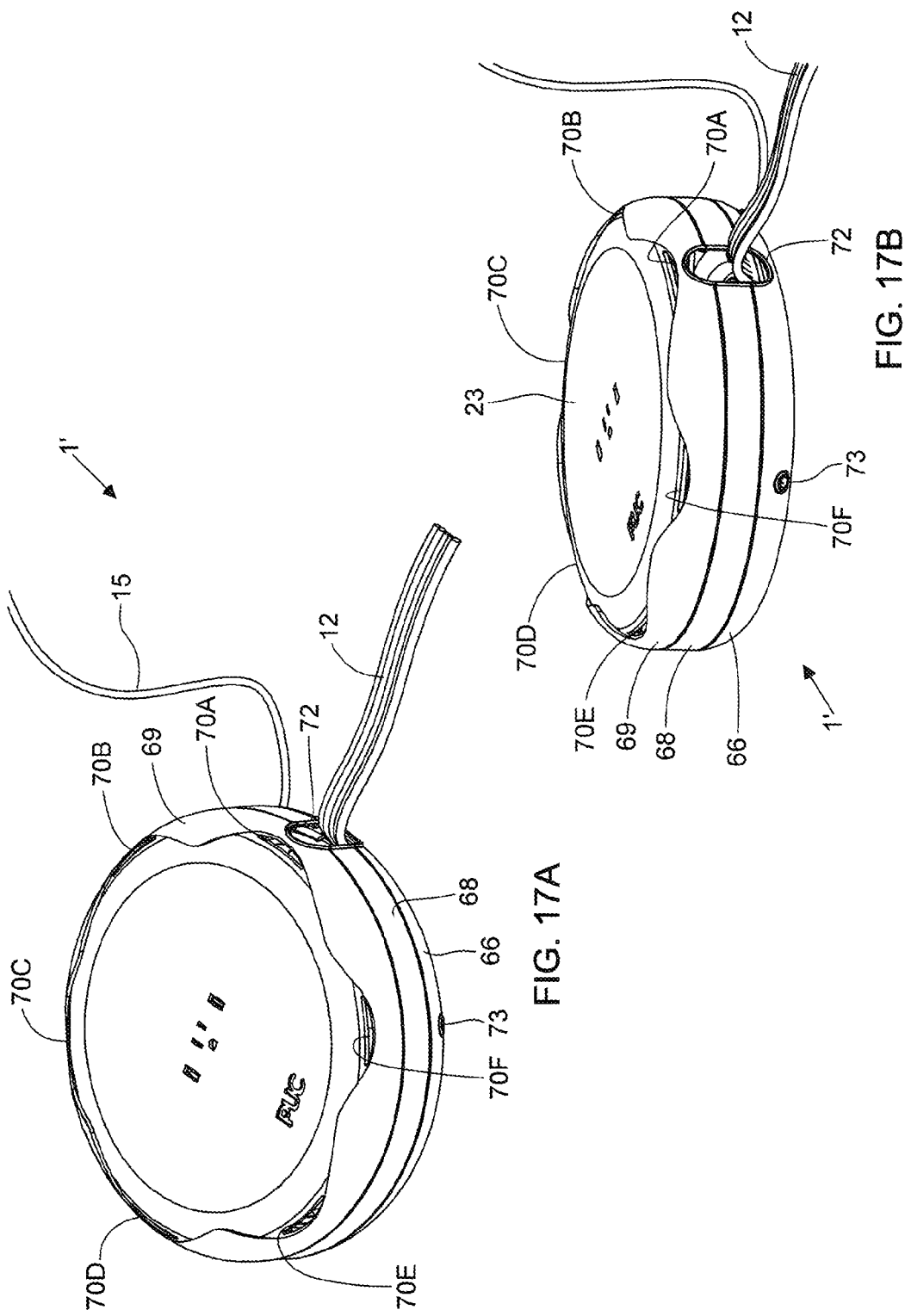
FIG. 17A is a first perspective view of the electrical power supplying device shown in FIG. 16, shown containing and concealing a plurality of power adapter and plugs, and with the excess power cord of the appliances managed within the housing, and extending out the power cord portal.
FIG. 17B is a second perspective view of the electrical power supplying device shown in FIG. 16, shown containing and concealing a plurality of power adapter and plugs, and with the excess power cord of the appliances managed within the housing, and extending out the power cord portal.

The Electrical Power Supplying Device According to a Second Illustrative Embodiment of the Present Invention In FIG. 16, a second illustrative embodiment of the present invention is shown realized in the form of an electrical power supplying device 1' that is supplied with electrical power through a flexible coiled power cord 15 plugged into a standard electrical power receptacle 11. The primary difference between device 1' and device 1 is that the housing base portion 66 of device 1' is designed deeply, and not with a low-profile housing design as employed in the device 1 of the first illustrative embodiment. Also device 1' employs a cord managing post structure 62C that is integrated with the central power-hub assembly or structure 62 installed in central aperture 66A of the housing base portion 66.

As shown in FIGS. 17A, 17B 18, 19, 19A and 19B, the electrical power supplying device 1' comprises an assembly of components, namely: a central power-hub assembly or structure 62; a housing base portion 66 with a central aperture 66A, through which the power-hub assembly 62 is snap-fit mounted; a housing spacer/riser portion 68 for snap-fit mounting to the edge regions of the housing base portion 66; a housing cover portion 69 for snap-fit mounting onto the edge regions of the housing spacer portion 68; a set of four pliant power cord wrap guides 67A through 67D for retaining excess power cord in a neat and orderly manner within the power cord management channel 67E extending about the power-hub assembly 62 within the housing base portion 66; and a power cord portal 72 formed in the housing base portion 66 for passing of appliance port cords 12 into and out of the device.

As shown in FIGS. 19A, 20, 21A, 21B and 22, the central power-hub assembly 62 comprises: (i) a planar (plateau-like) region 62A, beneath which are mounted electrical receptacles 63A through 63F for receiving AC power cords, and printed circuit (PC) boards 64A and 64B shown in FIG. 24; (ii) a central post structure 62B extending from region 62A, and containing electrical power receptacle 63G and USB port ports 65A and 65B; (iii) a power cord management post region 62C for winding up excess power cord from appliances being supplied power from the device; (iv) a foot flange portion 62D extending about the perimeter of the planar plateau-like region 62A, and engaging the central aperture 66A in a snap-fit manner to hold the central power-hub assembly 62 within the central aperture 66A of the housing base portion 66; and (v) bottom base portion 62E on the bottom side of the planar plateau-like region 62A, containing electrical receptacles, PC boards and other components shown in FIG. 24.

As shown in FIGS. 19A, 20, 21A, 21B and 22, the housing base portion 66 comprises: central aperture 66A for supporting the central power power-hub assembly 62, via the foot flange portion 62D; a 3D interior volume having geometrical dimensions for containing power adapter, modules and plugs and excess power cable, as shown; an edge aperture 72B formed in the upper edge of the base housing side wall, aligned with the rise opening 68A, and edge aperture 72A of the housing cover portion 66; a cable connector 67 mounted in the side wall of the housing base portion 66, for receiving the distal end of electrical power cord 15 that supplies primary electrical power to the device, and all electrical appliances connected to the device.

As shown in FIGS. 19A, 20, 21A, 21B and 22, the pliant (i.e. flexible) power cord wrap guides 67A through 67D are installed about the perimeter of the central power-hub structure 62, anchored on its inside diameter and free on its outer diameter to be picked up so that excess power cord 12A can be gently tucked therebeneath, around the perimeter of the central power-hub assembly 62 within the housing base portion 66, to neatly manage excess power cord length within the device.

Figure 21A:
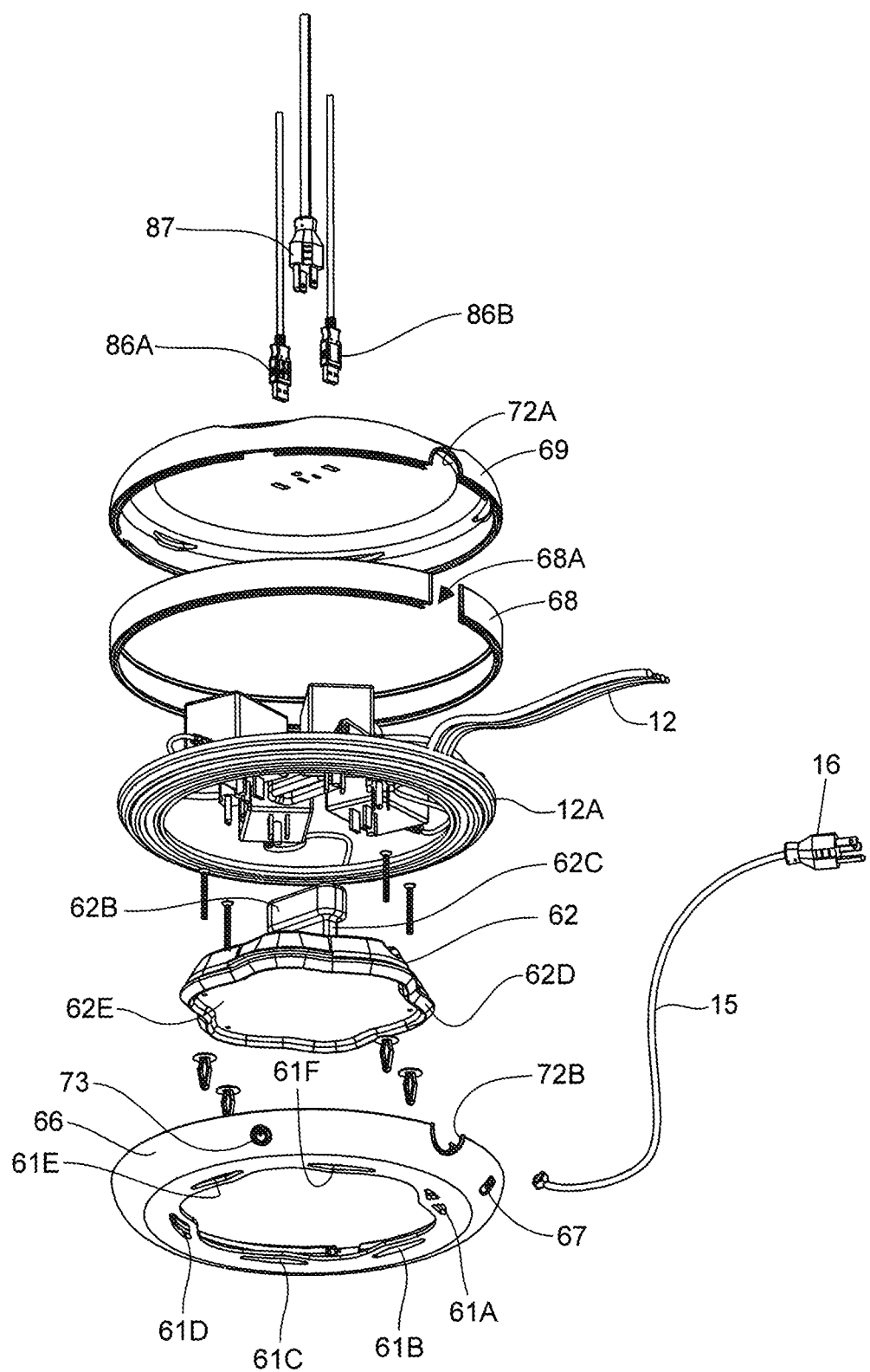
FIG. 21A is a first perspective view of the electrical power supplying device shown in FIGS. 17A and 17B, showing its components and several exemplary power plugs and adapters plugged into the central power-hub assembly, for purposes of illustration.
Figure 21B:
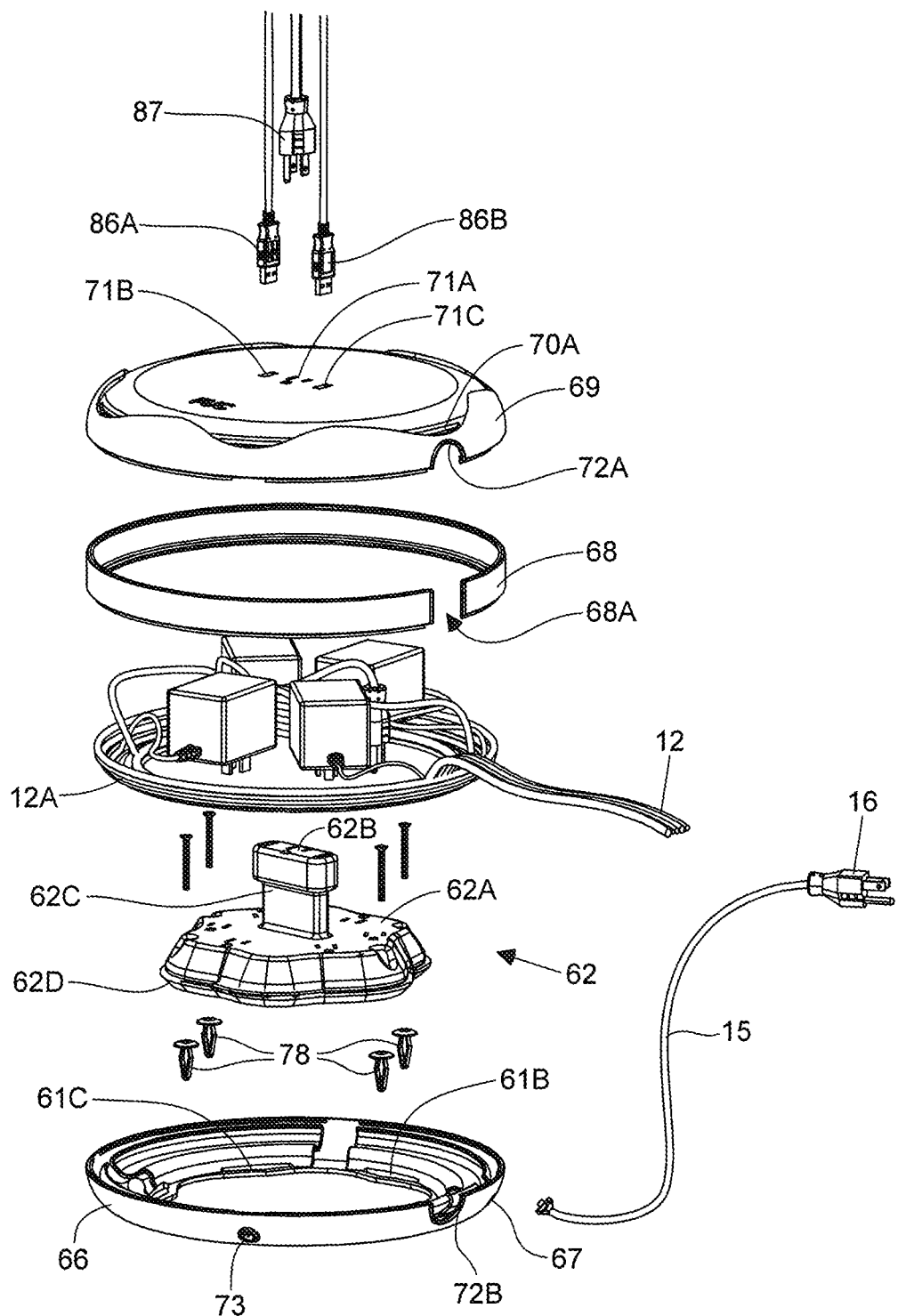
FIG. 21B is a second perspective view of the electrical power supplying device shown in FIGS. 17A and 17B, showing its components and several exemplary power plugs and adapters plugged into the central power-hub assembly, for purposes of illustration.
Figure 22:
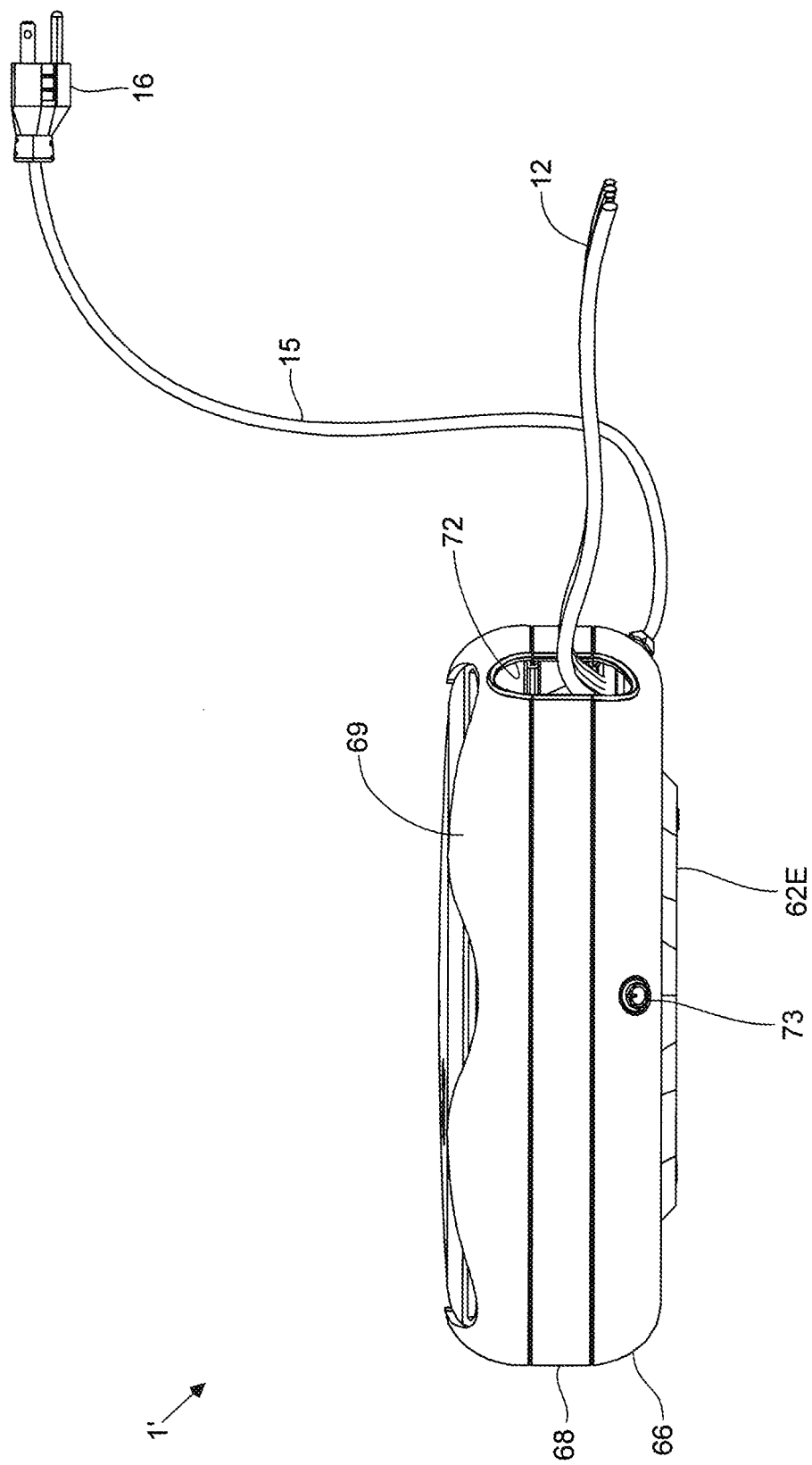
FIG. 22 is an elevated side view of the electrical power supplying device shown in FIGS. 17A and 17B, containing and concealing multiple power plugs and adapters, with excess power cord from appliances.
Figure 23:
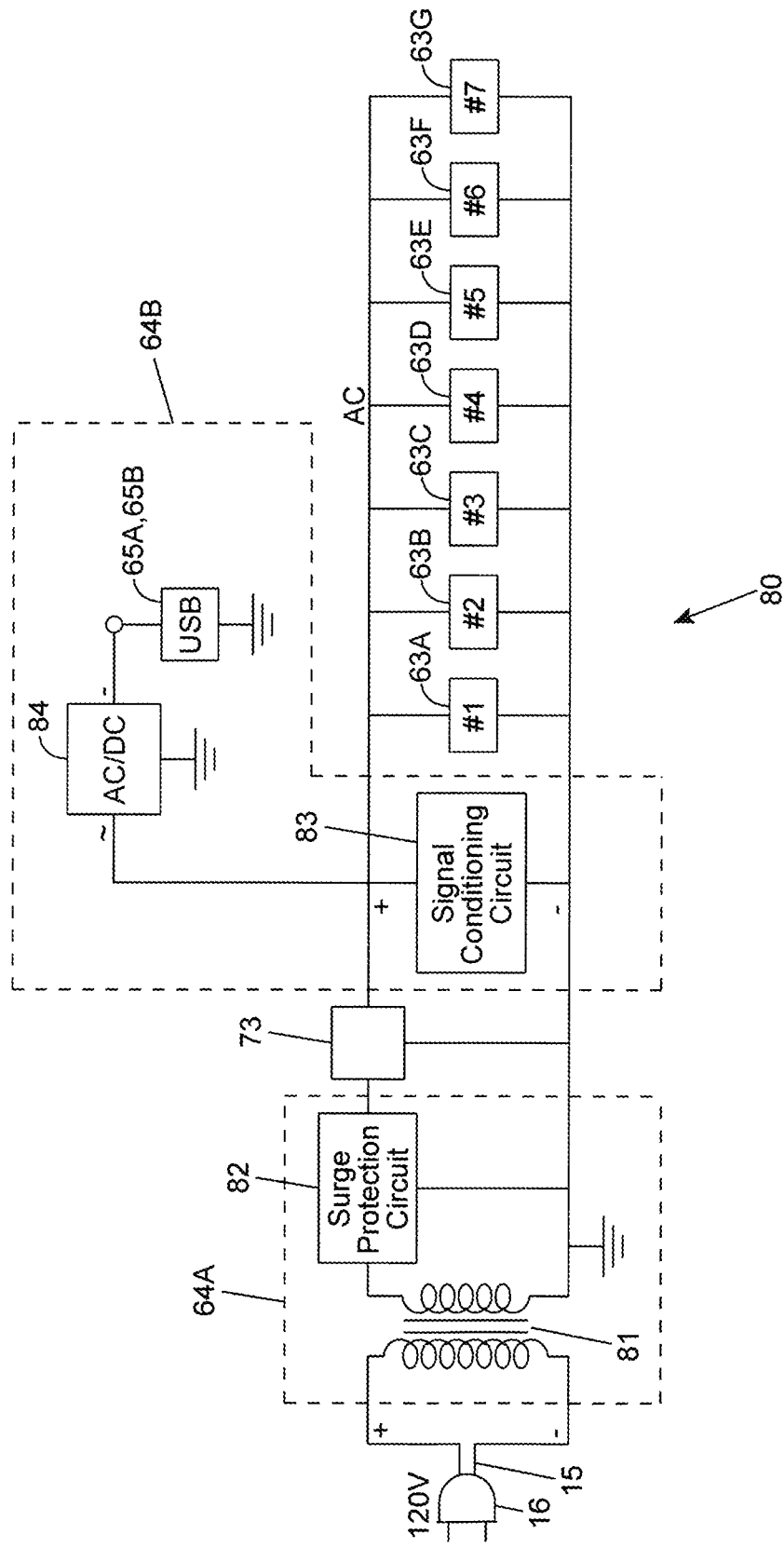
FIG. 23 is a schematic representation of the electrical and electronic components supported on the power-hub assembly shown in FIGS. 17A, 17B and 17C.

As shown in FIGS. 21A, 21B and 22, the center spacer (e.g. several inches high) 68 has a cut-out opening 68A, aligned with edge apertures 17B and 72 snap-fits onto the top portion of the housing bottom portion 66, to increase the height dimension of the base portion of the housing. As shown, the housing cover portion 69 attaches to the top portion of the center riser/spacer portion 68 as shown, and covers and conceals the power-hub assembly 62 and power adapters and plugs plugged into the power-hub structure 62.

Figure 18:
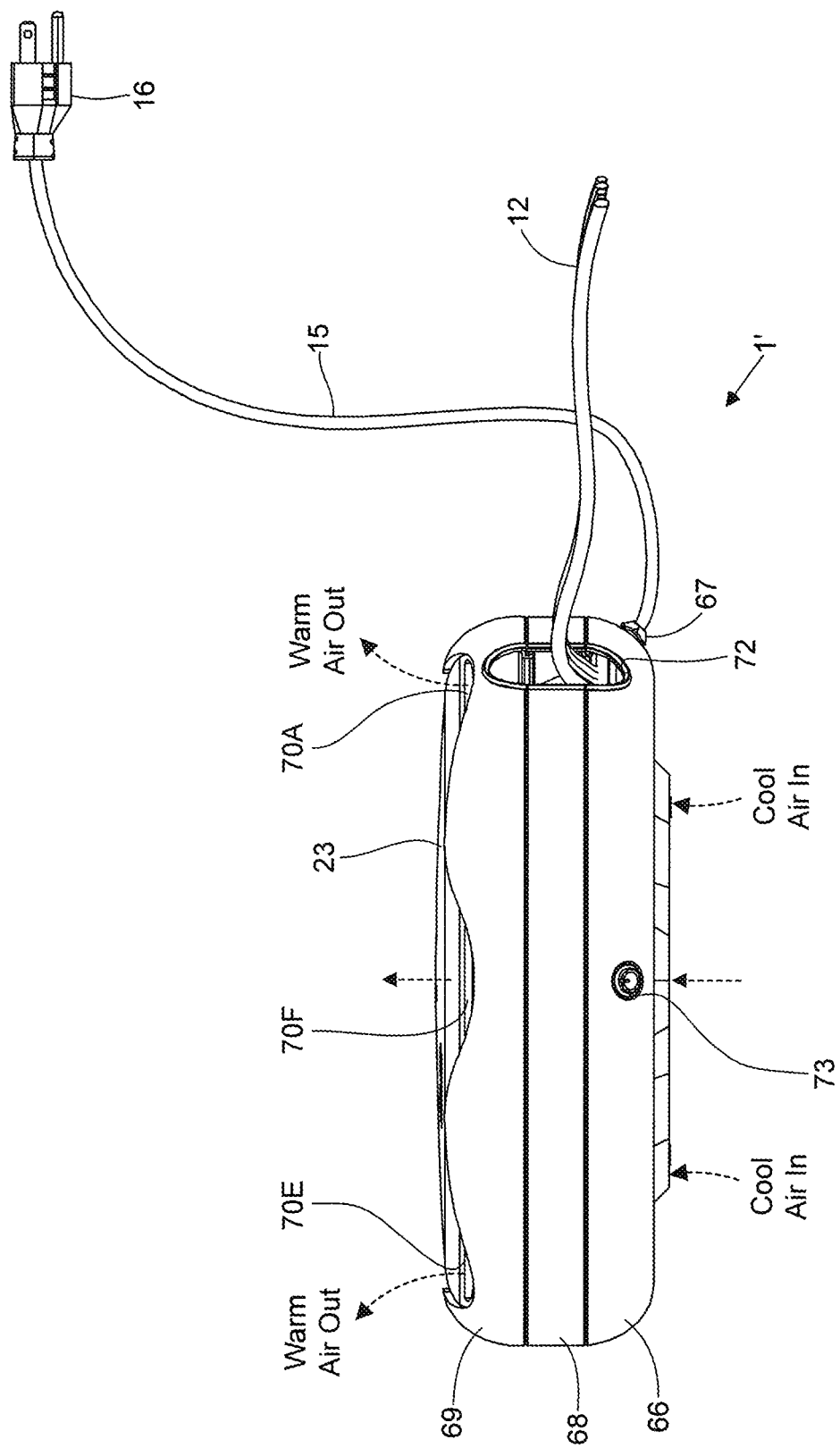
FIG. 18 is a perspective view of the electrical power supplying device shown in FIGS. 17A and 17B, illustrating the flow of air through the device during operation to achieve cooling and thermal management.

As shown in FIGS. 17A, 17B and 18, the housing cover portion 69 further comprise: air vents 70A through 70E about its top perimeter region allowing the passage of warm heated air from within the 3D interior volume of the housing base portion 66, and thus providing ventilation to the interior of the device; a set of plug apertures 71A, 71B and 71C for passing the electrical plugs of AC power cord 87 and USB power plugs 86A and 86B shown in FIG. 21A; an edge aperture 72A, formed at the upper edge region of the cover housing side wall, and aligned with edge aperture 17B formed in housing base portion 66, to form a power cord portal 72 formed in the housing base portion 66, riser portion 68, and housing cover portion 69, thereby allowing a group or bundle of electrical power cords 12A associated with a set of electrical appliances, to enter/exit the device, when the housing base and cover portions are connected together, as shown in FIG. 22; ON/OFF power switch and indicator 73, mounted within the side wall of the housing base portion 66, and electrically connected to the circuitry contained in the central power-hub structure 62 and schematically depicted in FIG. 24.

As shown in FIG. 18, when taken together, air circulation vents 61A through 61E formed in the housing base portion 66 and air vents 70A through 70F formed in the housing cover portion 69, provide a passive-type of thermal management subsystem embodied within the device so that all power adapters contained therein are maintained within safe interior operating temperature limits. As illustrated, cool and warm airflows move through the thermal management subsystem.

As best shown in the exploded diagrams of FIGS. 21A and 21B, the planar (plateau-like) region 62A of the power-hub assembly 62 snap fits into the central aperture of the housing base portion 66. Also, electrical receptacles 63A through 63E, electronic PC circuit board 64A, 64B and other electrical components specified in the electrical circuit diagram of FIG. 24, are contained beneath planar (plateau-like) region, and interconnect the components of FIG. 24, together, and supply electrical power thereto, during device operation.

As shown in FIG. 22, the housing cover portion 69 is installed on the housing base portion 66, and several electrical appliances are connected to and powered by the device. Also, FIGS. 6 and 6A reveals a number of features: (i) that the electrical receptacles 63A through 63F are arranged about the centralized power-hub 62 to optimize space within the 3D interior volume of the device, and accommodate the storage of power adapters, modules and plugs formed at the terminal portions of appliance power cords; and (ii) the cable channel 76 leading from the external power cord 15 of the device, towards its central power power-hub assembly 62 shown in FIG. 6, for interconnection with the power circuitry illustrated in FIG. 24. FIG. 20 illustrates the geometry of this channel in the illustrative embodiment.

FIGS. 21A and 21B reveal dry-wall anchors 78 for mounting the device to a wall surface, or to the underside surface of a desktop. FIGS. 21A and 21B reveal the bottom air vents 70A through 70F formed in the housing base portion 66 around the perimeter region thereof. FIGS. 23A and 23B reveal the spatial relationship among the components in the device, and how components are assembled together.

Figure 24:
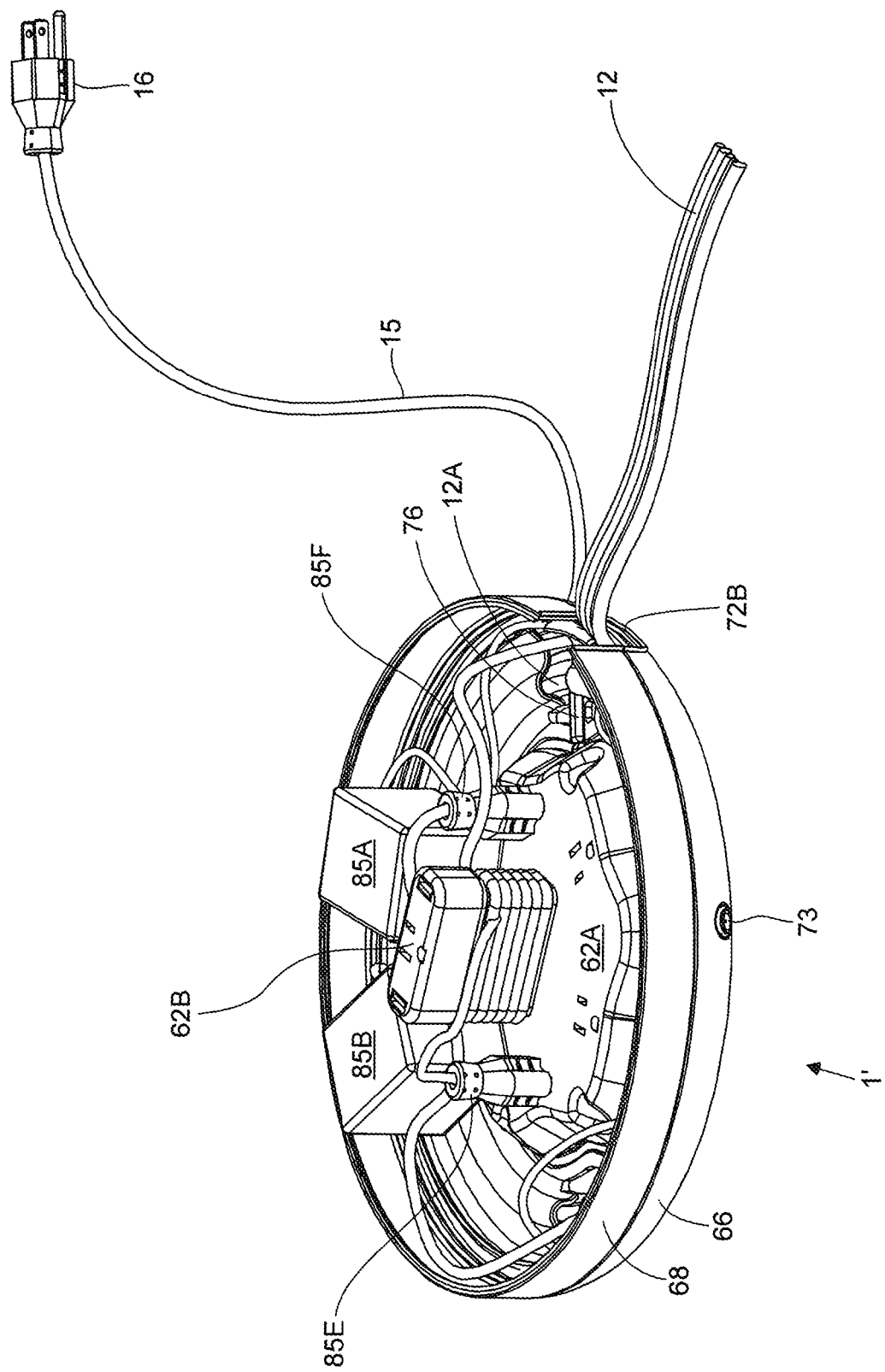
FIG. 24 is a perspective view of the electrical power supplying device shown in FIGS. 17A and 17B, but with its housing cover portion removed, and several power plugs and adapters plugged into the central power-hub assembly.

As shown in FIG. 24, the electrical and electronic circuitry 80 contained within the device housing, comprises: the electrical power cord 15 that plugs into power plug port 67 formed on the exterior of the base portion 66 of the housing; an isolation-type power transformer 81; surge protection circuitry 82 connected to the output terminals of the isolation transformer 81; ON/OFF switch and indicator 73 provided with a glowing LED ring that indicates the state of the device using different glow colors (e.g. Green=READY, Red=NOT READY); a signal conditioning circuit 83; multiple electrical receptacles 63A through 63G supplying AC power from the signal conditioning circuit 83; and an AC/DC converter 84 supplying the USB power ports 65A, 65B.

As shown in FIG. 22, the electrical power supplying device 1' is on a desktop or floor surface, and provides external access to an external power receptacle 63G and a USB power ports 65A, 65B, while a bundle of power cables 22 from electrical appliances enter/exit the power cable portal 77 provided on the side of the device of the present invention. However, device 1' can be mounted on a wall surface, or other horizontal or vertical surface.

As shown in FIG. 22, the housing cover portion 69 can be easily lifted off the power-hub housing portion of the electrical power supplying device 1' to reveal a number of things, namely: (i) electrical power provided to a number of electrical appliances supported at the workstation of FIGS. 1A and 1B; (ii) several power plugs and power adapter plugs supported about the central power post 62B; and (iii) the length of a plurality of electrical cords 22A, associated with the electrical appliances, being neatly managed about the cord management post 62D and/or beneath cable management elements 67A through 67D in accordance with the principles of the prevent invention, and ultimately extend out the power cord portal 72.

Referring to FIGS. 25 and 26, a method of using the power-supplying device of FIGS. 17A through 17C will now be described.

As shown in FIG. 25, the first step of the method involves removing the housing cover portion 69 from the housing spacer/riser portion 68, to allow several power adapters 85A through 85D and power plugs to be plugged into the central power-hub structure 62 stored within the 3D interior volume of the housing base portion 66, as shown.

Then, the excess length of the electrical power cords of these electrical plugs is managed by routing each power cord from its electrical appliance, along an intended route within the workstation environment, back to the power cord portal 72 on the device, and then wrapping/routing any excess length of power cord 22A (beyond the power cord portal to its power adapter) about post region 62C, and/or behind the power cord wrap guides 67A through 67D, to take up any and all excess cord (i.e. cord slack), and ensure that the excess power cord is neatly managed within the interior volume of the device, as shown in FIG. 25.

As shown in FIG. 25, the next step of the method is to replace the housing cover portion 69 onto the housing spacer portion 68 of the power supplying device 1'. Then as shown in FIGS. 14A and 14B, several additional USB power plugs 86A and 86B and AC power plug 87 are plugged into electrical receptacles 86A and 86B of the centralized power-hub assembly 87. At any time, the housing cover portion 69 can be easily removed from the power-hub housing portion, and power plugs, power adapter plugs and/or power adapter blocks 85A through 85E can be easily removed, added or reconfigured within the power supplying device to meet requirements of electrical appliances deployed in the work, living and/or play environment, as the case may be.

In general, the electrical power supplying device 1' can be supported on a variety of surfaces other than floor surfaces, such as, for example, countertop surfaces, shelf surfaces, pedestals, table surfaces, kitchen countertop surfaces, and the like, where electrical appliances are deployed for use and require electrical power for operation. Also, while the device is shown in an interior workspace in FIG. 16, it is understood that the device of the present invention can also be used safely outdoors, provided it is protected from the natural elements, to protect from electrical shock and shorting.

Figure 26B:
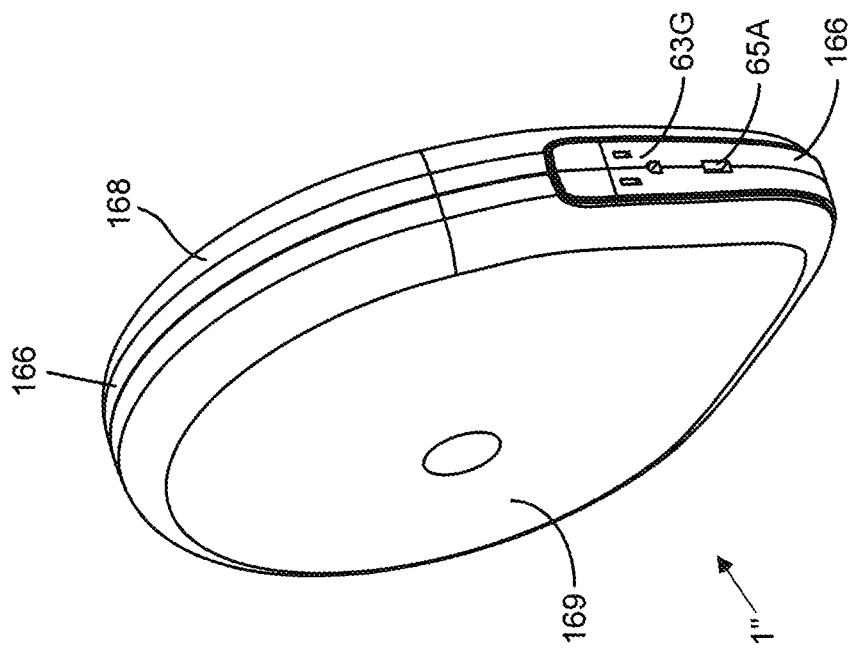
FIG. 26B is a perspective view of the third illustrative embodiment of the electrical power-supplying device of the present invention, shown deployed vertically on the surface of a desktop to supply electrical power to a number of electrical appliances present within the environment.
Figure 26A:
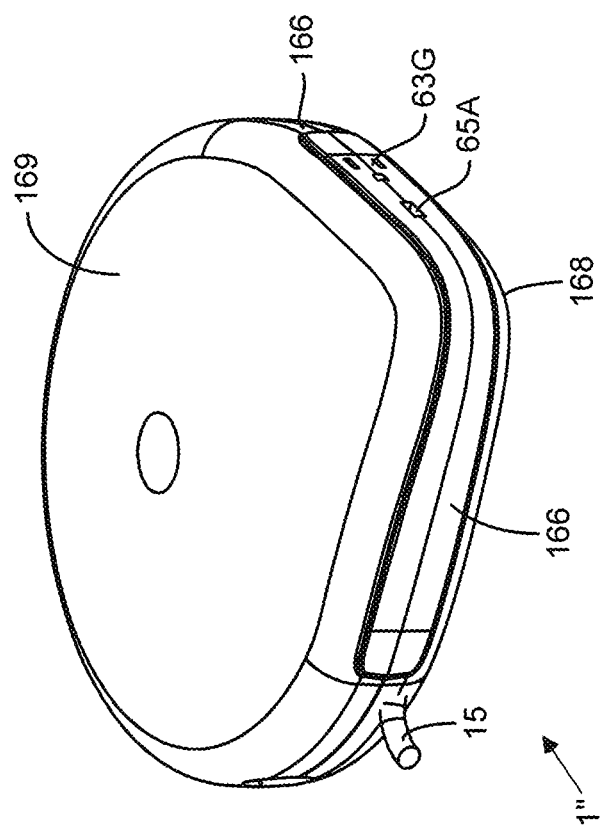
FIG. 26A is a perspective view of the third illustrative embodiment of the electrical power-supplying device of the present invention, shown deployed horizontally on the surface of a desktop to supply electrical power to a number of electrical appliances present within the environment.
Figure 27:
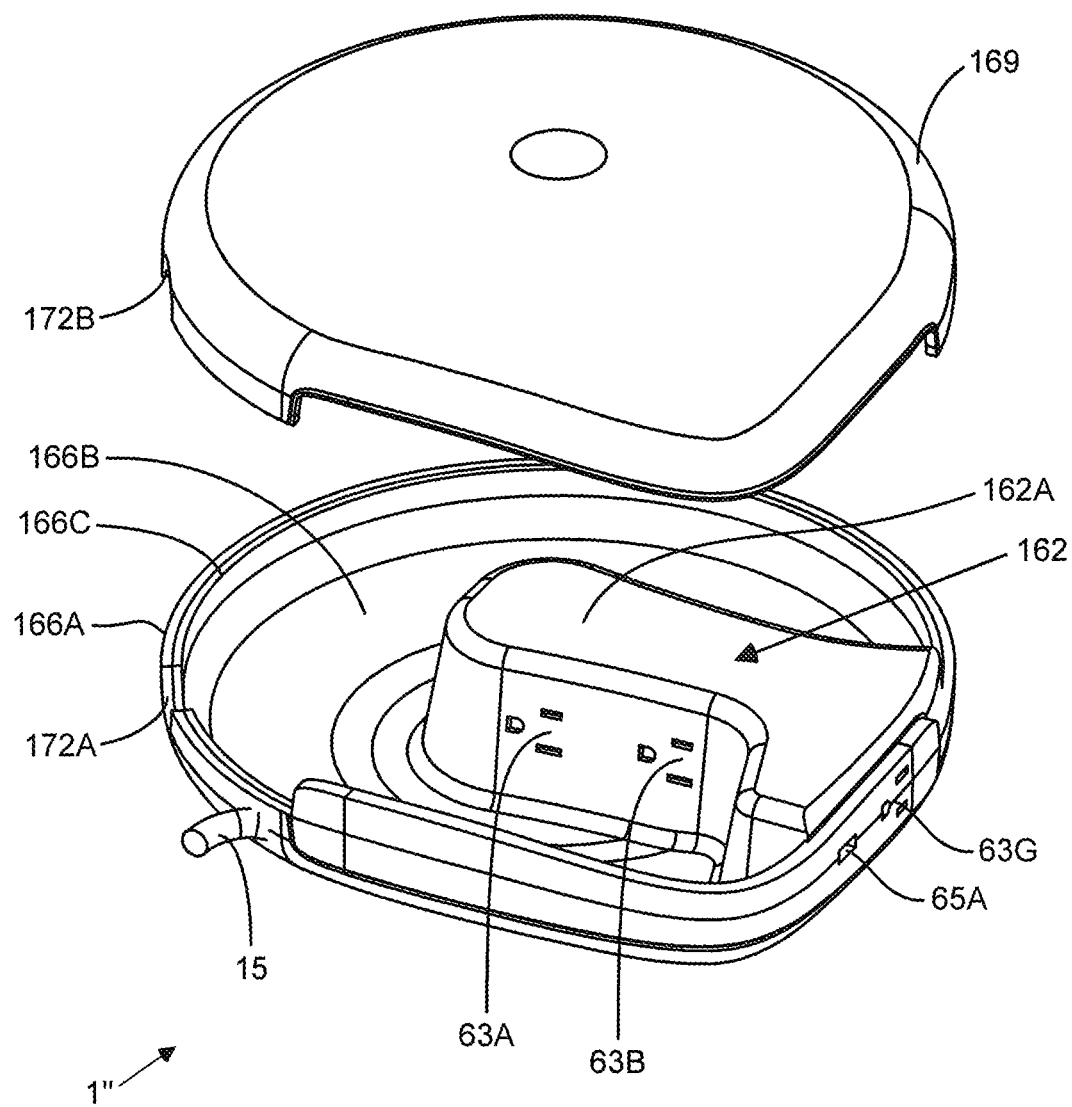
FIG. 27 is a perspective view of the electrical power supplying device shown in FIGS. 26A and 26B, shown with its housing cover portion removed to reveal the interior volume of the housing, and its central power-receptacle structure mounted therein.
Figure 28:
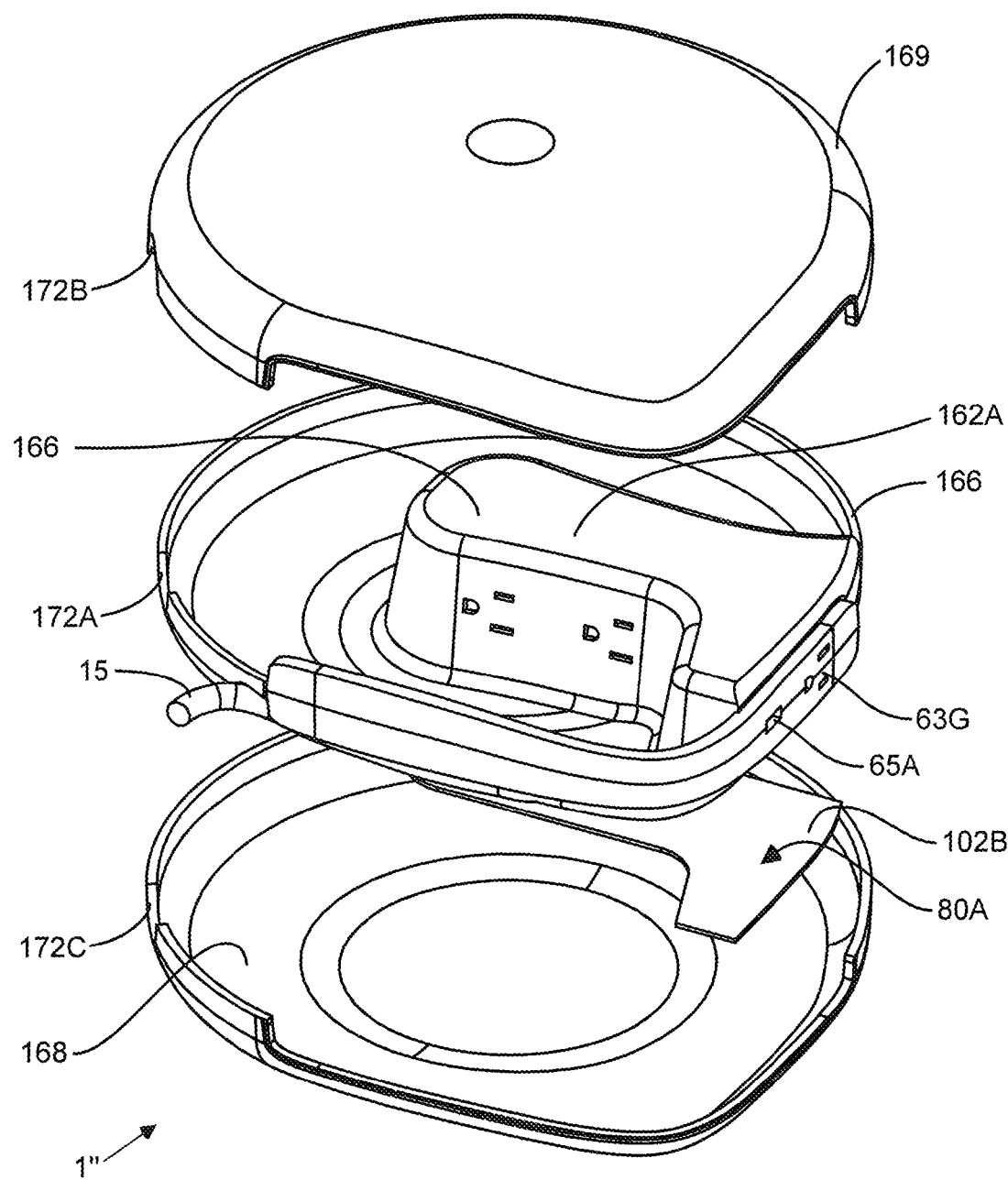
FIG. 28 is an exploded perspective view of the electrical power supplying device shown in FIGS. 26A and 26B, showing its components, including, base housing portion, central housing portion, a power-receptacle structure mounted on the central housing portion, and a cover housing portion.
Figure 29:
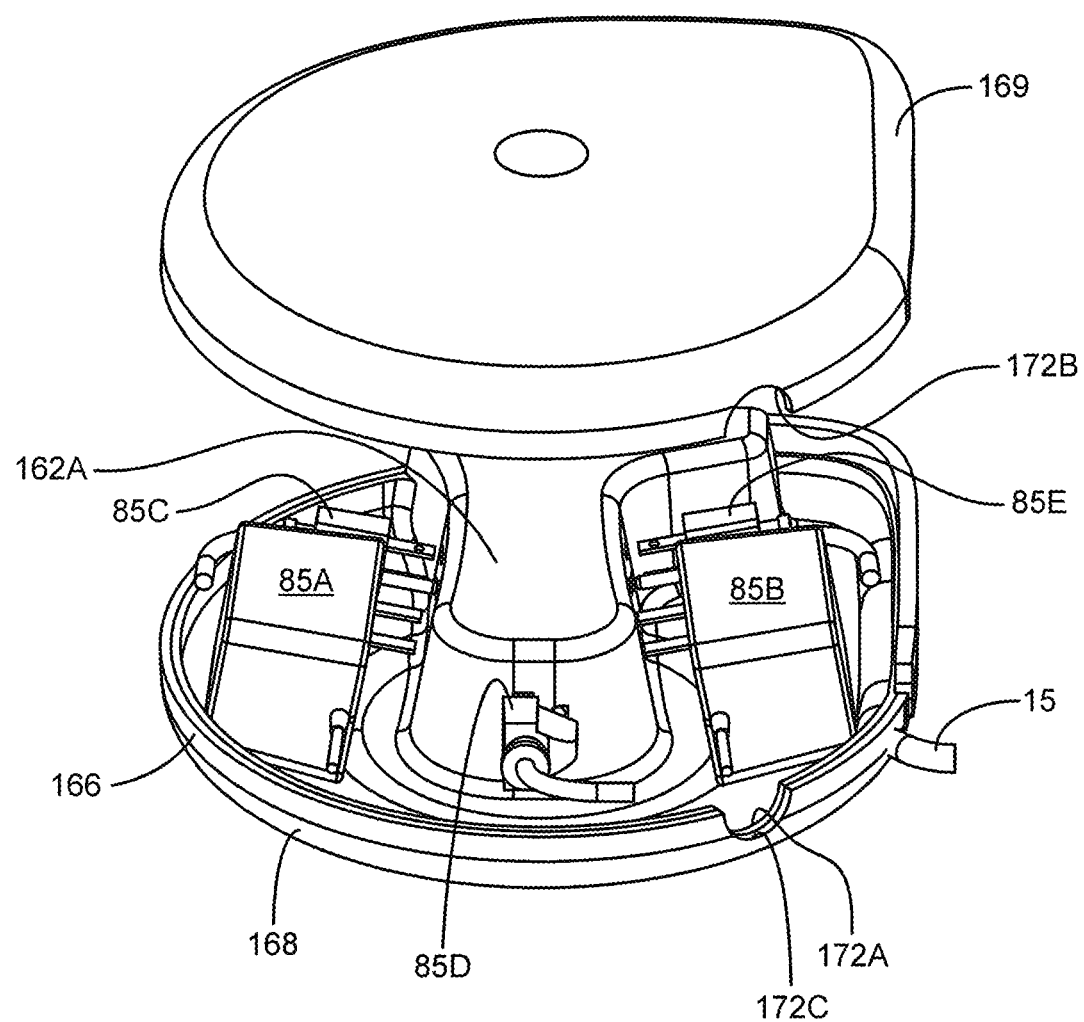
FIG. 29 is a first perspective view of the electrical power supplying device shown in FIGS. 26A and 26B, shown with its housing cover portion removed to reveal the interior volume of the housing, and its central power-receptacle structure mounted therein, and several power adapters about to be plugged into respective power receptacles.

The Electrical Power Supplying Device According to a Third Illustrative Embodiment of the Present Invention In FIGS. 26A through 34B, a third illustrative embodiment of the present invention is shown realized in the form of an electrical power supplying device 1" that is supplied with electrical power through a flexible coiled power cord 15 plugged into a standard electrical power receptacle 11. The primary difference between device 1" and device 1 is that the power-receptacle assembly (i.e. central power-hub structure) 162 in the device 1" of the third illustrative embodiment is realized not as an island-like structure, but rather as a peninsula-like structure 162A, centrally located and extending towards the perimeter of the central housing portion 166 of the device 1", as shown in FIGS. 27, 28 and 29.

Figure 30:
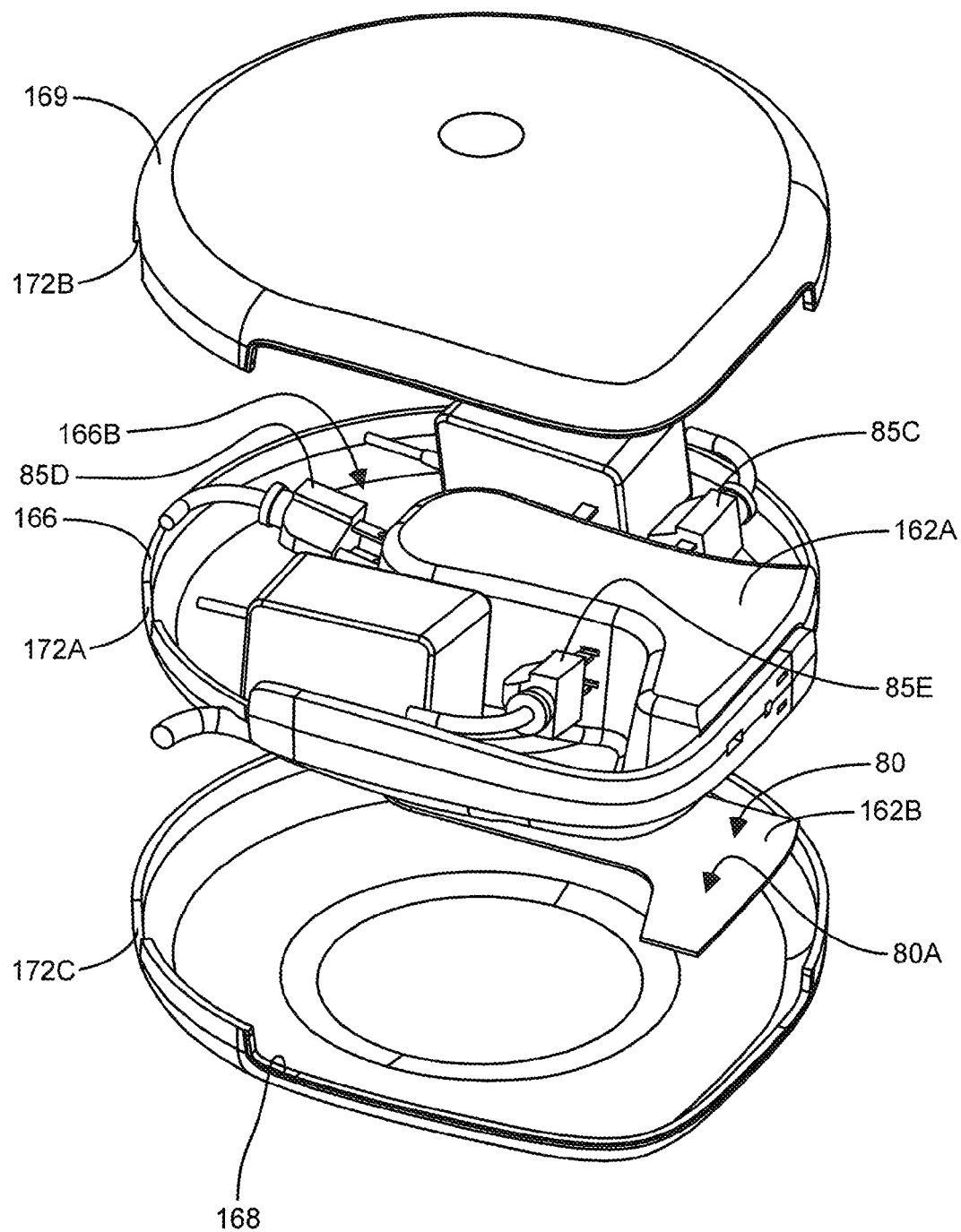
FIG. 30 is an exploded perspective view of the electrical power supplying device shown in FIG. 29, showing its components, including, base housing portion, central housing portion, a power-receptacle structure mounted on the central housing portion, and a cover housing portion, and several power adapters about to be plugged into respective power receptacles.
Figure 31:
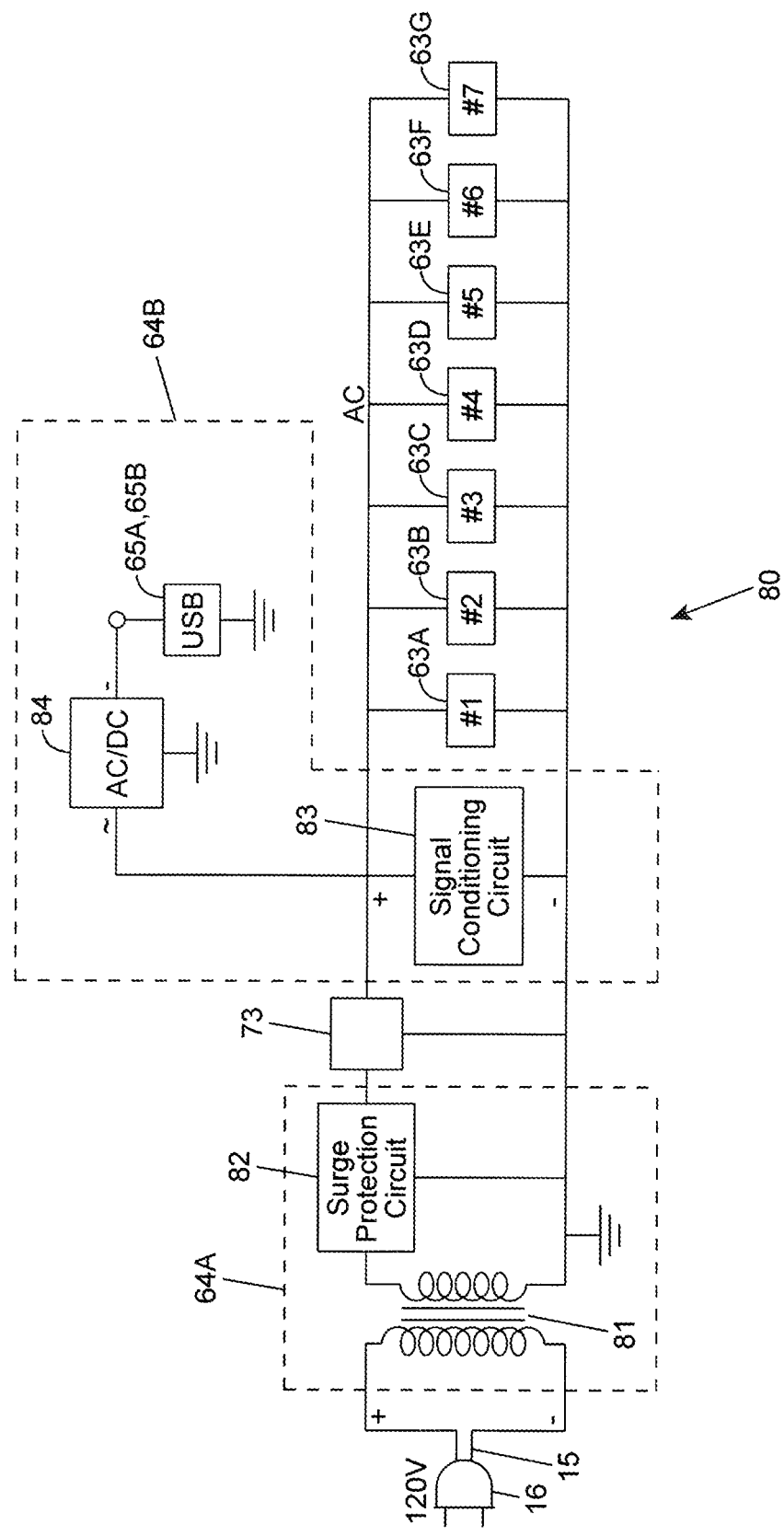
FIG. 31 is a schematic representation of the electrical and electronic components supported on the power-hub assembly shown in FIGS. 26A, 26B and 26C.

As shown in FIGS. 26A through 30, the electrical power supplying device 1" comprises an assembly of components, namely: a power supply cord 15 for plugging into a standard power receptacle by way of a power supply plug, and supplying electrical power to said electrical power supplying device; a central housing portion 166 having a central aperture 166A defined by the perimeter edges 166C of the central housing portion 166 as shown in FIG. 27, and a 3D interior volume 166B having a capacity for holding a plurality of power adapter modules 85A, 85B associated with the group of electrical appliances located in the environment, wherein each power adapter module is terminated in a power plug as shown; a power-receptacle assembly or structure 162 supported within a central portion of the central housing portion 166, and adapted for supporting a plurality of electrical receptacles 63A through 63G and one or more electronic circuits depicted in FIG. 31, which are electrically connected to the power supply cord 15, and wherein the power plugs of the power adapter modules can be plugged into the electrical receptacles 63A through 63G and the power adapter modules 85A, 85B, power plugs 85C, 85D, 85E and 85F and excess power cord associated therewith stored and concealed within the 3D interior volume 166B; a housing cover portion 169 for covering the central aperture 166A and power-receptacle assembly 162 and concealing the power plugs, and the power adapter modules 85A, 85B plugged into the central power-receptacle structure 162; a power cord portal 177 having a first portal portion 177A formed in the central housing portion and a second portal portion 177B formed in the housing cover portion 169, to allow a group of electrical power cords associated with the group of electrical appliances, to enter/exit said 3D interior volume in a bundled manner; and a base housing portion 168 snap mounted beneath and covering the bottom and certain side portions of the central housing portion 166, as shown in FIG. 28 and having a portal cut-out portion 177C that is spatially aligned with portal portions 177A, when the central housing portion 166 and the base housing portion 168 are assembled together, as shown in FIGS. 27 and 29.

In general, the central receptacle housing portion 162A supports, internally, the assembly of electrical power-receptacles 63A through 63G indicated in FIG. 31, and a printed circuit board 80A supporting electrical and electronic circuitry 80, and being mounted on a base plate 162B attaching to and closing off an aperture 166C formed in the bottom surface 166B of the central housing portion 166. The base plate 162B has perimeter dimensions that match perimeter dimensions of central receptacle housing portion 162A, and onto which the central receptacle housing portion 162A is snap-fit mounted to form a unitary structure when assembled as shown in FIGS. 27 and 28; and a power cord portal 172, realized as a first portal portion 172A formed in the central housing portion 166 for passing of appliance port cords 12 into and out of the device 1".

As shown in FIGS. 26A through 30, the central power-receptacle assembly 162 comprises: central power-receptacle housing 162A extending from the central housing floor 166D, and containing electrical receptacles 63A through 63F for receiving AC power cords, and printed circuit (PC) board 80A, and also electrical power receptacle 63G and one or more USB port ports 65A (and 65B) that are accessible from outside the device, as shown in FIGS. 26A, 26B.

As shown in FIGS. 28, 29 and 30, the 3D interior volume 166B of the central housing portion 166 has geometrical dimensions providing the capacity to contain power adapters and modules 85A, 85B, and plugs 85C through 85F and excess power cable associated therewith, as shown.

As shown in FIGS. 26A, 27A and 29, the edge or perimeter aperture 166C formed in the upper edge of the side wall of the central housing portion 166, spatially aligns with edge aperture of the housing cover portion 169 when the housing cover portion 169 is snap-fitted onto the central housing portion 166, as shown in FIGS. 26A and 26B.

As best shown in the exploded diagrams of FIGS. 28 and 30, the power-receptacle assembly 162 snap fits into the bottom floor of the housing base portion 66. Also, electrical receptacles 63A through 63E, electronic PC circuit board 64A, 64B and other electrical components specified in the electrical circuit diagram of FIG. 24, are contained within the power-receptacle assembly housing, and interconnect the components of FIG. 24, together, and supply electrical power thereto, during device operation.

As shown in FIGS. 31A and 31B, the housing cover portion 169 is installed on the housing portion 166, and several electrical appliances are connected to and powered by the device. Also, FIGS. 27 and 29 reveal that the electrical receptacles 63A through 63F are arranged about the power-receptacle assembly 162 to optimize space within the 3D interior volume of the device, and accommodate the storage of power adapters, modules and plugs formed at the terminal portions of appliance power cords.

The electrical and electronic circuitry 80 contained within the device housing are shown in FIG. 31, comprising: the electrical power cord 15 that plugs into a power plug port formed on the side exterior wall of the central housing portion 166; an isolation-type power transformer 81; surge protection circuitry 82 connected to the output terminals of the isolation transformer 81; ON/OFF switch and indicator 73 provided with a glowing LED ring that indicates the state of the device using different glow colors (e.g. Green=READY, Red=NOT READY); a signal conditioning circuit 83; multiple electrical receptacles 63A through 63G supplying AC power from the signal conditioning circuit 83; and an AC/DC converter 84 supplying the USB power ports 65A, 65B, all components contained in device 1".

Preferably, the housing cover portion 169 includes air vents about its top perimeter region allowing the passage of warm heated air from within the 3D interior volume of the housing portion 166, and thus providing ventilation to the interior of the device. Also, an ON/OFF power switch and indicator 173 can be mounted within the side wall of the housing portion 166, and electrically connected to the circuitry 80 contained in the central power-receptacle structure 162 and schematically depicted in FIG. 31. When taken together, air circulation vents formed in the housing base portion 166 and air vents formed in the housing cover portion 169, provide a passive-type of thermal management subsystem embodied within the device so that all power adapters contained therein are maintained within safe interior operating temperature limits. As illustrated, cool and warm airflows move through the thermal management subsystem.

Figure 32:
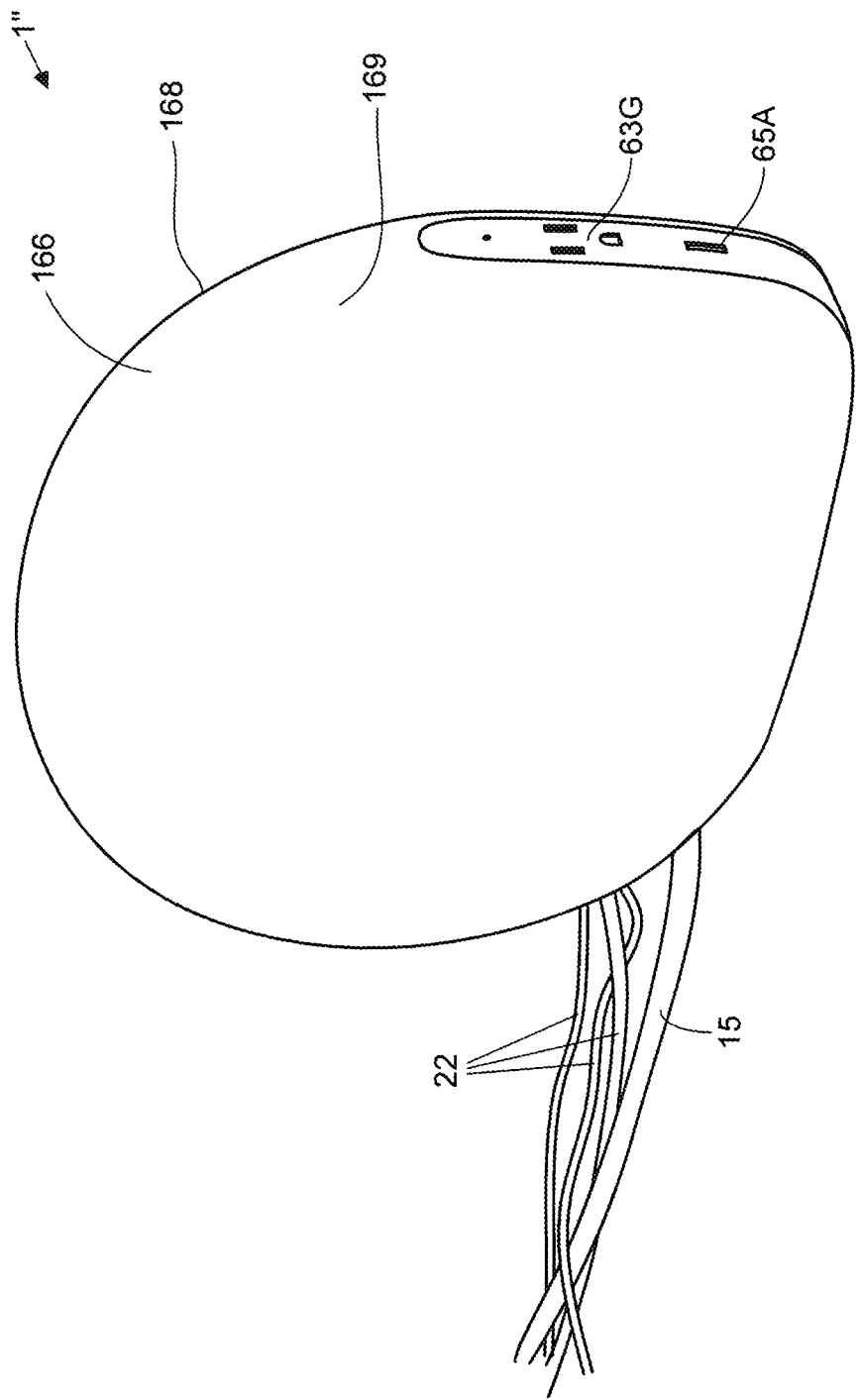
FIG. 32 is a perspective view of the electrical power supplying device of FIGS. 26A and 26B, shown mounted vertically on a horizontal surface, containing and concealing a plurality of power adapter and plugs, and with the excess power cord of the appliances managed within the housing, and extending out the power cord portal.
Figure 33A:
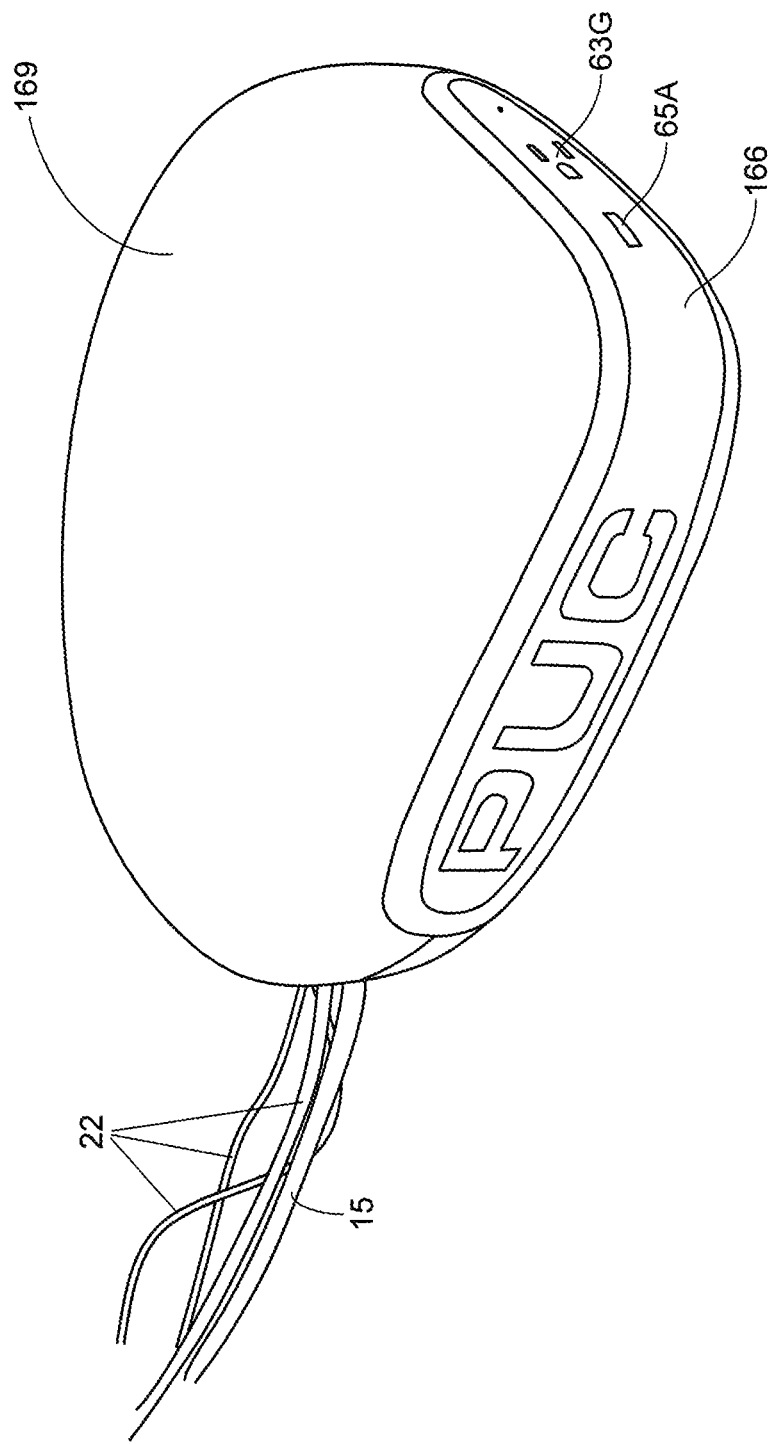
FIG. 33A is a first perspective view of the electrical power supplying device of FIGS. 26A and 26B, shown mounted horizontally on a horizontal surface, containing and concealing a plurality of power adapter and plugs, and with the excess power cord of the appliances managed within the housing, and extending out the power cord portal.

In FIGS. 32A through 32D, the electrical power supplying device 1" is shown mounted on a desktop or floor surface, either vertically in FIG. 32 and horizontally in FIG. 33A through 33C, and in both configurations provides external access to external power receptacle 63G and USB power ports 65A, 65B, through apertures formed in the side wall of central housing portion 166, while a bundle of power cables 22 from electrical appliances enter/exit the power cable portal 177 provided on the side of the housing 166. However, device 1" can be mounted on a wall surface, or other horizontal or vertical surface.

Figure 34A:
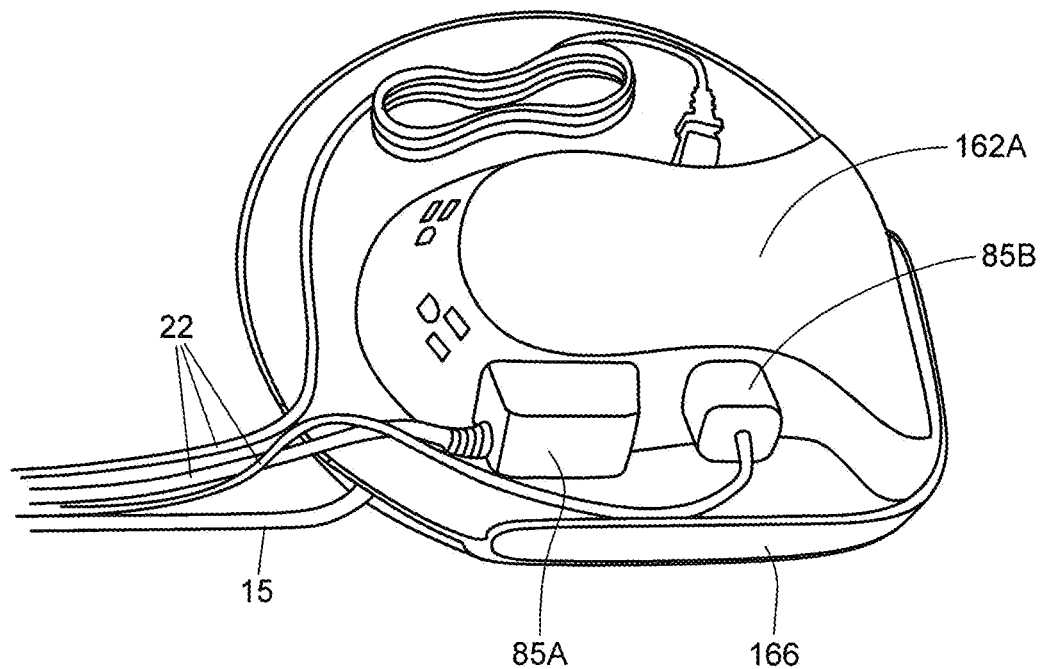
FIG. 34A is a first perspective view of the electrical power supplying device of FIG. 33A through 33C, shown with its housing cover portion removed to reveal a plurality of power adapter and plugs mounted in the 3D interior volume, and with the excess power cord of the appliances managed within the housing, and extending out the power cord portal.
Figure 34B:
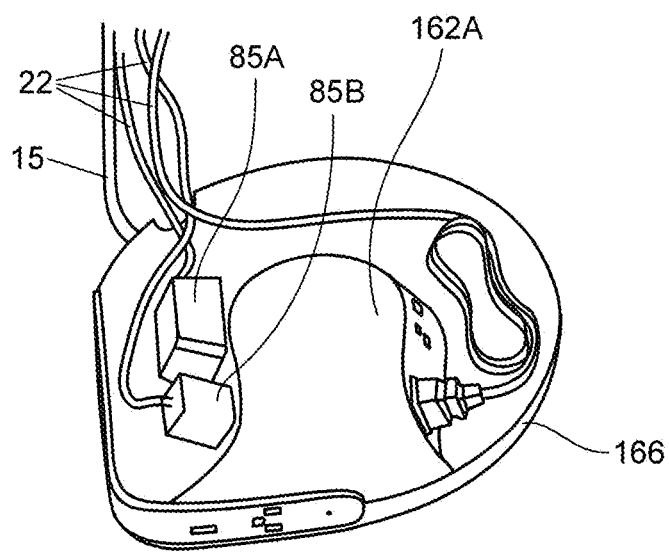
FIG. 34B is a second perspective view of the electrical power supplying device of FIG. 32A through 33C, shown with its housing cover portion removed to reveal a plurality of power adapter and plugs mounted in the 3D interior volume, and with the excess power cord of the appliances managed within the housing, and extending out the power cord portal.

As shown in FIGS. 34A and 34B, the housing cover portion 169 can be easily lifted off the power-hub housing portion of the electrical power supplying device 1" to reveal a number of features, namely: (i) that electrical power provided to a number of electrical appliances supported at the workstation of FIGS. 1A and 1B; (ii) several power plugs and power adapter plugs are supported about the central power structure (i.e. peninsula) 162; and (iii) the length of a plurality of electrical cords 22A, associated with the electrical appliances, are neatly managed within the housing, in accordance with the principles of the prevent invention, and ultimately extend out the power cord portal 172.

The method of using the power-supplying device 1" is similar to that described for other embodiments, except that in the third embodiment, excess length of the electrical power cords of these electrical plugs is managed by winding up neatly within the interior volume of the device, as shown. Once power plugs are plugged into the power-receptacle assembly, and cords bundled and routed through port 177 and towards respective appliances. Thereafter, the housing cover portion 69 is replaced onto the housing spacer portion 68 of the power supplying device 1'. Thereafter, several additional USB power plugs and AC power plug can be plugged into external electrical receptacles 86A and 86B of the power-receptacle assembly 162. At any time, the housing cover portion 169 can be easily removed from the central housing portion 166, and power plugs, power adapter plugs and/or power adapter blocks 85A through 85E can be easily removed, added or reconfigured within the power supplying device 1" to meet requirements of electrical appliances deployed in the work, living and/or play environment, as the case may be.

In general, the electrical power supplying device 1" can be supported on a variety of surfaces other than floor surfaces, such as, for example, countertop surfaces, shelf surfaces, pedestals, table surfaces, kitchen countertop surfaces, and the like, where electrical appliances are deployed for use and require electrical power for operation. Also, while the device is shown in an interior workspace in FIGS. 32 and 33A through 33C, it is understood that the device of the present invention can also be used safely outdoors, provided it is protected from the natural elements, to protect from electrical shock and shorting.

Some Modifications that Readily Come to Mind

While the thermal management subsystem employed in the illustrative embodiments was of the passive-type, it is understood that the thermal management subsystem can be realized as an electrically-active type air circulation system, designed to actively force cooler air from the ambient environment to flow the device to maintain the temperature within the 3D interior volume thereof within safe operating limits during power supplying operations.

In the event that a significant electromagnetic fields (EMFs) are generated by 60 HZ electrical currents flowing through appliance power cords managed/organized within the device during operation, then EMF shielding measures or techniques known in the EMF shielding art can be practiced to reduce or eliminate the electromagnetic field strength outside the device during operation. Such EMF shielding measures might include applying metallic foil to the interior surfaces of the housing components, as well as other suitable measures known in the art.

Also, in general, the housing and other components of the electrical power supplying device of the present invention can be manufactured using injection molded plastics and/or other materials having suitable characteristics and properties which will be known to those skilled in the art.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An electrical power supplying device for supplying alternating current (AC) electrical power and direct current (DC) electrical power to a group of electrical appliances located in an environment, wherein each electrical appliance has a power cord routed through said environment and into said electrical power supplying device and terminating with an appliance power plug, said electrical power supplying device comprising:

a power supply cord for plugging into a standard power receptacle by way of a power supply plug, and supplying AC electrical power to said electrical power supplying device;

a housing base portion having a central aperture providing access to a 3D interior volume bounded by a side wall extending circumferentially about said 3D interior volume and having a capacity for holding a plurality of power adapter modules and/or power adapter blocks associated with said group of electrical appliances located in said environment which can be loaded into said 3D interior volume through said central aperture;

a bottom support surface disposed opposite said central aperture, and on which the plurality of power adapter modules and/or power adapter blocks can be supported within the 3D interior volume;

a central power-receptacle assembly having a peninsula-like housing structure supported generally within a central portion of said housing base portion and extending above said bottom support surface within the 3D interior volume, and towards a portion of a side wall of said housing base portion, and said peninsula-like housing structure supporting a plurality of internally-disposed alternating current (AC) electrical receptacles and one or more electronic circuits, including an AC-to-DC power conversion circuit, which are operably connected to said power supply cord, and wherein when power plugs of said power adapter modules are plugged into said plurality of internally-disposed AC electrical receptacles, said power adapter modules can be supported on said bottom support surface, while said power adapter modules and excess power cord are stored and contained within said 3D interior volume;

a housing cover portion for closing off said central aperture and covering said central power-receptacle assembly, including said peninsula-like housing structure, and said housing base portion and concealing said power plugs and said one or more power adapter modules supported and stored within said 3D interior volume;

wherein said peninsula-like housing structure supports at least one externally-disposed AC electrical receptacle that is accessible from the outside of said side wall of said housing base portion, and is adapted to receive the appliance power plugs of at least one electrical appliance to supply AC electrical power thereto;

wherein said peninsula housing structure further supports at least one externally-disposed USB direct current (DC) power port that is operably connected to said AC-to-DC power conversion circuit and accessible from outside of said side wall of said housing base portion, and is adapted to receive the appliance power plug of at least one electrical appliance to supply DC electrical power to the electrical power plug;

wherein said peninsula-like housing structure has a side portion through which said externally-disposed electrical power receptacle and said at least one externally-disposed USB power port are supported; and wherein the side wall of said housing base portion includes a first set of apertures for allowing an electrical plug to be plugged into said externally-disposed electrical power receptacle to receive AC electrical power, and at least one externally-disposed USB power plug to be plugged into said at least one externally-disposed USB direct current (DC) power port to receive DC electrical power; and a power cord portal formed in at least a portion of said housing base portion, to allow a group of electrical power cords associated with said group of electrical appliances outside of said electrical power supplying device, to enter/exit said 3D interior volume in a bundled manner.

2. The electrical power supplying device of claim 1, wherein said power cord portal is formed in said housing base portion, allowing passage of electrical cords through said power cord portal.

3. The electrical power supplying device of claim 1, wherein said housing base portion is adapted for horizontally-oriented support on a horizontal support surface in said environment.

4. The electrical power supplying device of claim 1, wherein said housing base portion is adapted for vertically-oriented support on a horizontal support surface in said environment.

5. An electrical power supplying device for supplying alternating current (AC) electrical power and direct current (DC) electrical power to a group of electrical appliances located in an environment, comprising:

a power supply cord for plugging into a standard power receptacle by way of a power supply plug, and supplying AC electrical power to said electrical power supplying device;

wherein each electrical appliance has a power cord routed through said environment and into said electrical power supplying device and terminating with an appliance power plug;

a housing base portion having a central aperture providing access to a 3D interior volume bounded by a side wall extending circumferentially about said 3D interior volume and having a capacity for holding a plurality of power adapter modules and/or power adapter blocks associated with said group of electrical appliances located in said environment which can be loaded into said 3D interior volume through said central aperture;

a bottom support surface disposed opposite said central aperture, and on which the plurality of power adapter modules and/or power adapter blocks can be supported within the 3D interior volume;

a central power-receptacle assembly having a peninsula-like housing structure supported generally within a central portion of said housing base portion and extending above said bottom support surface within the 3D interior volume, and towards a portion of a side wall of said housing base portion, and said peninsula-like housing structure supporting a plurality of internally-disposed alternating current (AC) electrical receptacles and one or more electronic circuits, including an AC-to-DC power conversion circuit, which are operably connected to said power supply cord, and wherein when power plugs of said power adapter modules are plugged into said plurality of internally-disposed AC electrical receptacles, said power adapter modules can be supported on said bottom support surface, while said power adapter modules and excess power cord are stored and contained within said 3D interior volume;

a housing cover portion for closing off said central aperture and covering said central power-receptacle assembly, including said peninsula-like housing structure, and said housing base portion and concealing said power plugs and one or more power adapter modules supported and stored within said 3D interior volume;

wherein said peninsula-like housing structure supports at least one externally-disposed AC electrical receptacle that is accessible from outside of a side wall of said housing base portion, and is adapted to receive the appliance power plugs of at least one electrical appliance to supply AC electrical power thereto; and a power cord portal formed in at least a portion of said housing base portion, to allow a group of electrical power cords associated with said group of electrical appliances outside of said electrical power supplying device, to enter/exit said 3D interior volume in a bundled manner.

6. The electrical power supplying device of claim 5, wherein said peninsula-like housing structure further supports at least one externally-disposed USB direct current (DC) power port that is operably connected to said AC-to- DC power conversion circuit and accessible from the outside of said side wall of said housing base portion, and is adapted to receive the electrical power plug of at least one electrical appliance to supply DC electrical power to the appliance power plug.

7. The electrical power supplying device of claim 6, wherein the side wall of said housing base portion includes a first set of apertures for allowing an AC electrical plug to be plugged into said externally-disposed AC electrical receptacle to receive AC electrical power, and at least one externally-disposed USB power plug to be plugged into said at least one externally-disposed USB DC power port to receive DC electrical power.

\* \* \* \* \*